US005635404A

United States Patent [19]
Wilson

[11] Patent Number: 5,635,404
[45] Date of Patent: Jun. 3, 1997

[54] APPLICATIONS OF ELECTROSPRAY IONIZATION MASS SPECTROMETRY TO NEUTRAL ORGANIC MOLECULES INCLUDING FULLERENES

[75] Inventor: Stephen R. Wilson, Chatham, N.J.

[73] Assignee: New York University, New York, N.Y.

[21] Appl. No.: 38,105

[22] Filed: Mar. 29, 1993

[51] Int. Cl.$^6$ .................................................... G01N 24/00

[52] U.S. Cl. .......................... 436/173; 436/145; 436/146; 436/174; 436/181; 436/128; 436/131

[58] Field of Search .................................... 436/145, 146, 436/173, 183, 174, 128, 131

[56] References Cited

U.S. PATENT DOCUMENTS 4,935,624 6/1990 Henion et al. .......................... 250/288

OTHER PUBLICATIONS

Hiraoka, et al., Observation of the Fullerene Anions $C_{60}$ and $C_{70}$ by Electrospray Ionization; *Rapid* Communications in Mass Spectrometry, 6:254–256 (1992).
Prato, et al., Addition of Azides to $C_{60}$: Synthesis of Azafulleroids, *J. Am. Chem. Soc.* 115:1148–1150 (1993).
Schwarz, $C_{60}$–Fullerene—A Playground for Chemical Manipulations on Curved Surfaces and in Cavities, *Chem.* Int. Ed. Engl. 31:293–298 (1992).
Teesch, et al., Metal Ions as Special Reagents in Analytical Mass Spectrometry, Organic Mass Spectrometry: 27;931–943 (1992).
R. Aebersold et al. *Protein Sci.* 1992, 1, 494–503.
S.R. Wilson et al. *Abstr. Proc. 40th Am. Soc. Mass. Spectrom. Conf. on Mass Spectrom. & Allied Topics* 1992, pp. 1641–1642.
A.P. Bruins et al. *Anal. Chem.* 1987, 59, 2642–2646.
R.D. Smith et al. *Anal. Chem.* 1988, 60, 1948–1952.
K.D. Henry et al. *Proc. Natl. Acad. Sci. USA* 1989, 86, 9075–9078.
E.C. Huang et al. *Anal. Chem.* 1990, 62, 713A–725A.
V. Katta et al. *J. Am. Chem. Soc.* 1990, 112, 5348–5349.
J.A. Loo et al. *Anal. Chem.* 1990, 62, 693–698.
S. Anderson et al. *Angew. Chem. Int. Ed. Engl.* 1992, 31, 907–910.
R.R. Loo et al. *Chem. Abstr.* 1992, 116, 189825a.
K. Hiraoka et al. *Chem. Abstr.* 1992, 117, 162751g.
S.R. Wilson et al. *J. Org. Chem.* 1992, 57, 6941–6945 and Suppimental Figures.
S.R. Wilson et al. *J. Chem. Soc., Chem. Commun.* 1993, (8), 664–665.
K. Shimada et al. *Analyst*, 1991, 116, 1393–1397.
R. Colton et al. Org. Mass Spect. 1992, 27, 1030–1033.
R.J. Vreeken et al. Biol. Mass. Spect. 1993, 22, 621–632.
K.L. Busch et al. *J. Am. Chem. Soc.* 1982, 104, 1507–1511.
M.M. Ross et al. *Anal. Chem.* 1984, 56, 2142–2145.
K.L. Olson et al. *J. Chromatog.* 1985, 333, 337–347.
R.D. Voyksner et al. *Chem. Abstr.* 1987, 107, 191111x.
J. Van Der Greef et al. *J. Chromatog.* 1989, 474, 5–19.
J. Paulson et al. *J. Chromatog.*1991, 554, 149–154.
K. Talcamura et al. *J. Chromatog.* 1991, 543, 241–243.
G.J. Van Berkel et al. *Anal. Chem.*1991, 63, 2064–2068.
J. W. Metzger et al. *Carbohydr. Res.* 1991, 222, 25–35.

*Primary Examiner*—James C. Housel
*Assistant Examiner*—Arlen Soderquist
*Attorney, Agent, or Firm*—Browdy and Neimark

[57] ABSTRACT

Electrospray ionization mass spectroscopy (ESI-MS) methods, tagging reagents and novel compounds for labeling neutral compounds to provide ionized compounds for mass spectroscopy analysis, and novel compounds discovered using such EES-MS methods, including fulleroids

9 Claims, 31 Drawing Sheets

$C_{60}$

VITAMIN D-FULLERENE m / z = 851 (M = Na+), 867 (M = K+)

FIG. 32A
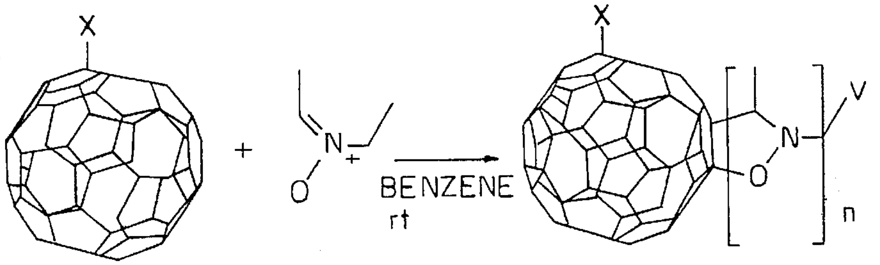
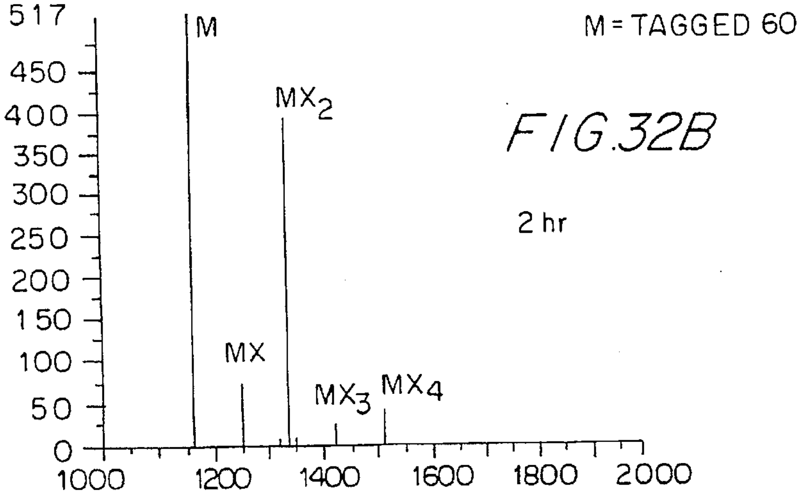
FIG. 32B
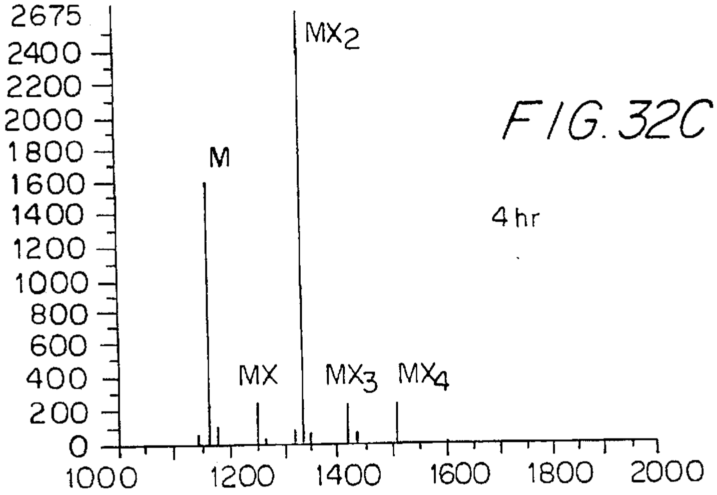
FIG. 32C
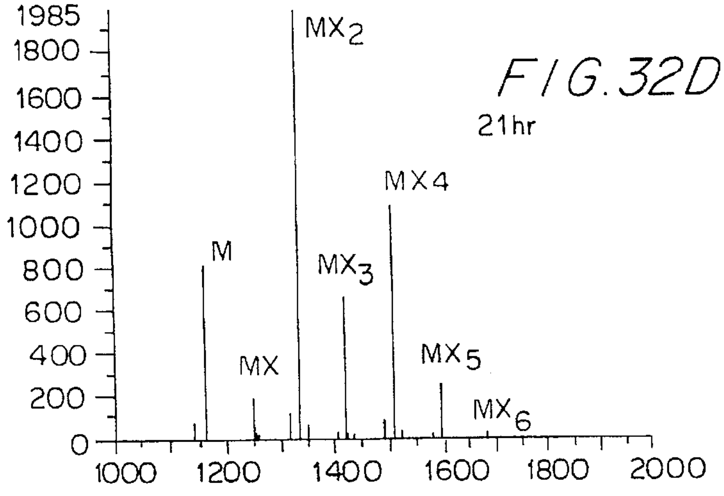
FIG. 32D

APPLICATIONS OF ELECTROSPRAY IONIZATION MASS SPECTROMETRY TO NEUTRAL ORGANIC MOLECULES INCLUDING FULLERENES

BACKGROUND OF THE INVENTION

1. Field of the Invention

The invention relates to the field of electrospray ionization mass spectroscopy (ESI-) and, more particularly, to the discovered use of a tagging reagent to associate with neutral compounds to provide tagged compounds suitable for detection and analysis using mass spectroscopy analysis. The present invention also relates to novel compounds discovered using such ESI-methods, including fulleroids.

2. Description of the Background Art

The use of electrospray ionization mass spectrometry (ESI-MS) for analysis of chemical compounds is under investigation (1).

ESI-MS is a developing new technique; and *J. Organometallics*, in press). Electrospray (J. B. Fenn et al., *Science* 246:64 (1989); *Mass Spectrometry Rev.*, 9:37 (1990); and R. D. Smith et al. *Anal. Chem.*, 62:882 (1990)) in a technique for directly spraying a solution of ions into amass spectrometer. The technique is so gentle that only molecular ions, characteristic of the molecular weights of the compounds of interest, are seen. The technique of electrospray is therefore a method for "weighing" molecules in dilute solution. The structures of the detected ions can often be deduced from the electrospray spectrum. While electrospray has recently revolutionized the mass measurement of biological molecules, applications of small organic molecules are rare.

For detection, ESI-MS requires the presence of cationic groups or anionic groups. Neutral compounds have been poor candidates for analysis by ESI-MS for several reasons. For example, neutral small compounds often are volatile and may readily be determined using GC-MS. Even so, neutral compounds are often derivatized to make them more thermally stable and volatile. Neutral compounds also are not directly detectable by ESI-MS since they are not charged. However, since many chemical reactions take place in solution, there would be significant advantages to the use of ESI-MS for analyzing neutral compounds, since this technique allows the analysis of solution chemistry.

Maquin et al, *Rapid Commun. Mass. Spectrom.* (England) 5(6):299–392 (June 1991) discloses that the molecular weights of recombinant protein interleukin-2 and interferon gamma were determined by ionization (ESI) mass spectroscopy on the charged molecules. The interleukin-2 was found to have an average experimental mass of 15,549.4 u, and a mass observed for the interferon gamma was 16,908.4 u.

DeSerrano et al, *Arch. Biochem. Biophys.* (United States) 294(1):282–290 (April 1992) discloses molecular mass determination of a recombinant domain from tissue-type plasminogen activator as 9621.9±4.0.

Rumb et al, *FEBS Lett* (Netherlands) 296(2):153–157 (Jan. 20, 1992) discloses the characterization of mutant Asp-52 and lysozyme with GSE NAC4 and GLC NAC6.

Romk et al, *Biochemistry* 30(39):9435–9442 (Oct. 1, 1991) discloses structural characterization of rusticyanin isolated from *Thiobacillus ferrooxidans* using, inter alia, triple-quadrapole mass spectrometry techniques.

Henion, U.S. Pat. No. 4,935,624, discloses a thermo-assisted electrospray interface used in series between a liquid chromatograph and a mass analyzer to give increased sensitivity for detection of components in a liquid stream at high flow rates up to 2 ml per minute. This device provides a combination of thermo-energy and electric field potential to disperse the liquid into a fine mist which is then directed at atmospheric pressure into the ionization chamber of a mass spectrometer. The invention was tested on a series of compounds including disulphonated acyl dyes, phenolic compounds, carboxylic acids, drug compounds, nucleotides and glycopolymers.

Hiraoka et al, *Rapid. Comm. Mass Spect.* 6:25–256 (1992) attempted detections of fullerene ions $C_{60}^-$ and $C_{70}^-$ using ESI-MS. Attempts to detect cations of $C_{60}K^+$ or $C_{70}K^+$ using the most suitable 50/50 (v/v) methanol+benzene solvent failed, even though $K^+(H_2O)$, $K^+(CH_3OH)$ and $K^+(C_6H_6)$ produced strong signals. In alternative positively charged fullerenes by electron transfer between naphthacene and 2,3-dichloro-5,6-dicyano-p-benzoquinone (DDQ) in $CH_2Cl_2$+$CH_3OH$ (50/50, v/v), the ionization energies of the resulting radical cation of naphthacene and of $C_{60}$ would theoretically be of the same order. However, such a detection system also failed to detect fullerene cations. A further $I_2/C_{60}$ cation system using benzene/methanol (50/50, v/v) also failed to detect fullerenes using ESI-MS. Finally, detection of fullerene cations using involatile molecules by gas-phase ion/molecule reactions in a corona discharge mode also failed to detect fullerenes using ESI-MS.

In anion fullerene systems, a reducing agent N,N,N'N'-tetramethyl-p-phenylenediamine (TMPD) in $CH_2Cl_2$ and $CH_3OH$ (60/40, v/v) deoxygenated was also attempted. However, $C_{70}$ was not at all detectable and $C_{60}$ was only slightly detectable. Finally, the use of NaK amalgam to reduce a mixture of $C_{60}/C_{70}$ and electrospray with a dimethoxyethane+benzene+methanol (1/6/3, v/v/v) solvent gave uncertain results with many unidentified peaks which were interpreted to include $C_{60}^-$ and $C_{70}^-$. However, very low peaks and resolution made the results uncertain. Due to these results, reduction of $C_{60}$ and $C_{70}$ would appear to be preferred over oxidation.

Fullerenes

One of the most exciting recent discoveries in chemistry is a new form of elemental carbon, such as $C_{60}$ and related forms, also known as buckminster fullerene or buckyball (H. W. Kroto et al. *Nature*, 518:162 (1985). Until 1985, there were only two known forms of carbon, diamond and graphite. This new form of carbon is a molecule made up of carbon atoms in a shape similar to that of a soccerball. Scientists around the world have begun research into all aspects of buckyballs (T. Bran, *Angewate Chem, Int'l Ed,*, 31:599 (1992)). The interest and excitement are caused by the unique spherical shape of the molecules as well as its unusual properties. Very recently two new relatives of $C_{60}$ (1) nested spheres of buckyballs called buckyonions (S. Iijima, *Nature*, 305:56 (1991), and (2) hollow fibers called buckytubes (D. Ugarte, *Nature*, 357:707 (1992)), have been discovered. Buckyballs, may have many possible uses. When buckyballs are mixed with such metals as potassium, they become superconductors (A. F. Hebard et al., Nature, 350:600 (1991)). In addition to their extraordinary mechanical strength, many other unusual properties of these materials have been observed.

In order to take full advantage of buckyballs in materials research, chemists will have to be able to use them as a basis for making other compounds. While the chemistry of carbon compounds is the most diverse in the universe (more than 7,000,000 indexed so far by Chemical Abstracts), buckyball chemical reactivity is poorly understood, partly because of the difficulty in isolating, purifying and identifying buckyball derivatives or "fulleroids".

There are several reasons why buckyballs are difficult to study. First, buckyballs are made up of about 60 or 70 carbon atoms— and no hydrogen atoms. Thus, nuclear magnetic resonance (NMR) of the hydrogens, the chemist's most useful "photo" of chemical structure, cannot be used. Second, the molecule is very symmetrical but its derivatives are not. For example, one of the simplest derivatives, $C_{60H2}$, has 27 possible isomers. Third, buckyballs are relatively insoluble, and they can be compared to an inert gas in terms of their interactions with solvent molecules. Fourth, while buckyballs are very stable (up to 700° C.) their derivatives are quite fragile, often breaking apart into their parent $C_{60}$ or $C_{70}$. A few reactions of buckyballs have been observed and some reviews have appeared (H. Schwarz, *Angewante Chem Int'l Ed.*, 31:293 (1992)).

Fullerenes have been discovered to De mild oxidizing agents, perhaps due to the presence of pyracyclene units which could theoretically capture up to two electrons to give a (4n+2π) electron dianion, or in the form of a lone pair to give a "cyclopentadienide" monoadduct. Due to the high electron affinity of fullerenes, reductions, nucleophilic additions and oxidative additions of low-valent transition metals are considered as the sole avenues of fullerene $C_{60}$ functionalization and modification. (Wudl, *Acc. Chem. Res.* 25:157–161 (1992)).

Accordingly, there is a need to provide MS techniques which allow detection of neutral compounds in solution, as well as for determining reactions and products of reactions, which includes fulleroids.

Citation of the above documents is not intended as an admission that any of the foregoing is pertinent prior art. All statements as to the date or representation as to the contents of these documents is based on the information available to the applicant and does not constitute any admission as to the correctness of the dates or contents of these documents.

SUMMARY OF THE INVENTION

It is an object of the present invention to overcome one or more of the deficiencies of the related art.

It is another object of the present invention to provide methods for mass spectroscopy analysis of neutral compounds by association or attachment of a tagging reagent that is relatively non-reactive compared to the neutral compound, such that reactions involving the neutral compound are substantially the same as compared to such reactions without the tagging reagent. Preferably, the tagged compound further comprises an ion such as a cation.

It is a further object of the present invention to provide tagging reagents which are suitable for complexing to neutral compounds such that the resultant tagged compound induces a charge in the neutral compound, such as by reduction or oxidation of the neutral compound, wherein the neutral compound can be analyzed by mass spectroscopy.

It is another object of the present invention to provide methods for mass spectroscopy analysis of chemical reactions involving neutral compounds as tagged compounds which provide real time measurements of relative formula weights, molecular weights, fragmentation and/or amounts of reactants, intermediates and/or products, which reactions include at least one neutral compound.

It is another object of the present invention to provide detection of neutral compounds using electrospray neutral compounds with alkyl amines or acyl amines as tagging reagents such that the resulting tagged compound can be analyzed using ESI-MS in solution.

It is also am object of the present invention to provide methods for characterizing fullerene and fulleroid compounds molecules as neutral compound and anions thereof, using ESI-MS.

It is another object of the present invention to determine rates of reaction and relative amounts of reactants, intermediates and/or products of such reactions involving fullerene or fulleroid compounds using ESI-MS.

It is another object of the present invention to provide novel fulleroids or fullerenes, which are useful for various material science applications for commercial and research products incorporating such novel fullerenes or fulleroids.

It is a further object of the present invention to provide methods for the direct observation and/or analysis of neutral compounds which are tagged to form detectable ions or cations in solution using ESI-MS.

It is a further object of the present invention to provide methods for ESI-MS analysis of neutral compounds as detectable tagged compounds in mixed hydrocarbon-alcohol solvents.

It is also an object of the present invention to provide methods for differentially reducing, oxidizing, and/or aminating fullerenes, fulleroids and/or anions thereof.

It is also an object of the present invention to provide methods for fragmentation of aminated, reduced, and/or oxidized fullerene or fulleroid compounds using collision induced dissociation in combination with ESI-MS.

It is also an object of the present invention to provide molecular receptor or fullerene, fulleroid and other neutral compounds, and cations or anions thereof.

It is a further object of the present invention to provide methods using ESI-MS to analyze solution properties and reactions of molecular receptors and fullerenes and anions thereof.

It is another object of the present invention to provide tagging reagents suitable for labeling neutral or other compounds as tagged compounds suitable for ESI-MS analysis.

It is a further object of the present invention to provide tagged compounds comprising ligands that bind specific receptors to measure receptor-ligand interaction, such as in targeted drug design. Alternatively, tagged compounds as tagged potential or known therapeutic agents may be measured and/or analyzed using ESI-MS according to the present invention, as in a tagged compound receptor assay.

It is a further object of the present invention to provide PITC as a tagged compound of the present invention for use in peptide sequencing It is another object of the present invention to provide ESI-MS measurment of neutral compounds using negatively charged tagged compounds.

Other objects of the invention will be apparent to skilled practitioners from the following detailed description and examples relating to the present invention.

BRIEF DESCRIPTION OF THE DRAWINGS

FIG. 21A is at 1 hr.; 21B is at 4 hrs.; 21 C is at 24 hrs.

FIG. 27A: Start of reaction. FIG. 27B: Stirring 20 hr at room temperature. FIG. 27C: Refluxing 4 hr (benzene).

FIG. 32A–D is a reaction scheme (32A) and corresponding graphical representations (32B–D) showing nitrone additions to $C_{60}$ to form nitrone fulleroids.

FIG. 34A is a graphical representation showing $C_{60}$ in methanol/toluene containing $NaOCH_3$. A:$C_{60}^-$(m/z=720), B:$C_{60}O^-$(736), C:$C_{60}$ $(OCH_3)^-$(751), D: $(C_{60}O(OH_3)^-$(767), E:$C_{60}$ $(OCH_3)_3^-$(813), F:$C_{60}O(OCH_3)_3^-$(829), G:$C_{60}O_2(CH_2C_6H_5)^-$(843) , H:$C_{60}O_3(OCH_3)_3^-$ (861) , I:$C_{60}$ $(OCH_3)_5^-$(875) , J:$C_{60}O(OCH_3)_5^-$(891). FIG. 34B is a graphical representation showing $C_{60}$ in $CD_3OD$/toluene containing $NaOCD_3$. A:$C_{60}^-$(m/z=720), B:$C_{60}O^-$ (736), C:$C_{60}(OCD_3)^-$(754), D:$C_{60}O(OCD_3)^-$(770), E:$C_{60}$ $(OCD_3)_3^-$(822), G:$C_{60}O_2(CH_2C_6H_5)^-$(843), I:$C_{60}(OCD_3)_5^-$ (890), FIG. 34C is a graphical representation showing C60 in methanol/$C_6D_5CD_3$ containing $NaOCH_3$. A:$C_{60}^-$(m/z-720), B:$C_{60}O^-$(736), C:$C_{60}(OCH_3)^-$(751), D:$C_{60}O(OCH_3)^-$ (767), E:$C_{60}(OCH_3)_3^-$(813), F:$C_{60}O(OCH_3)_3^-$(829), G:$C_{60}O_2(CD_2C_6D_5)^-$(850), I:$C_{60}(OCH_3)_5^-$(875).

DESCRIPTION OF THE PREFERRED EMBODIMENTS

Figure 1:
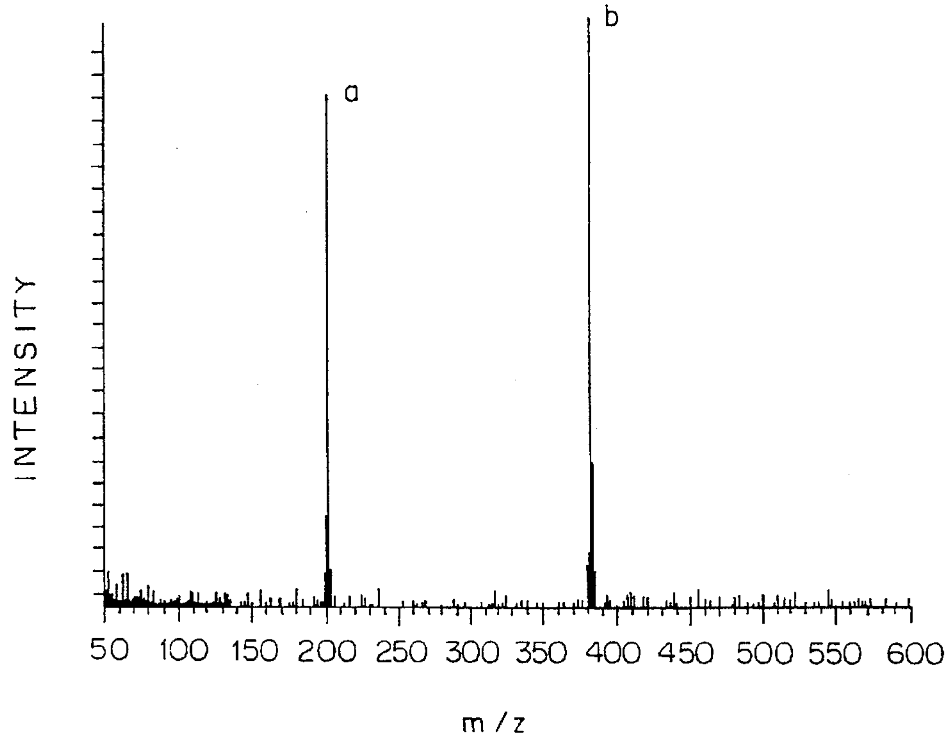
FIG. 1 is a graphical representation showing ESI-MS spectrum of $1.5\times10^{-3}$M HMPA (1) in 0.01% NaOAc/$CH_3OH$. a. $[HMPA\text{-}Na]^+$ (m/z=202), b. $[2\ HMPA\text{-}Na]^+$ (m/z=381).

It has now been discovered that neutral and other chemical compounds can be tagged with tagging reagents to provide tagged compounds that can be detected and analyzed using electrospray ionization mass spectrometry (ESI-MS). Such detection permits, for example, the analysis of chemical reactions involving such tagged compounds to qualitatively and/or quantitatively determine reaction reactants, intermediates and products in solution, including real time measurements.

Such methods are now discovered to provide practical material science and commercial applications for previously undetectable and/or analyzable neutral and other chemical compounds using ESI-MS according to the present invention, such as fullerene or fulleroid compounds, as non-limiting examples.

Neutral compounds must acquire a charge in order to be detected by mass analyzers during ESI-MS. There are four basic ways of doing this.

(1) $X{:}+H^+$------->$X\text{–}H^+$ (2) X–H------->$X^-+H^+$ (3) $X{=}Y^+X^+\text{–}Y^-+M^+$------->$X^+$–YM or $X{=}Y^+X^+\text{–}Y^{-+Z-}$ ------->XZ–$Y^-$ (4) X+y------->$X^+$. $Y^-$.

Type 1 and 2 involve acid/base chemistry, i.e. protonation of a basic residue or deprotonation of an acidic one. Type 3 involves protonation or ion attachment to a zwitterionic molecule, such as an ylide or N-oxide. Finally, formation of charge transfer complex (type 4) can also make the measurement possible by the detection of a radical cation or radical anion (3).

ESI-MS methods and tagging reagents of the present invention allow real time quantitative and qualitative analysis of reactions involving such tagged compounds which present the tagged compounds as charged molecules that are readily detected using ESI-MS. A non-limiting example of a tagging reagent for use in methods of the present invention is a crown ether, which is discovered to associate with neutral compounds and ions simultaneously, allowing for ESI-MS analysis. For example, fullerenes and fulleroids are now discovered to associate with crown ethers and ions in a relatively stable manner, such that fullerenes and fulleroid products derived therefrom can be routinely detected and analyzed using ESI-MS, as well as in real time reactions thereof.

Such an association may convert a fullerene to a fullerene anion as a complex with the tagging reagent and a cation, such as a metal. The anion may be in a reduced state having 1–5, or more, added electrons. For example, as presented in Example I, compound 1, or an alkyl or aryl derivative thereof, in association with $C_{60}$ and associated cations is most stable as $(C_{60})^{-3}$ since the tagging reagent has three crown ether binding sites.

However, depending on the tagging molecule used, different reduction states will be most stable, such that different tagging reagents which preferentially associate with different neutral compounds to form particular reduction forms such as $C_{60}^{-1}$, $C_{60}^{-2}$, $C_{60}^{-3}$, $C_{60}^{-4}$, or $C_{60}^{-5}$, having redox potentials of similar intervals (e.g., as presented in Table I, below). Once particular tagged complexes are formed, the complex will provide specific and reproducible spectrums using ESI-MS, e.g., as presented in FIG. 5 for the $C_{60}$ anion complex (compound 1+4Li+$C_{60}$)$^+$.

As another non-limiting example, hexamethylphosphoric triamide 1 (HMPA, a common reagent in organic synthesis (6)) can be detected according to the present invention by ESI-MS as its $Na^+$ adduct (Eq. 1). HMPA is used in synthesis for cation coordination and in its electrospray spectrum both M+$Na^+$ and 2 M+$Na^+$ are observed (FIG. 1). $Li^+$ was found to be efficient for the observation of the neutral compound triphenylphosphine oxide ($Ph_3P{=}O$) (2g).

(Eq 1)

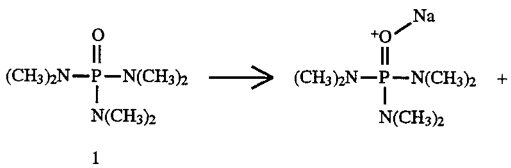

1

-continued

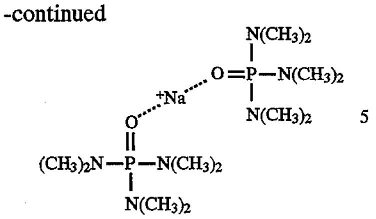

Figure 2:
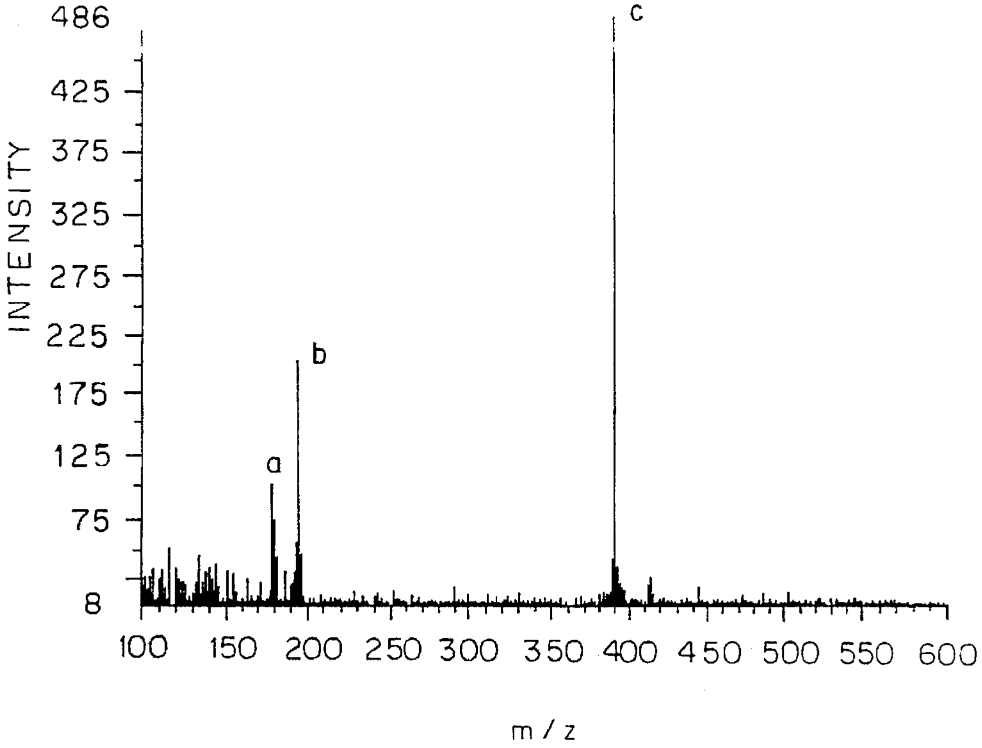
FIG. 2 is a graphical representation showing ESI-MS spectrum of compound 2 in 0.1% TFA/$CH_3OH$. a. $[M+H-H_2O]^+$ (m/z=178), b. $[M+H]^+$ (m/z=196), c. $[2M+H]^+$, hydrogen-bonded dimer (m/z=391).

Even for certain types of alkaloids such as colchicine, M+Na$^+$ was observed (2b). For molecules with charge separation, such as an N-oxide, as exemplified by compound 2, or an alkyl or aryl derivative thereof, simple protonation of the negative center will also change the molecule from neutral to positively charged (Eq. 2). The ESI spectrum of compound 2 shows both protonated M+ and a hydrogen-bonded dimer (FIG. 2).

(Eq 2)

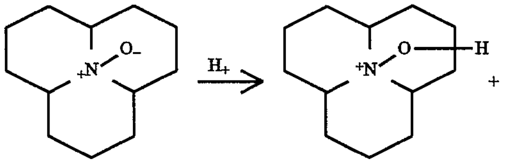

2

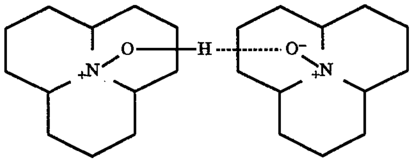

One method of the present invention for detection of neutral compounds involves metal cation binding to specific ligands.

Figure 4A:
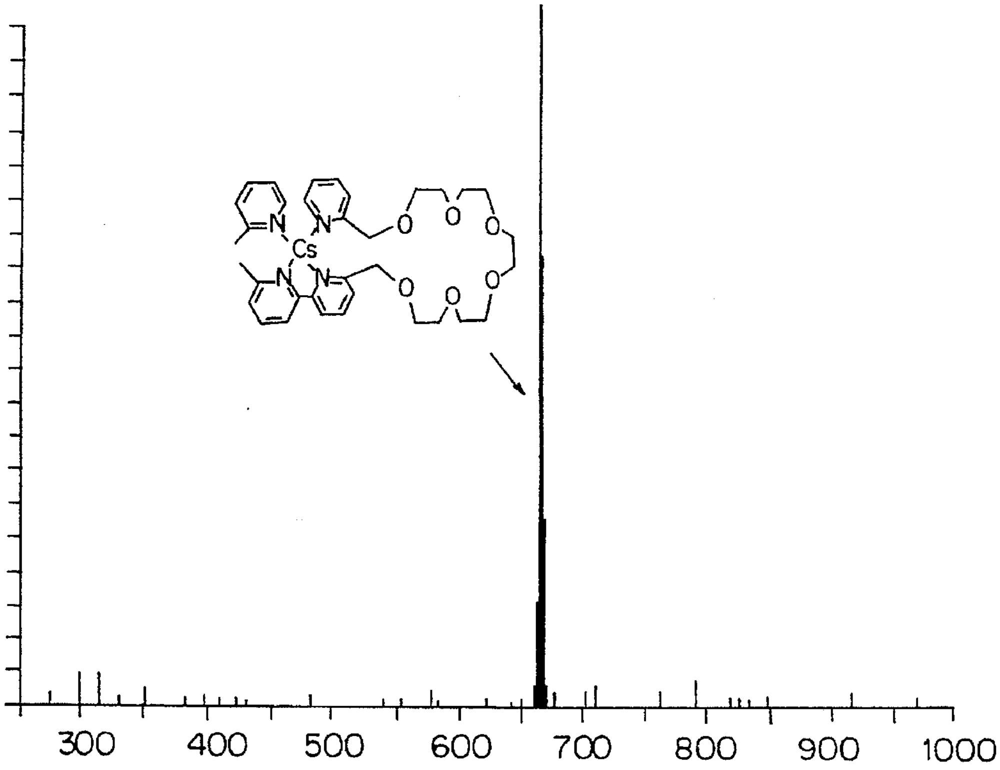
FIG. 4A–B: 4A is a graphical representation showing ESI-MS spectrum of 4 in $CH_3OH$ containing $Cu(CH_3CN)_4BF_4$. $[M+Cu]^+$ (m/z=665). 4B is a graphical representation showing ESI-MS spectrum of 4 in $CH_3OH$ containing KOAc. $[M+K]^+$ (m/z=641).
Figure 4B:
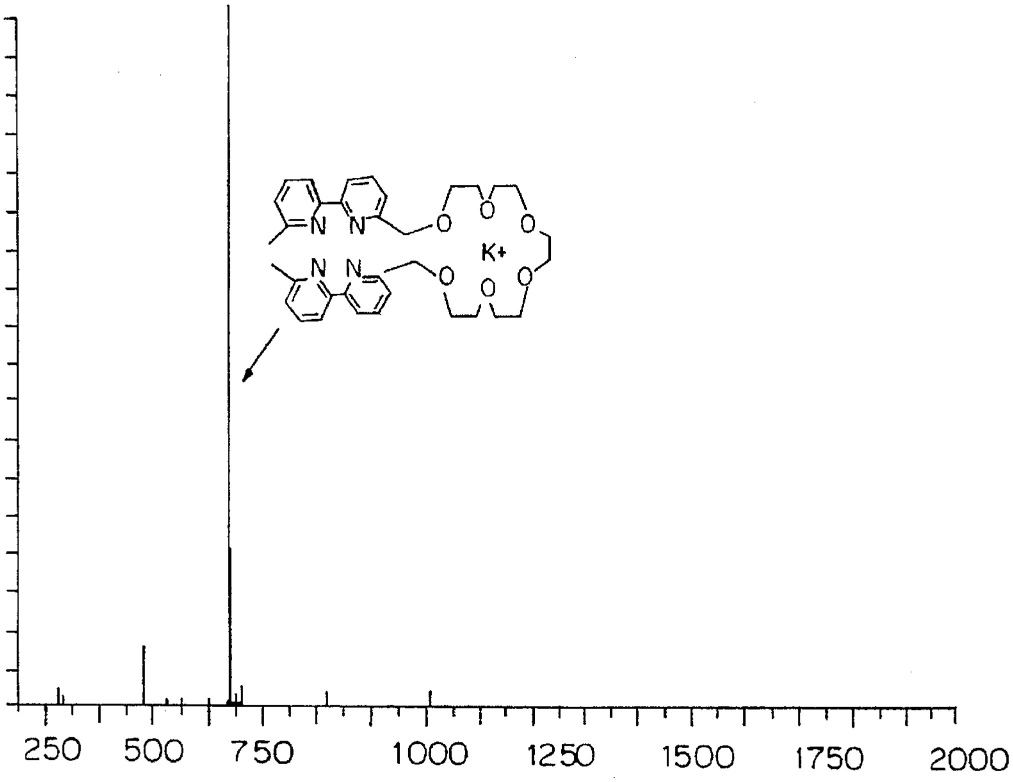

According to the present invention, new molecules have been synthesized with both hard and soft metal binding sites and for cations. For example, compound 4, or an alkyl or aryl derivative thereof, may form complexes with either alkali metal ions ("hard" site) or transition metal ions ("soft" site) (FIG. 4A,B) (2h).

4

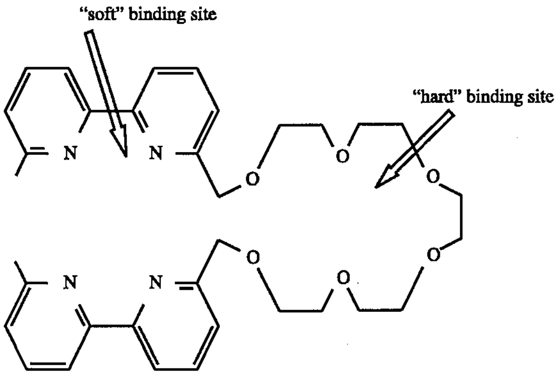

Figure 5:
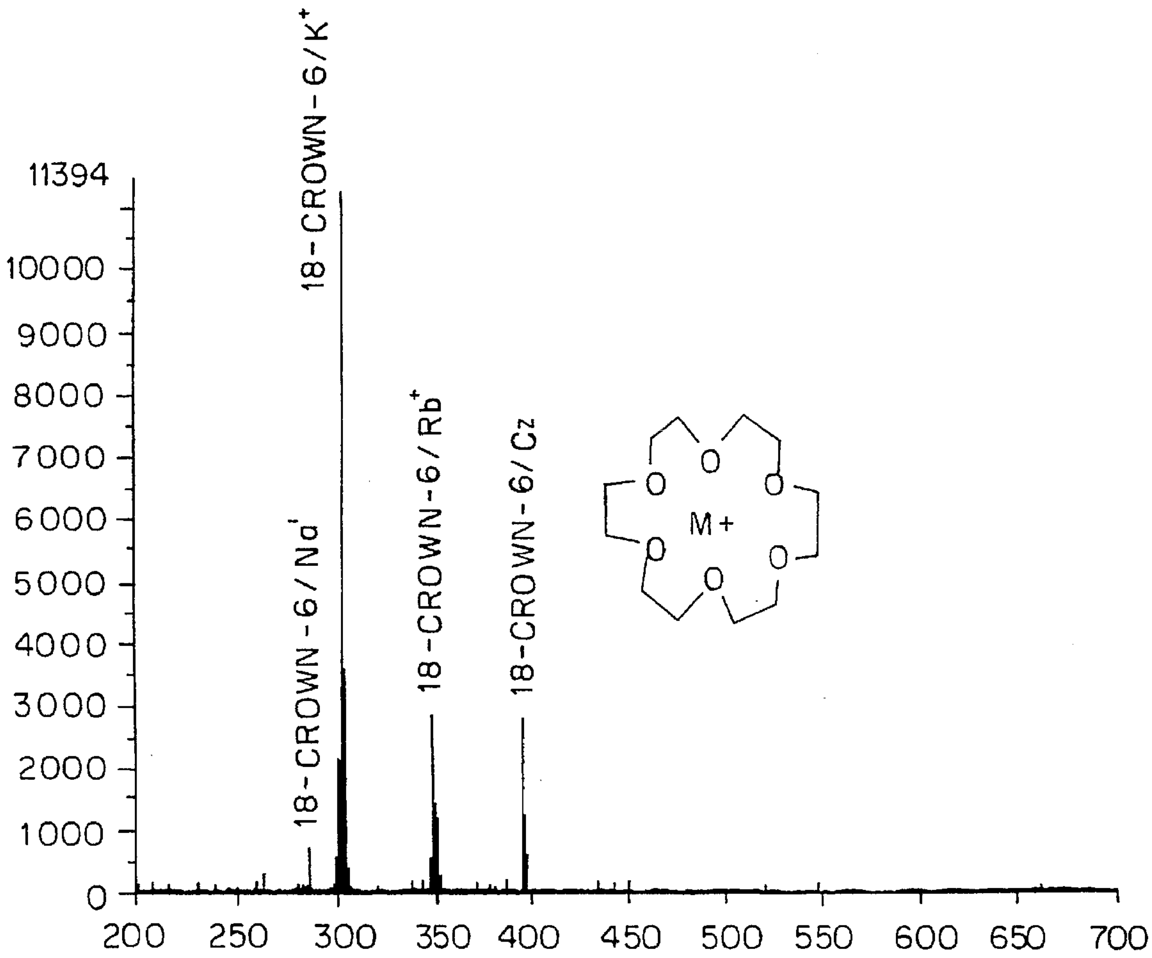
FIG. 5 is a graphical representation showing ESI-MS spectrum of 18-Crown-6 in water with 1:1:1:1 NaOAc, KOAc, RbOAc, CsOAc. $[M+Na]^+$ (m/z=287), $[M+K]^+$ (m/z=303, $[M+Rb]^+$ (m/z=349), $[M+Cs]^+$ (m/z=397).

Ion specificity of complexation of metals to polyether ligands by ESI-MS may also be provided according to the present invention. As a non-limiting example, FIG. 5 shows the complexation of a mixture of metal salts with 18-crown-6, a molecule known to have high specificity for K$^+$. One embodiment of the present invention lies in the discovery that not only do crown ethers, such as 18-crown-6, provide an excellent binding site for Na+ or K$^+$ but that neutral derivatives containing this group are readily prepared and purified, are stable and may be used as reagents or ESI-MS tags for the study of chemical reactions, such as those in solution.

ESI Tagging Reagents:

Chemical modification of functional groups by the introduction of chargeable groups may be used according to the present invention to detect compounds which are not normally detectable by ESI-MS.

Criteria for good tagging reagent.

First, the derivatization should be easy, fast and highly selective. Second, the tagged adduct must have high sensitivity for detection by ESI-MS. Finally the tagged molecules must be stable under ESI-MS conditions. Systematic design of tagging reagents for every type of neutral compound may be provided according to the present invention, based on the teaching and guidance presented herein, combined with the level of skill in the relevant arts.

According to the present invention, several types of tagging reagents, as non-limiting examples; have been synthesized, which may be used for diverse functionalities in methods of the present invention. The tagging reagent binds the compound to be detected and, optionally by association with an additional ion, such as a cation or anion, forms a tagged compound having a charge detectable using MS or ESI-MS.

A crown ether (metal binding site) and/or a tertiary amine (basic site) are two major structural features in one embodiment of tagging reagents according to the present invention. In one non-limiting example, compound 5, or an alkyl or aryl derivative thereof, is a dienophile for the derivatization and ESI-MS detection of vitamin D by introduction of a metal binding site.

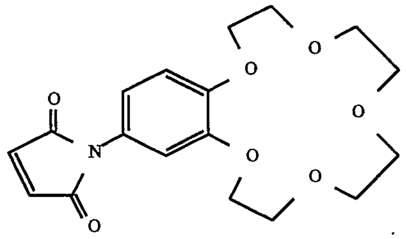

5

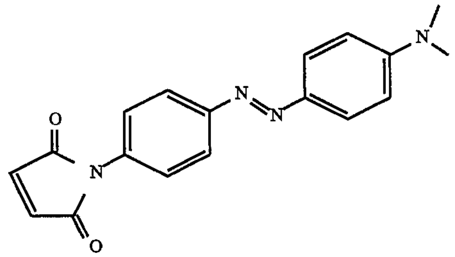

6

Figure 6A:
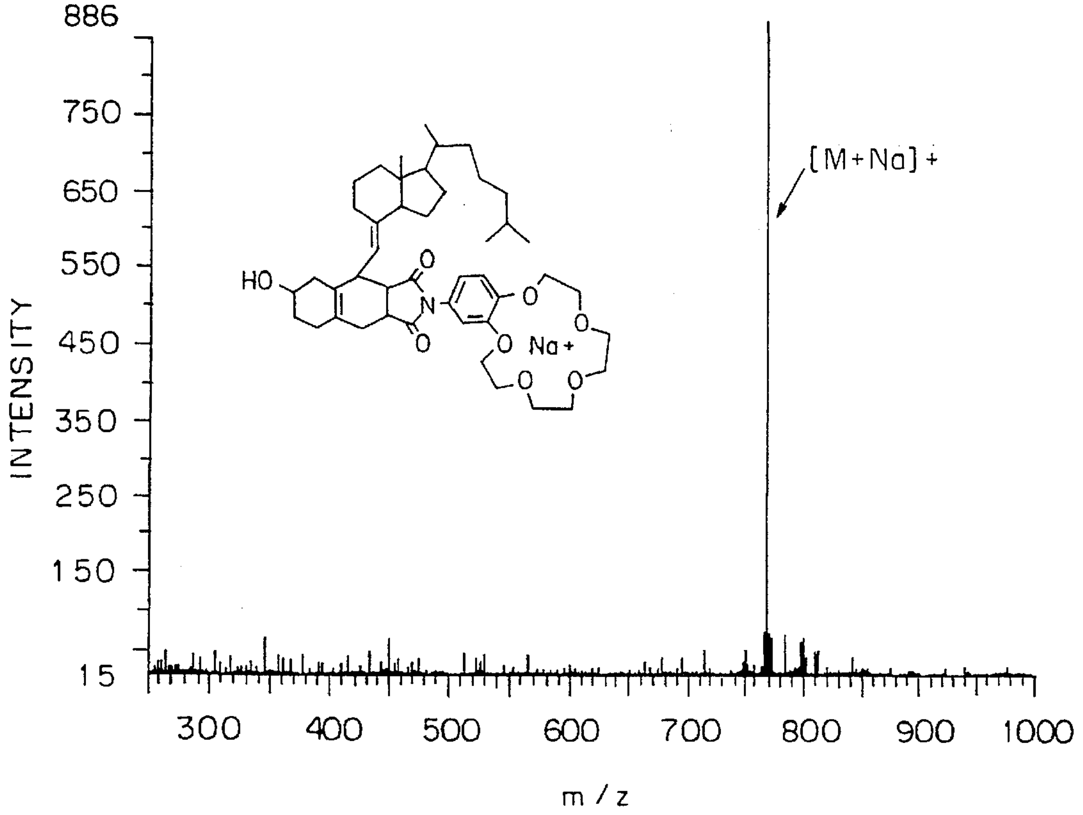
FIG. 6A–B: 6A is a graphical representation showing ESI-MS spectrum of vitamin D Diels-Alder adduct 7 (m/z=770) in $CH_3OH$ containing NaOAc. 6B is a graphical representation showing ESI-MS spectrum of vitamin D adduct with 6 (m/z=705) in $CH_3OH$ containing 5% acetic acid.
Figure 6B:
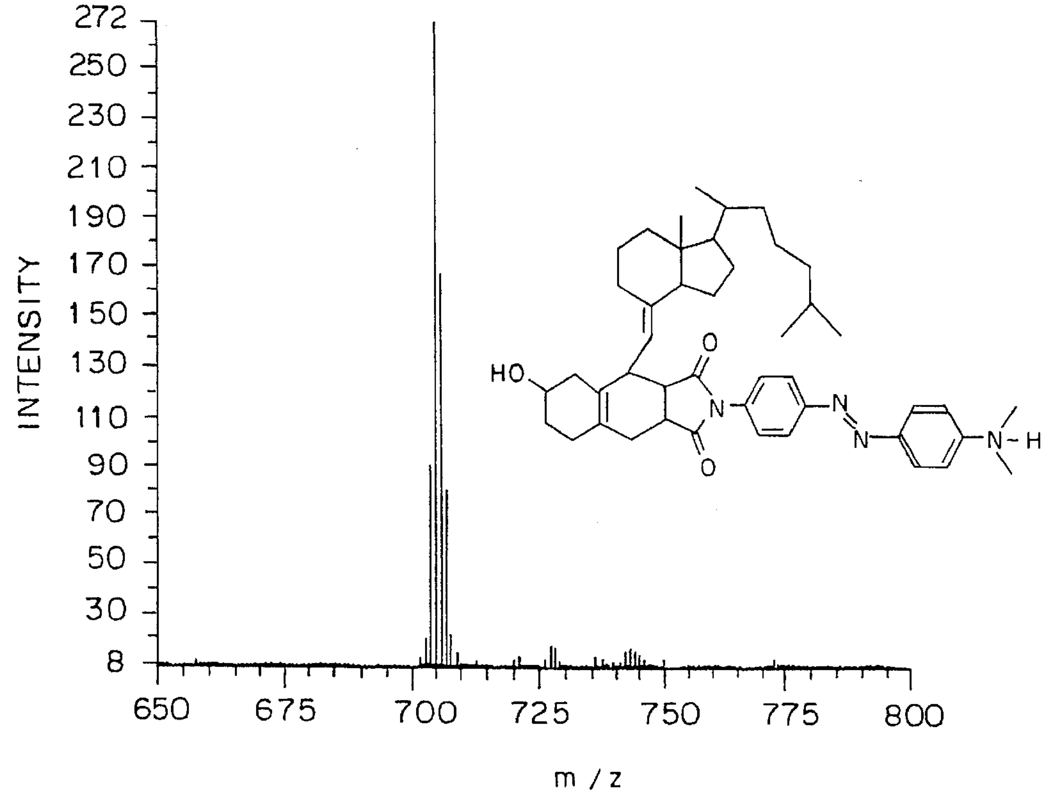

For example, compound 5 reacts with vitamin $D_3$ to produce adduct 7 (Eq. 4, FIG. 6A,B) (2d,13). In a similar manner, commercially available compound 6, or an alkyl or aryl derivative thereof, also undergoes a Diels-Alder reaction with vitamin D (FIG. 6B). Our studies showed that the derivatives from both compounds 5 and 6 had similar sensitivities, i.e. ≈1 pmol. Besides a Diels-Alder reaction with dienes, the maleimide compound 5 can also be used as an alkylating tagging agent for tagging peptides having the -SH group.

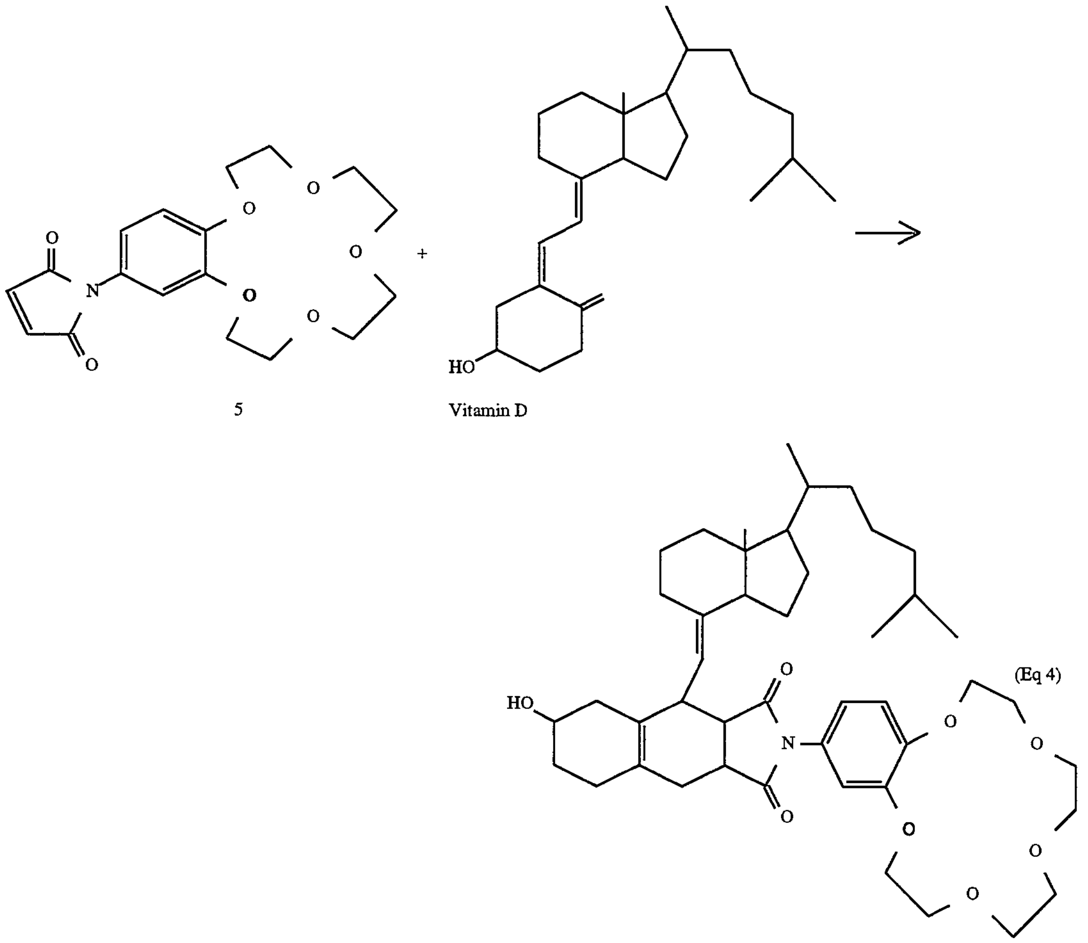

5 Vitamin D (Eq 4)

7

Figure 10:
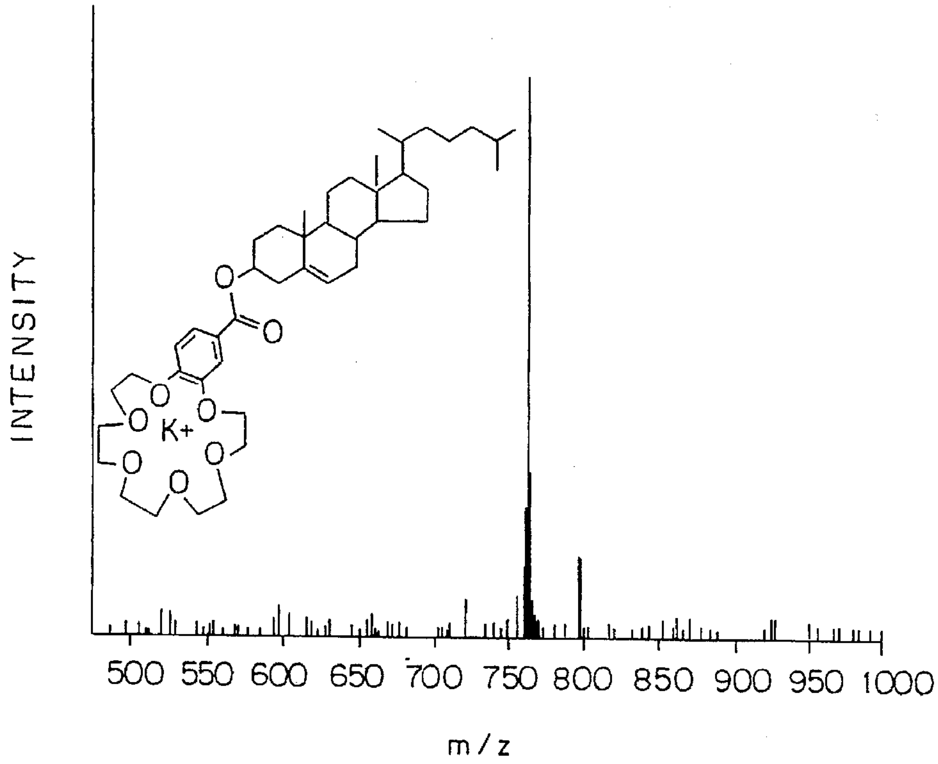
FIG. 10 is a graphical representation showing ESI-MS spectrum of ester derived from reaction of cholesterol with 11. The spectrum was taken in $C_6H_6$/$CH_3OH$ (1:1) containing KOAc. a. $[M+K]^+$ (m/z=763), b. $[M+K]^+C_3OH$ (m/z=795).

For molecules having hydroxyl groups, acid chloride reagent 11 my be used to form the esters which have the potential to be charged. FIG. 10 shows that cholesterol may be detected in this manner. Finally, peptide and amino acid detection systems using ESI-MS and can be adapted the well-known PITC (phenyl isothiocyatate) chemistry, according to the present invention, including peptide analysis and peptide sequencing. As a non-limiting example, crown-PITC reagent 12 is found to be useful for ESI-MS analysis of amino acids and peptides, as well as peptide sequencing, according to known method steps. As a non-limiting subexample, reaction of alanine with 12 gives a derivative that may be detected as its $Na^+$ adduct by ESI-MS.

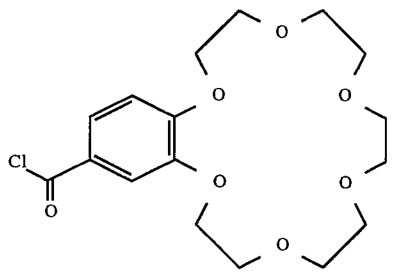

11

-continued

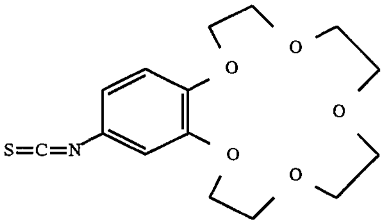

12

Accordingly, tagging reagents of the present invention my include any compound or composition that meets the criteria set forth herein. Examples of such tagging reagents may include crown ethers, acyl amines, alkyl amines, metal chelating agents (such as EDTA), cryptates, metal ligands (e.g. bipyridines) or compounds derivable from or analogous to compounds such as 2–6, 9 and 11–14, as presented herein, as non-limiting examples.

Fullerenes and Fulleroids

One of the most exciting recent developments in organic chemistry has been the discovery of a new form of carbon (besides diamond and graphite) called buckminsterfullerene ($C_{60}$), (8) (15,16). In a process first reported in 1991, "soot" may be produced which contains up to 10% $C_{60}$, accompanied by its relative $C_{70}$.

$C_{60}$ is readily available from commercial sources. One of the interesting features of the molecule, besides its unique soccer ball structure, is that $C_{60}$ is the only form of carbon that is a molecule. Another is that it is a rather reactive molecule; because of symmetry, there are 6 reactive double bonds. Unfortunately, for aspiring $C_{60}$ chemists, the compound does not have signals to detect by proton NMR so that mass spectrometry is the only high sensitivity tool for structural analysis. Other major problems are that $C_{60}$ is not very soluble and many of its derivatives are quite fragile and do not yield molecular ions even by laser desorption or FAB MS (17).

Figure 8:
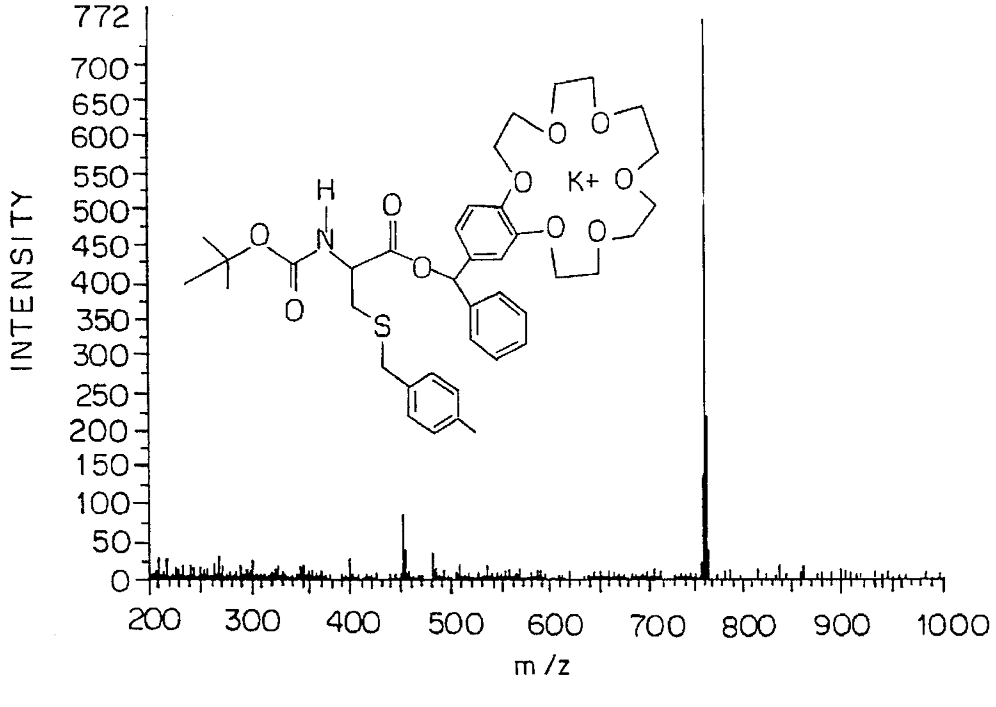
FIG. 8 is a graphical representation showing ESI-MS spectrum of ester generated in situ from Boc-Cys(4-$CH_3$-Bn)-OH and reagent 9 in $C_6H_6$. The spectrum was taken in 1:1 $C_6H_6$/ $CH_3OH$ containing KOAc (m/z=764).
Figure 9:
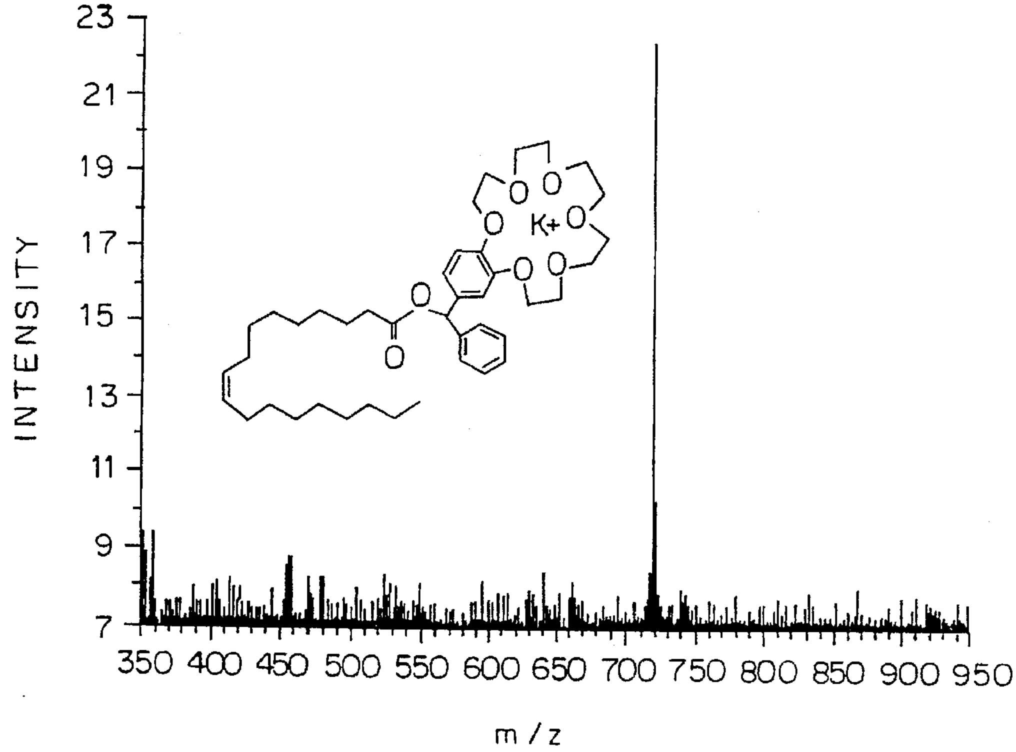
FIG. 9 is a graphical representation showing ESI-MS spectrum of ester generated in situ from oleic acid and reagent 9. The spectrum was taken in $C_6H_6$/$CH_3OH$ (1:1) containing KOAc (m/z=721).

Because of the need for new structure identification tools in this area, ESI-MS derivatization tagging reagents for fullerenes such as $C_{60}$ and $C_{70}$ have now been provided according to the present invention such that quantitative and/or qualitative tagging of these molecules, e.g., using crown ethers, such as diazomethane reagent 9 (Eq. 5), can be accomplished to provide ESI-MS analysis of such fullerene compounds and reactions thereof, without undue experimentation.

derivatization using reagent 9. For example, an N-protected amino acid (FIG. 8) or oleic acid (FIG. 9) can be detected in this manner in the positive mode. Preferably positive ion ESI-MS may be used with higher sensitivity and precision.

Surveying Chemical Reactions By ESI-MS according to the present invention:

According to the present invention, tagged derivatives may be used to follow other organic reactions in solution using compounds, such as drugs or other chemicals, by unobvious modification of known method steps (18) without undue experimentation.

ESI-MS according to the present invention my be used to survey reactions of the buckminsterfullerene molecule $C_{60}$ (8). For example, a tagged $C_{60}$ molecule designated "$C_{61}$ fulleroid" 10 (cf. Eq. 5) was produced in quantity and analyzed in solution using ESI-MS. It has been reported that $C_{61}$ fulleroids have practically identical chemical properties to $C_{60}$ (16g). Accordingly, compound 10 and related compounds according to the present invention my be routinely used to screen for chemical reactions of $C_{60}$ itself.

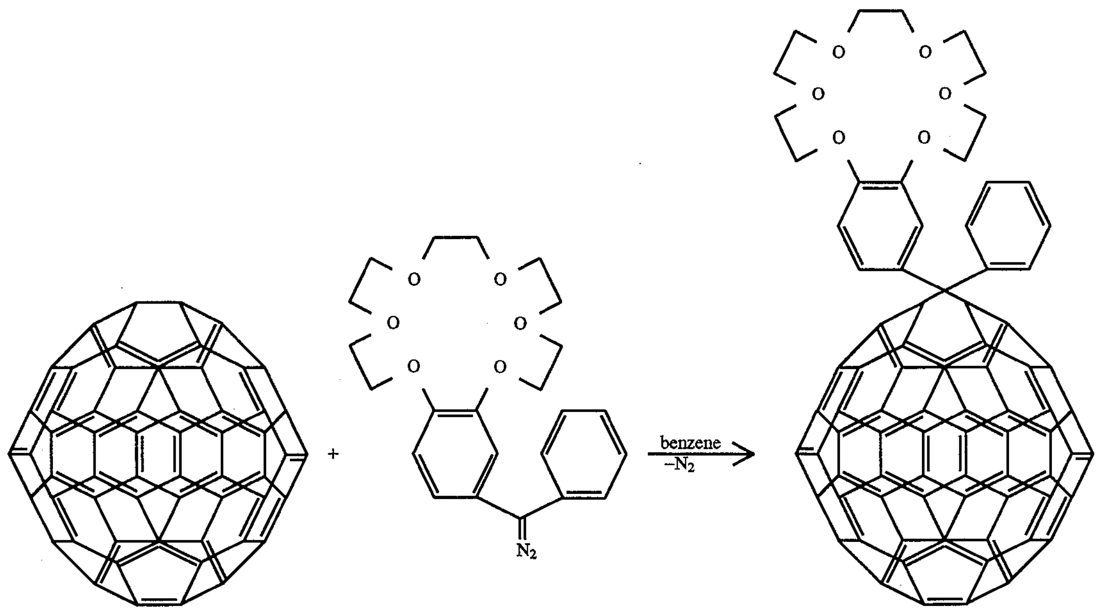

(Eq. 5)

8 9 10

Figure 7:
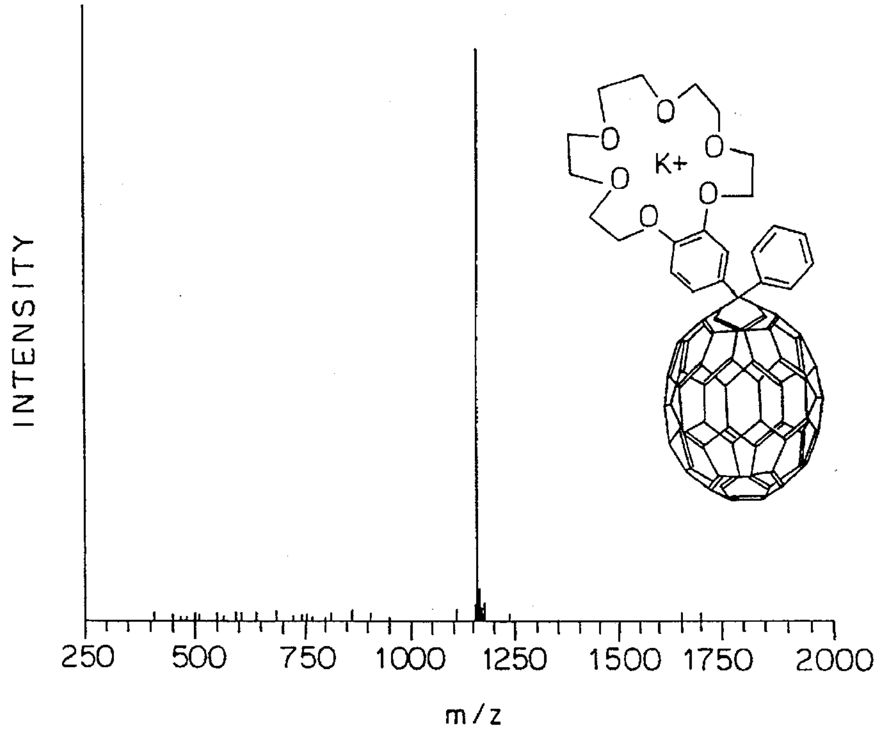
FIG. 7 is a graphical representation showing ESI-MS spectrum of $C_{61}$ Fulleroid 10 (m/z=1159) in 1:1 $C_6H_6$/$CH_3OH$ containing KOAc. The reaction of $C_{60}$ was carried out with tagging reagent 9 in benzene.

As a non-limiting example, the resulting derivative 10 gives very strong signals in ESI-MS (FIG. 7). Determination of $C_{60}/C_{70}$ ratios directly from soot is, e.g., possible using this technique (2h) according to the present invention.

Figure 11A:
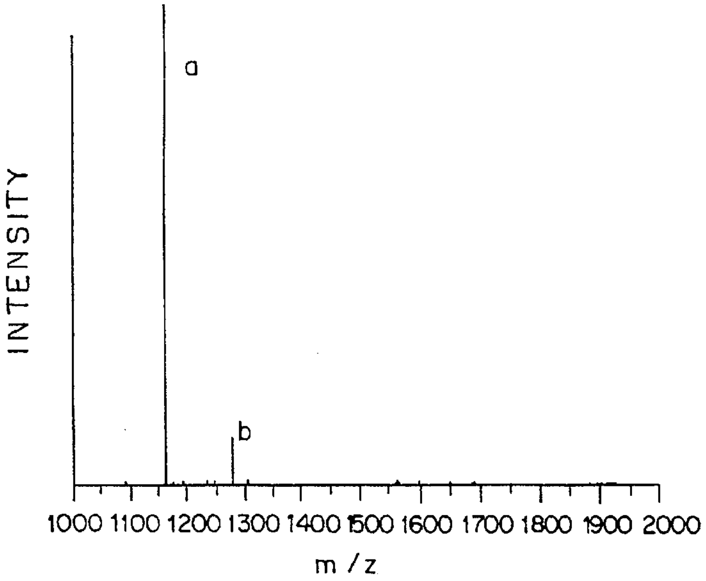
FIG. 11A–C is a graphical representation showing ESI-MS spectral time course for the reaction of $C_{60}$/$C_{70}$ adduct mixture (9:1 ratio of compound 9 and its $C_{70}$ analog, referred to below as $C_{61}X$ or $C_{71}X$ respectively) with vitamin D in $C_6H_6$. Aliquots were removed and diluted in $C_6H_6$/$CH_3OH$ (1:1) containing KOAc. Peak assignments: a. $C_61X$ (m/z=1159), b. $C_{71}X$ (m/z=1279), c. $C_{61}$ X - mono-vitamin D adduct (m/z=1543). d. $C_{71}X$ - mono-vitamin D adduct (m/z=1663). e. $C_{61}X$ - bis-vitamin D adduct (m/z=1927). 11A is the start of reaction. 11B represents stirring 20 hr at room temperature. 12C represents refluxing 4 hr (benzene).
Figure 11B:
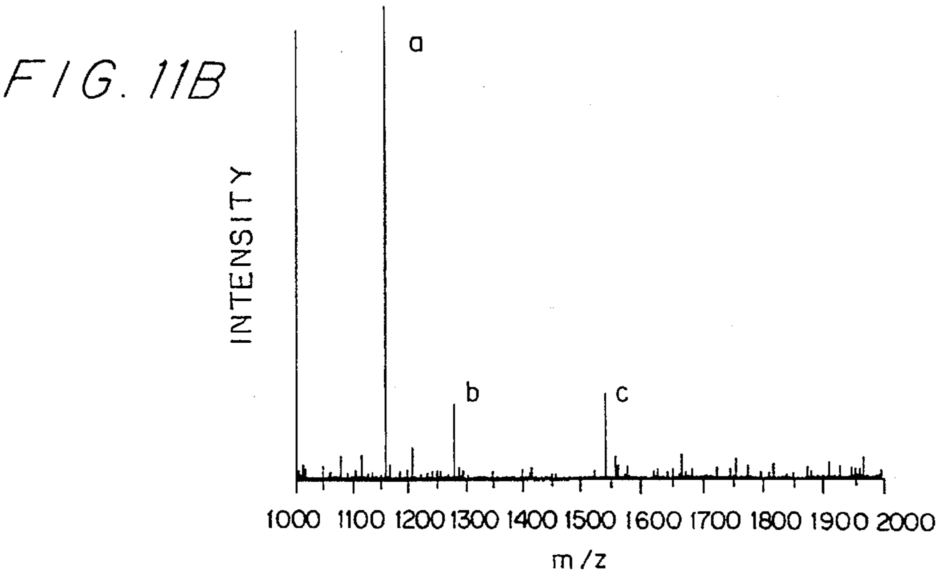
Figure 11C:
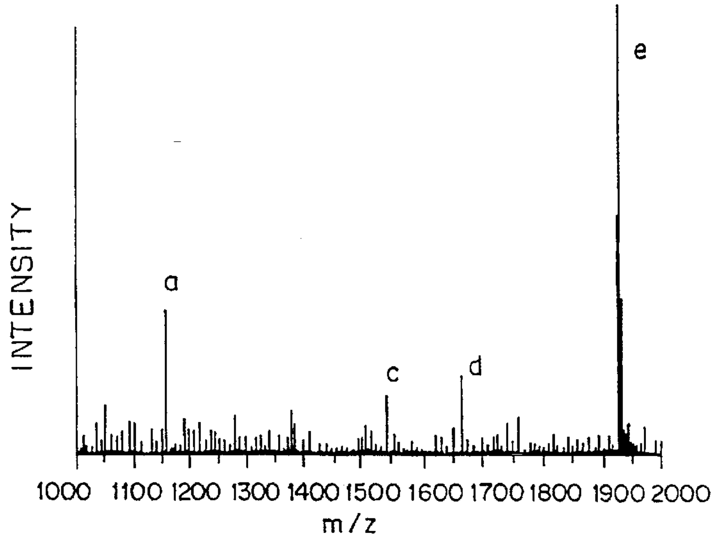
Figure 12A:
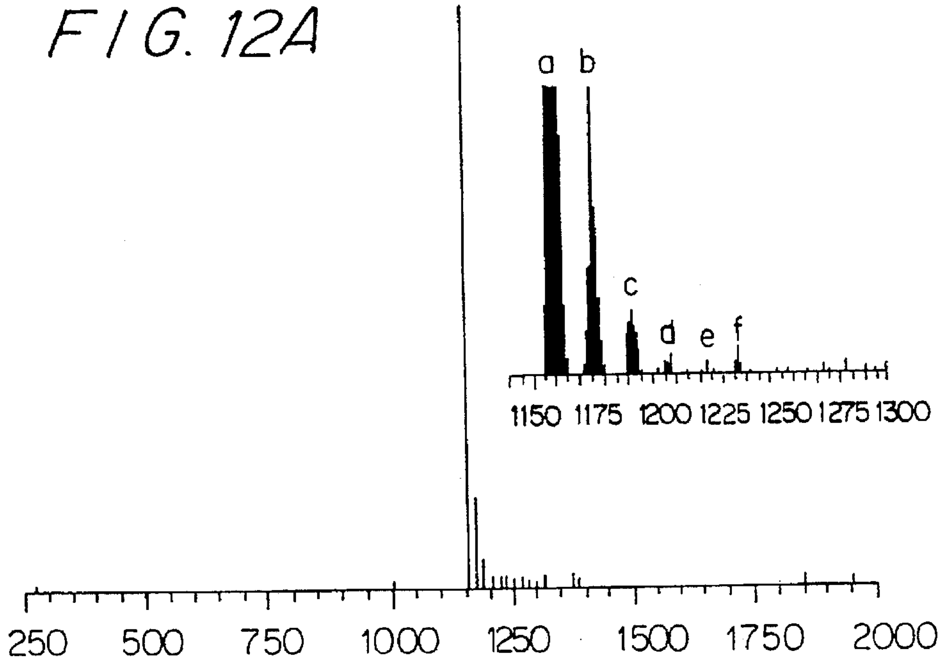
FIG. 12A–D is a graphical representation showing ESI-MS spectra for $C_{61}X$ Fulleroid 10 reaction products in $C_6H_6$/$CH_3OH$ (1:1) containing KOAc. M stands for compound 10. M/z values are in parentheses. 12A. Oxidation (basic alumina/air overnight). a. $[MK]^+$ (1159), b. $[MOK]^+$ (1175), c. $[MO_2K]^+$ (1191), d. $[MO_3K]^+$ (1207), e. $[MO_4K]^+$ (1223), f. $[MOK]^+$ (1239). 12B. Amination (neat I-Butyl amine, 4 hr.). a. $MO_nX_4K^+$, b. $MO_nX_5K^+$, c. $MO_nX_6K^+$, d. $MO_nX_7K^+$, e. $MO_nX_8K^+$, f. $MO_nX_9K^+$. X=isobutyl amine, n=0–5. 13C. Bromination (neat $Br_2$, 25°, 2 hr.). a. $[MBr_8K]^+$ (centered at 1805), b. $[MBr_{10}(CH_3OH)K]^+$ (centered at 1985). 12D. Hydroboration (excess $BH_3$-$OEt_2$ in $C_6H_5CH_3$, 25°, 2 hr.). a. $[MK]^+$ (1159), b. unknown (1180), c. unknown (1195), d. $[MO_2(BH_3)_3K]^+$ (1233), e. $[MO_3(BH_3)_3K]^+$ (1249), f. $[MO_4(BH_3)_3K]^+$ (1265).
Figure 12B:
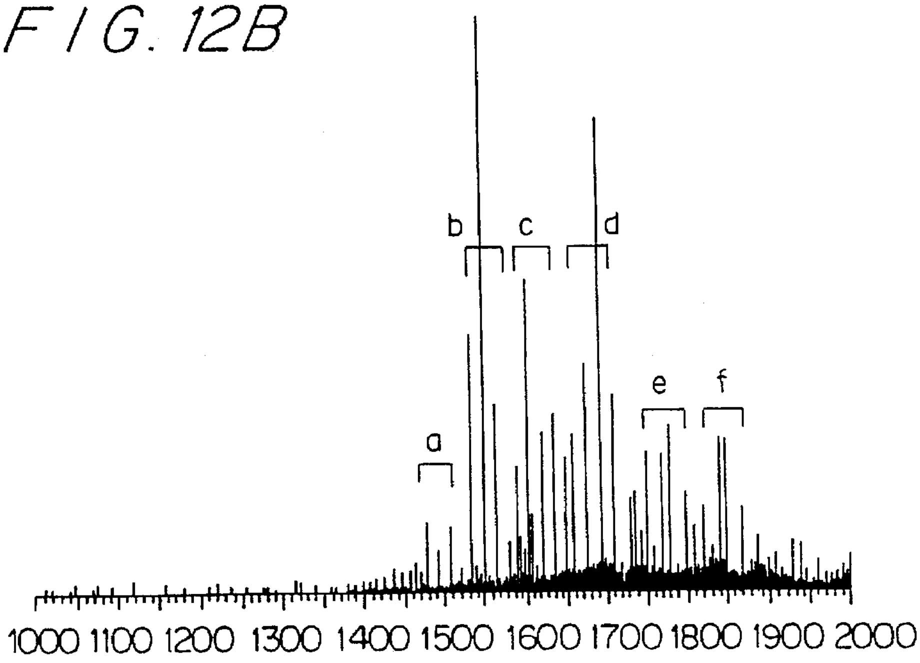
Figure 12C:
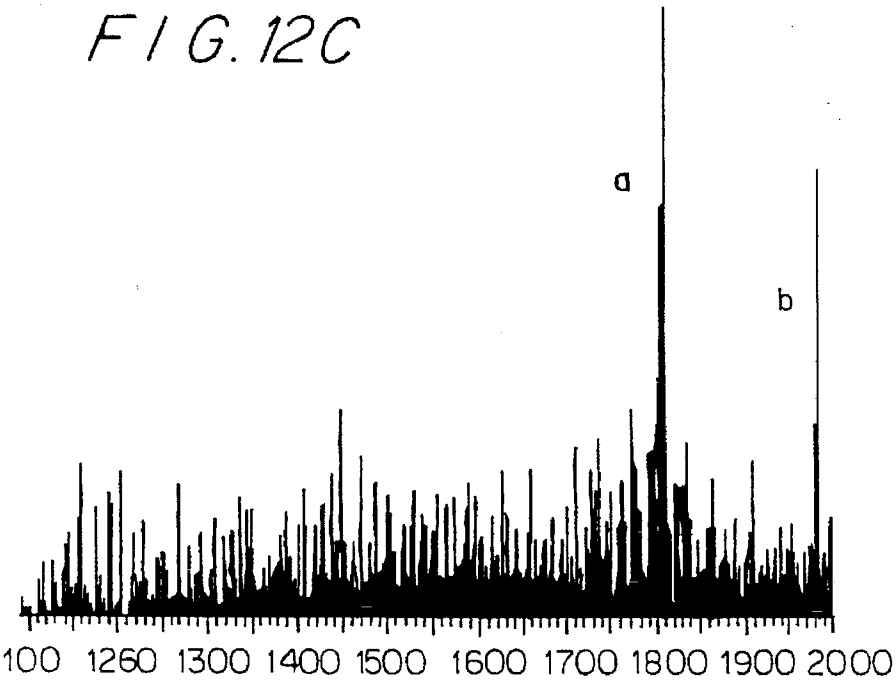
Figure 12D:
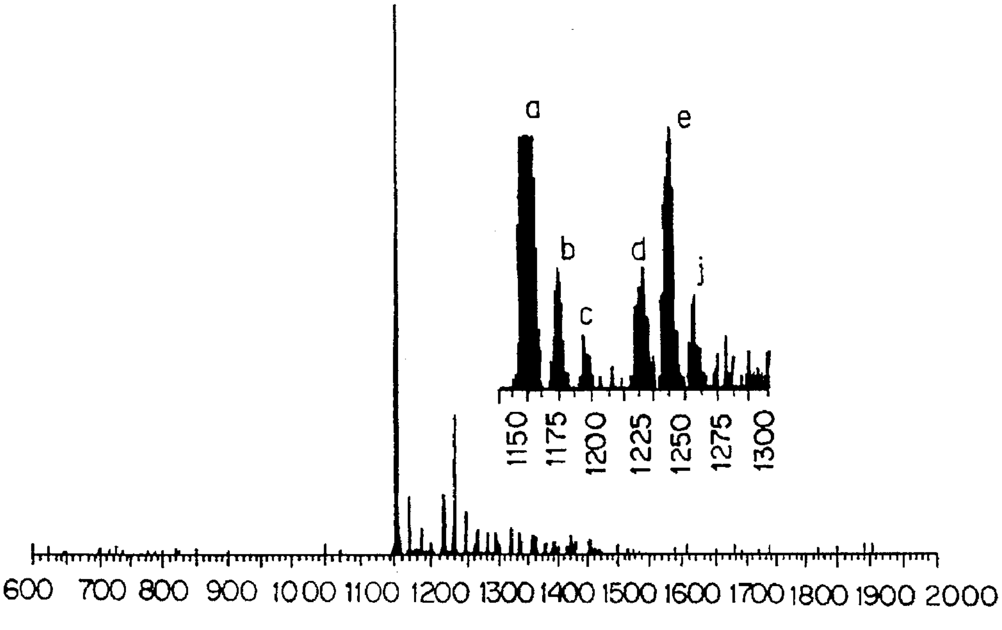

In addition, while carboxylic acids are detectable by negative ion ESI-MS, an alternative method involves their For example, the Diels-Alder reaction of $C_{61}$ fulleroid with vitamin $D_3$ my be monitored by ESI-MS (Eq. 6, FIG. 11A,B,C). The relative reactivity of the vitamin D diene was determined to establish that the reaction is not reversible, and to directly observe the reaction of one 15 (n=1) and then two 15 (n=2) vitamin D molecules with 10.

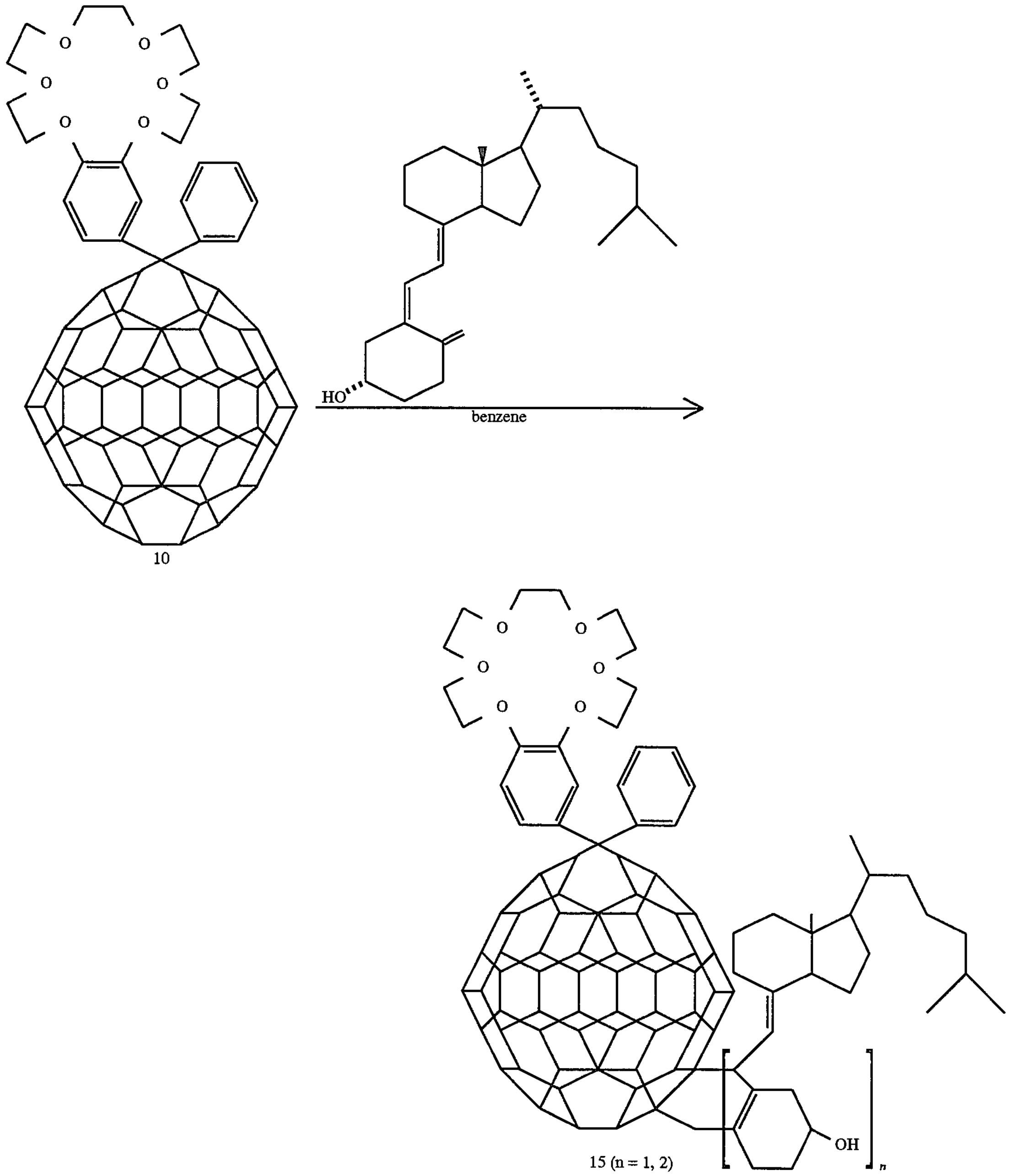

10

15 (n = 1, 2)

(Eq. 6)

With $C_{61}$ fulleroid 10, many reactions that have been previously reported for $C_{60}$ as well as new reactions are detectable according to methods of the present invention. Its reaction with $O_2$ (19), amines (16b), bromine (20) and borane (21) were readily analyzed according to methods of the present invention (FIG. 12A–D). The reaction my be followed in solution and the product distribution directly observed. For example, the reaction of $C_{61}$ fulleroid 10 with 1,3-dipoles such as d-methylbenzyl azide (Eq. 7) was carried out with good results.

10 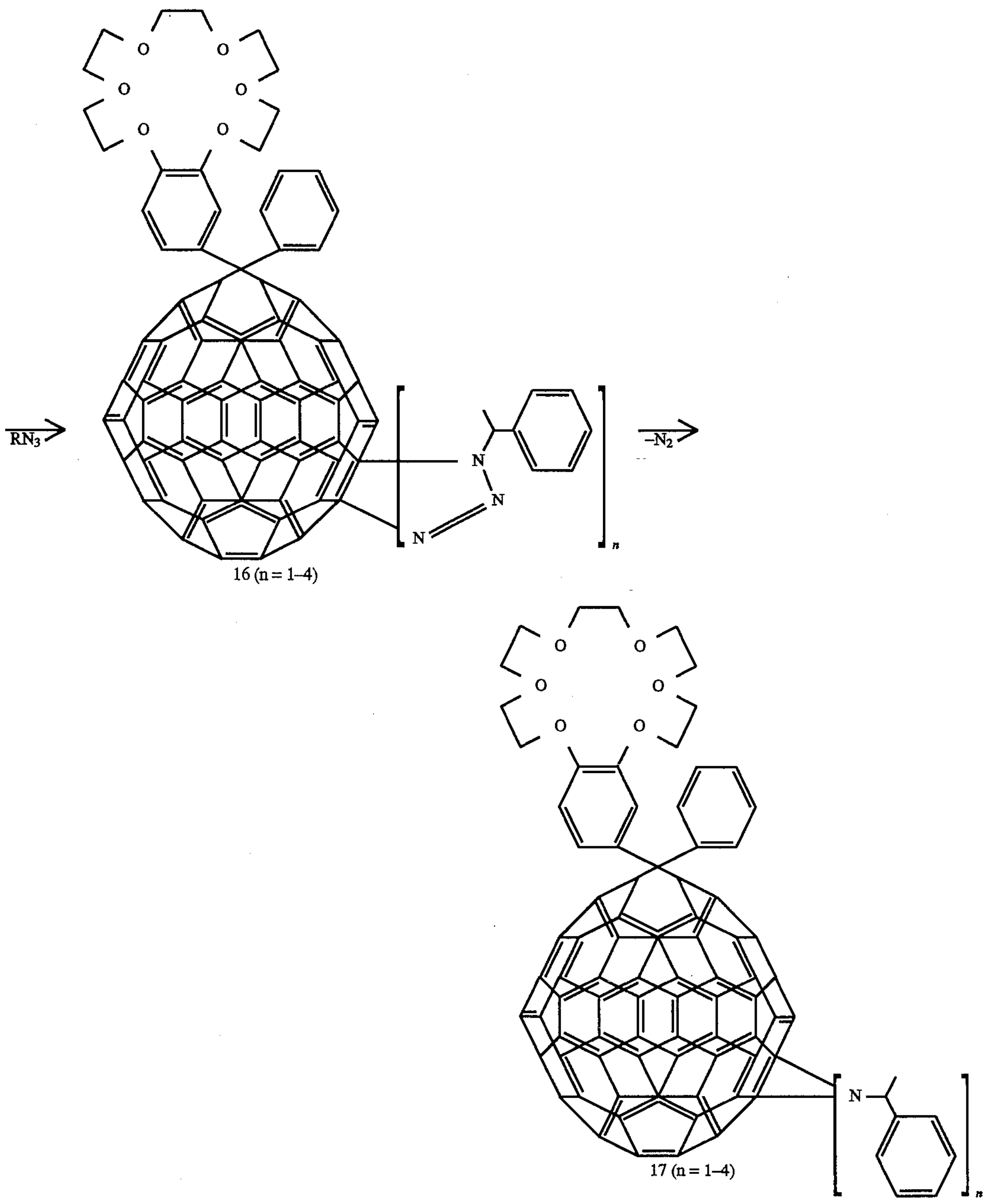

16 (n = 1–4)

17 (n = 1–4)

(Eq. 7)

Figure 13A:
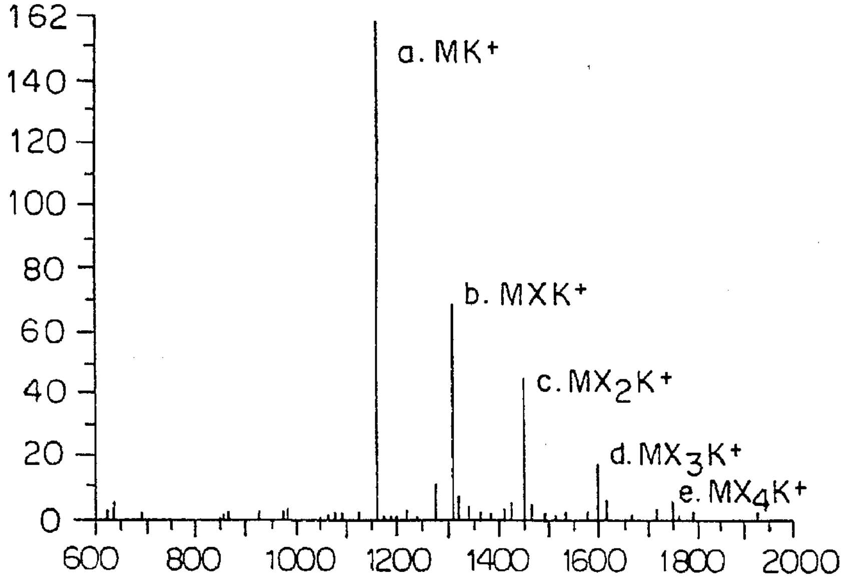
FIG. 13A–C is a graphical representation showing ESI-MS spectral time course for the 1,3-Dipolar addition of addition of -methylbenzyl azide to $C_{61}$ Fulleroid 10 in $C_6H_6$ for A and B and in $C_6H_5CH_3$ for C. Aliquots were taken and diluted in $C_6H_6$/$CH_3OH$ (2:1) containing KOAc. M stands for $C_{61}$ Fulleroid 10 and X for α-methylbenzyl azide. 13A. 22 hr, 65°. a. $[MK]^+$ (1159), b. $[MXK]^+$ (1306), c. $[MX^2K]$+ (1453), d. $[MX_3K]^+$ (1600), e. $[MX_4K]^+$ (1747). 13B. 30 hr, 65°. f. $[(MX-N_2)K]^+$ (1278), g. $[(MX_2-N_2)K]^+$ (1425), h. $[(MX_3-N_2)K]^+$ (1572). 13C. 20 hr, 100°. i. $[(MX_2-2N_2)K]^+$, j. $[(MX_3-3N_2)K]^+$ (1514), k. $[(MX_3-2N_2)K]^+$ (1542).
Figure 13B:
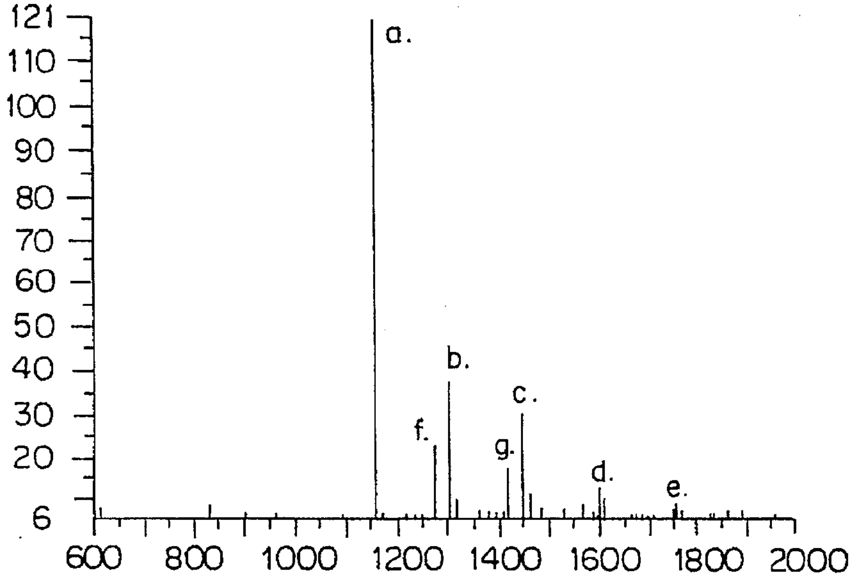
Figure 13C:
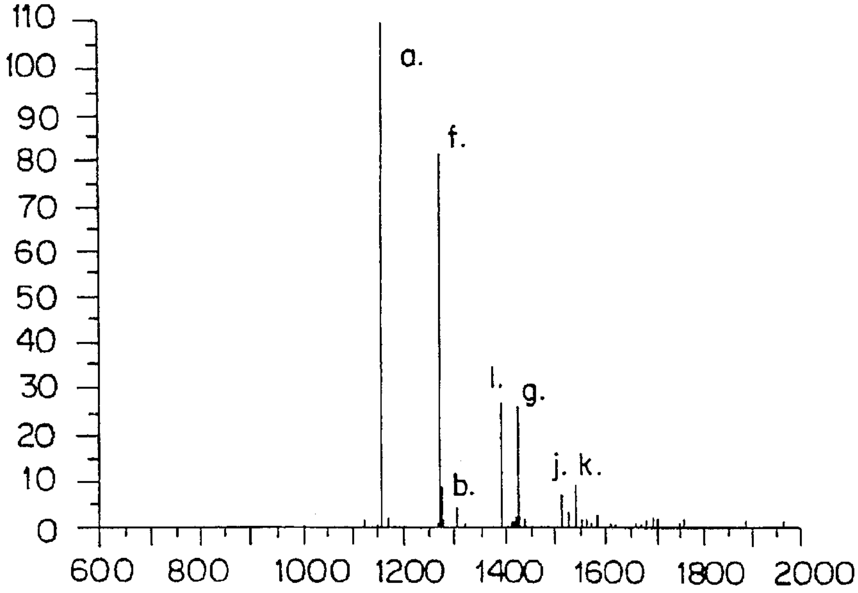
Figure 14:
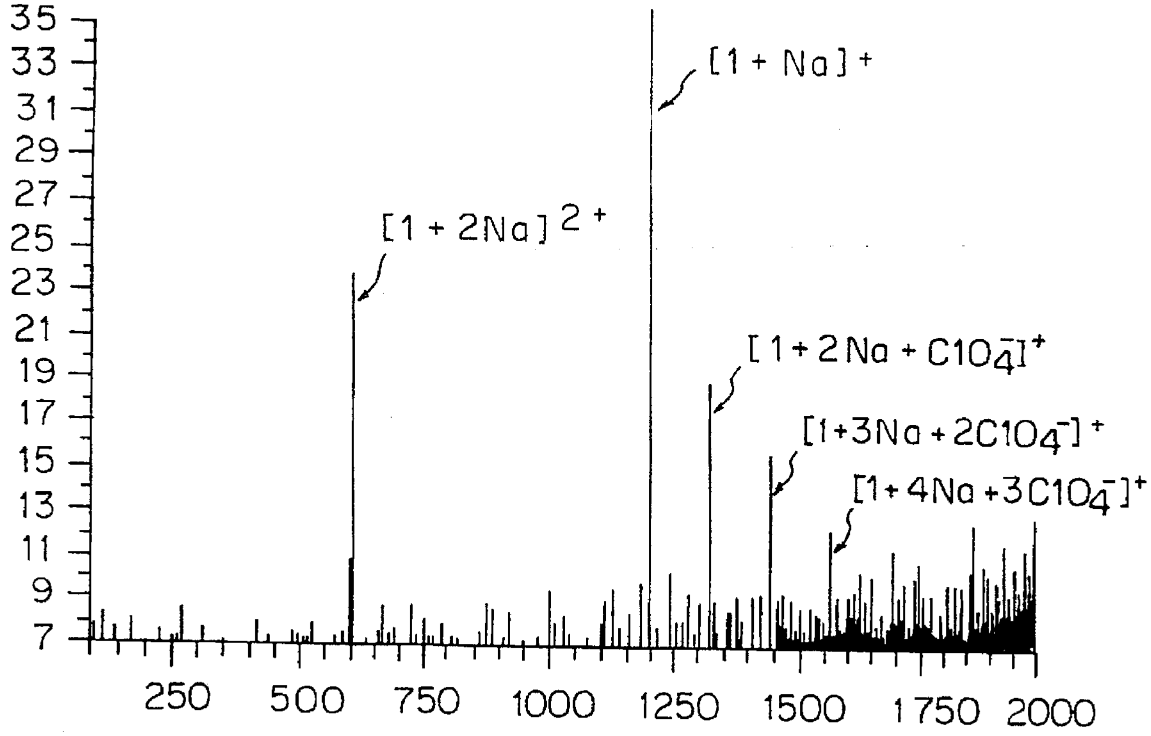
FIG. 14 is a graphical representation showing compound 1 in $10^{-4}$M in methanol containing excess $NaClO_4$.

Several pathways for the reaction may be analyzed using ESI-MS according to the present invention and observed as a function of time and/or temperature. For example, initially a-methylbenzyl azide adds one, two, three and/or four times (FIG. 13A), without expulsion of nitrogen to yield 16 (n=1–4). At longer times (FIG. 13B), loss of nitrogen may be observed 17 (n=1). On heating at higher temperatures, the multiple adducts lose one or more moles of N2 to produce the expected distribution of aziridine adducts.

Accordingly, ESI-MS methods according to the present invention not only provide superior analysis of biopolymers, but also characterization of small neutral organic molecules. We have shown that the rational design of tagging reagents can eliminate the ESI-MS limitation with regard to type of analyte. Using suitable strategies applications of ESI-MS to organic chemistry, organic reaction mechanisms and drug metabolism are expected to be greatly improved.

APPLICATIONS OF ELECTROSPRAY MS TO ORGANIC CHEMISTRY

According to the present invention, ESI-MS is now provided for studying such small organic molecules, including fullerenes and fulleroids.

Many suitable tagging reagents for ESI-MS analysis of small organic molecules, such as fullerenes and fulleroids are also provided according to the present invention. The basic method involves the use of tagging reagents for identification of compounds in solution by ESI-MS For example, the process of reagent R* with $C_{60}$ forming adduct $C_{60}$r.

$C_{60}$+R* --->$C_{60}$_R--->Detection by Electrospray

Electrospray of fullerenes or fulleroids, e.g. as "tagged" Buckyballs ($C_{60}$) provides analysis of their chemical reactivity. As a non-limiting example, the detection of $C_{60}$ itself was done as follows. $C_{60}$ dissolved in toluene was reacted with reagent A to form adduct 2.

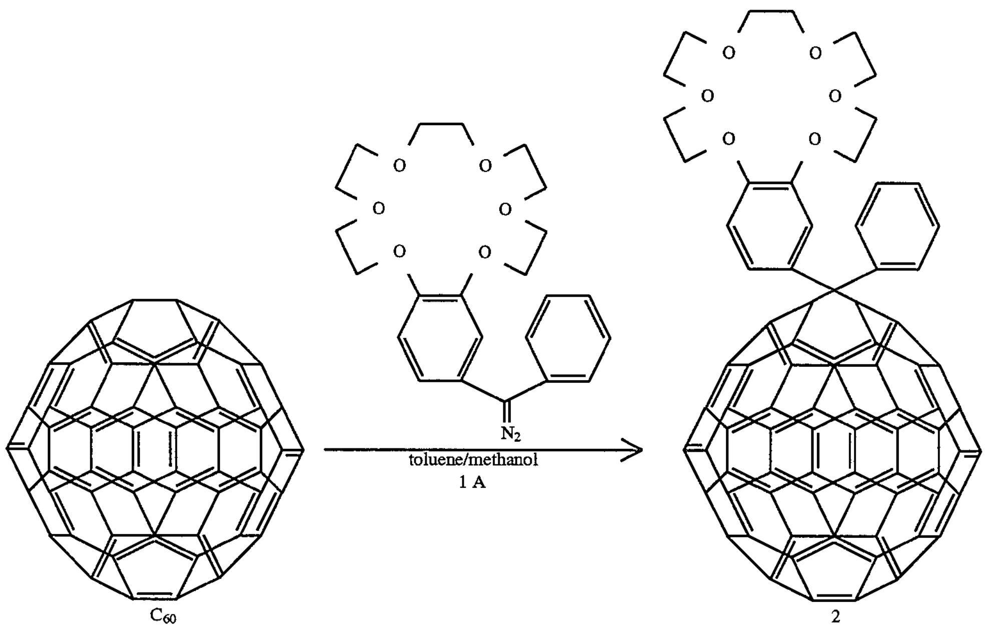

$C_{60}$

2

(Eq. 7A)

A solution of $10^{-m}$ of adduct 2 in toluene/methanol containing $10^{-3}$ MKOAc was injected at 5 µL/min to give the electrospray spectrum shown in FIG. 7. This spectrum shows only one peak at mass/charge (m/z) of 1157 corresponding to [2+K+].

The spectrum shown in FIG. 7 corresponds to about 5 picomole of the $C_{60}$ compound. An ESI-MS method of the present invention allows for the first time convenient detection and identification of fullerenes, fulleroids and their relatives in extremely low concentrations in mixture samples and a simple method for following derivatization reactions and characterization of the products.

Under examination of electrospray we see in many cases a clear picture of the intimate details of Buckyball reactions and we have used this technique to study many new reactions of $C_{60}$, such as, but not limited to those in Table I.

TABLE 1

| Reactions of Buckyballs by Electrospray |
| --- |
| Diels-Alder |
| Oxidation |
| Bromination |
| Hydroboration |
| 1,3-Dipolar Addition |
| Metal Complexation |
| Photocycloaddition |
| Michael Addition |
| Silylation |

Figure 21A:
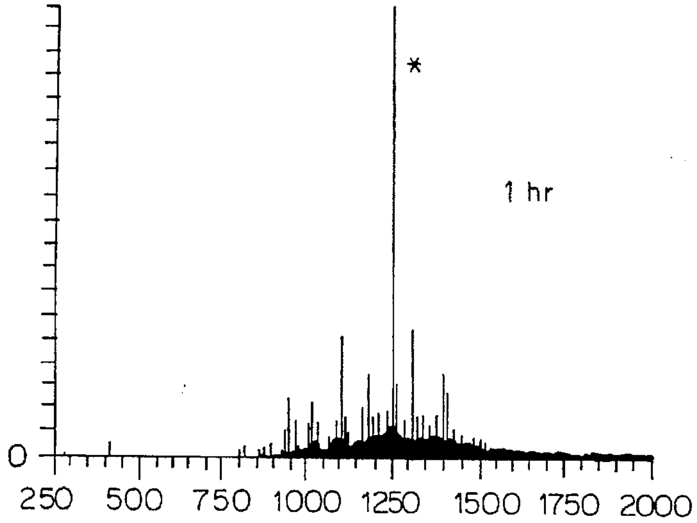
FIG. 21A–C is a graphical representation showing the progress of the reaction of $C_{60}$ with i-$BuNH_2$ (neat) at 25° C. ESI/MS spectra of ~$10^{-4}$M solution in 1:1 toluene-methanol with 2.5% TFA. Compound assigned as $C_{60}O_6$ (i-$BuNH_2)_6$ is labeled with *.
Figure 21B:
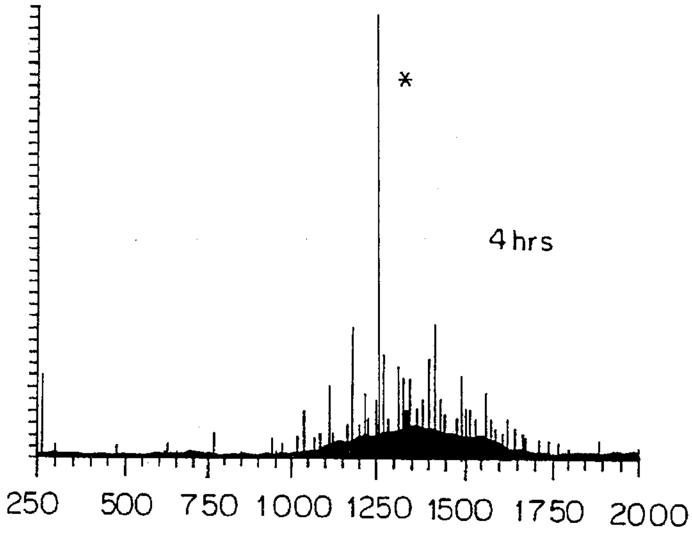
Figure 21C:
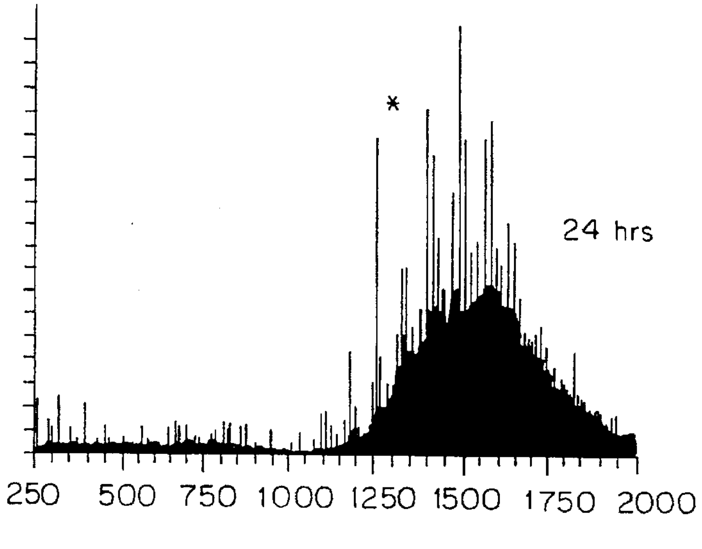

We have observed three types of chemical processes for fullerenes, such as $C_{60}$. The first shown in FIG. 21A–C is the "Myriad" type, where a large number of products are formed and seem to increase in density with time. The type if FIG. 33 is a "Consecutive" type, where several products are formed and then a second reaction occurs that can be observed from each product. Finally, the type in FIG. 29 is the "Multi" type where the $C_{60}$ molecule reacts multiple times and appears to continue producing products of higher molecular weight until they are out of the range of our instrument.

Non-limiting examples of such reactions are presented in FIG. 24A–D as oxidations, aminations, bromination and hydrobromination.

Electrospray provides a window on the progress of each reaction type and allows us to see in great detail many subtle chemical traits that Buckyball and its synthetic cousins display.

FULLEROIDS:

Using methods according to the present invention, new families of fulleroids have been synthesized and characterized as compounds according to the present invention.

According to the present invention a fulleroid compound is provided according to formula (I):

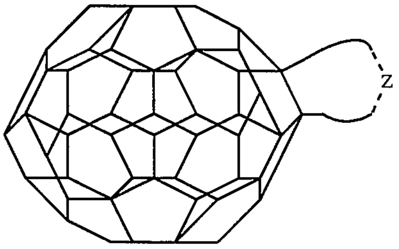

(I)

wherein Z is N, $C_1$–$C_{20}$ substituted or unsubstituted alkyl or acyl, $C_1$–$C_6$ substituted or unsubstituted aryl, substituted or unsubstituted heterocyclic of 4 to 8 members selected from O, N, C, or S, wherein the substitution is at least one selected from $C_1$–$C_{20}$ substituted or unsubstituted alkyl or acyl, $C_1$–$C_6$ substituted or unsubstituted aryl substituted or unsubstituted heterocyclic of 2 to 8 members selected from O, N, C, or S, and wherein n is 1–7 and X is hydrogen or a tagged reagent according to the present invention.

Compounds according to formula (I) may be synthesized according to known method steps based on the teaching and guidance presented herein without undue experimentation. See e.g., *COMPREHENSIVE ORGANIC SYNTHESIS*, Trost ed. Pergamon Press, New York (1991), which is entirely incorporated by reference herein.

Fulleroid compounds according to formula (I) of the present invention are discovered to be formed by reactions including, but not limited to 2+2 photocycloaddition, 1,3-dipolar addition and Diels-Alder reaction.

1,3-dipolar addition of compounds according to formula (I) include Z, wherein Z is included, the group consisting of nitrile, ylides, nitrile imines, nitrile oxides, diazoalkanes, azides, nitrous oxide, and 1,3-dipolar addition of the propargylallenyl type; azomethine ylides, azomethine imines, nitrones, azimines, azoxy compounds, nitro compounds, carbonyl ylides, carbonyl imines, carbonyl oxides, nitrosimines, nitrous oxides, and ozone, as 1,3-dipoles of the allyl type. Such 1,3-dipole presented in Table 2

TABLE II

Intermolecular 1,3-Dipolar Cycloadditions
Classification of 1,3-Dipoles Consisting of Carbon, Nitrogen and Oxygen Centers

| | | |
|---|---|---|
| | Propargyl-Allenyl Type | |
| Nitrilium betaines | 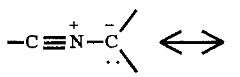 | Nitrile ylides |
| | 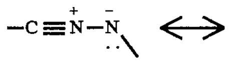 | Nitrile imines |
| | 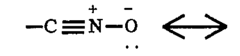 | Nitrile oxides |
| Diazonium betaines | 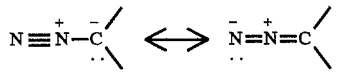 | Diazo-alkanes |
| | 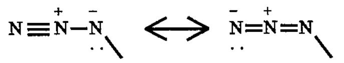 | Azides |
| | 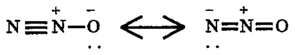 | Nitrous oxide |
| | Allyl Type | |
| Nitrogen function as middle center | 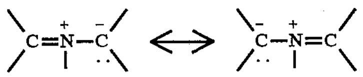 | Azo-methine ylides |
| | 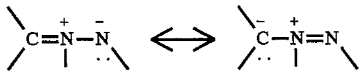 | Azo-methine imines |
| |  | Nitrones |
| | 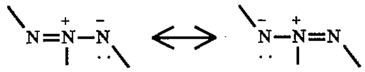 | Azimines |
| | 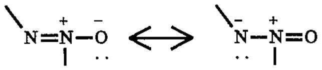 | Azoxy compounds |
| | 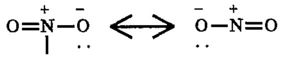 | Nitro compounds |

TABLE II-continued

Intermolecular 1,3-Dipolar Cycloadditions
Classification of 1,3-Dipoles Consisting of Carbon, Nitrogen and Oxygen Centers

| | | |
|---|---|---|
| Oxygen atom as middle center |  | Carbonyl ylides |
| | 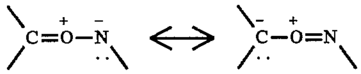 | Carbonyl imines |
| |  | Carbonyl oxides |
| |  | Nitros-imines |
| |  | Nitros-oxides |
| | 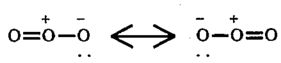 | Ozone |

such that 1,3-dipolar addition to fullerenes to provide fulleroid compounds according to formula (I), such as fulleroids according to formulas (II), (IV) and/or (V), according to known method steps. See, e.g., *COMPREHENSIVE ORGANIC SYNTHESIS*, supra.

A fulleroid compound according to formula (I) is also provided, wherein said compound is according to formula (II):

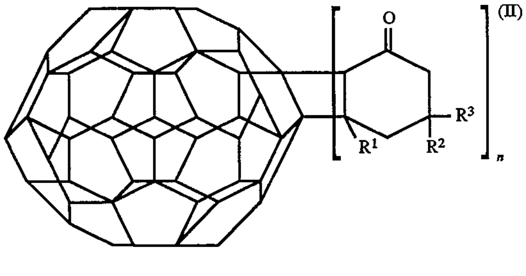

(II)

wherein $R^1$, $R^2$ and $R^3$ are the same or different, as hydrogen, substituted or unsubstituted $C_1$–$C_{20}$ alkyl or acyl which can be substituted with alkyl, acyl or phenyl groups and wherein n is 1–7 and X is hydrogen or a tagged reagent according to the present invention.

Such fulleroid compounds according to formula (II) are enones. Synthesis of fulleroid enones according to formula (II) can be accomplished by 1,3-dipolar addition, according to known method steps. Alternatively fulleroid enones according to formula (II) can be provided by reacting a fullerene according to the following reactions as presented in FIGS. 29 and 30 according to known method steps. See, e.g., *COMPREHENSIVE ORGANIC SYNTHESIS*, supra, and Vol. 5, p125 ff.

A fulleroid compound according to formula (I) is further provided, wherein said compound is according to formula (III):

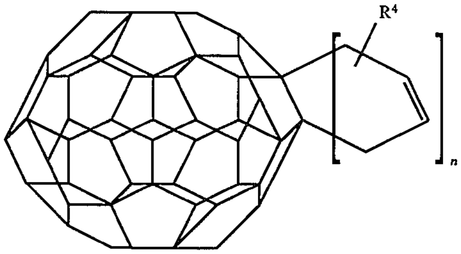

(III)

wherein $R^4$ is hydrogen; substituted or unsubstituted $C_1$–$C_{20}$ alkyl or acyl which can be substituted with alkyl acyl or phenyl groups, and wherein n is 1–7 and X is hydrogen or a tagged reagent according to the present invention.

Diels Alder reactions may be used to provide a fulleroid compound according to formula (III) according to the present invention by reaction of a fullerene at room temperature in $CHCl_3$ for 20 hours, optionally with refluxing in benzene.

Figure 26:
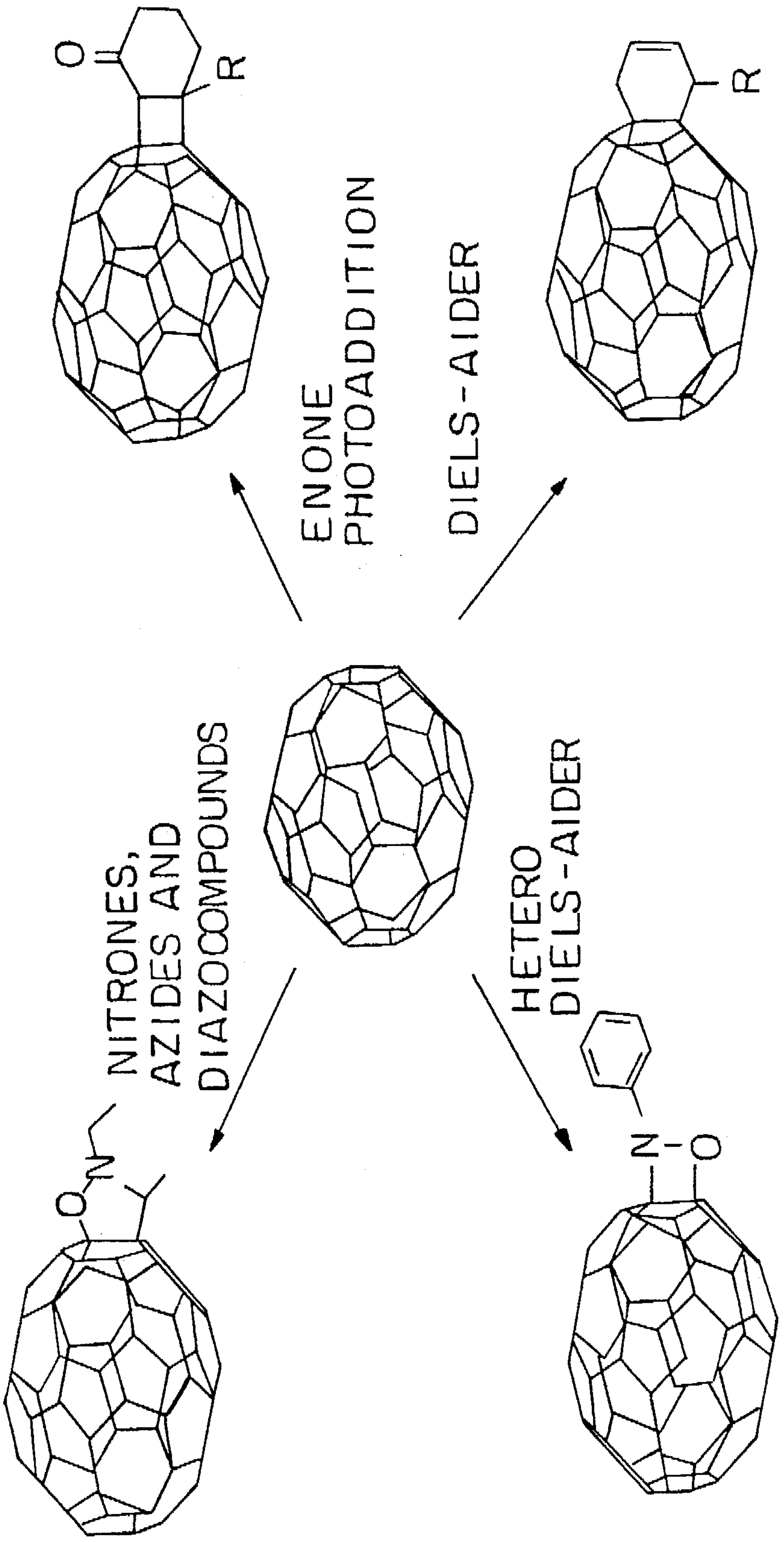
FIG. 26 is a graphical representation showing $C_{60}$ cycloaddition chemistry. Electrospray studies indicate $C_{60}$ undergoes most cycloadditions of synthetic interest, such as 2+2 photocycloaddition, 1,3 -dipolar addition and Diels-alder reactions.
Figure 27D:
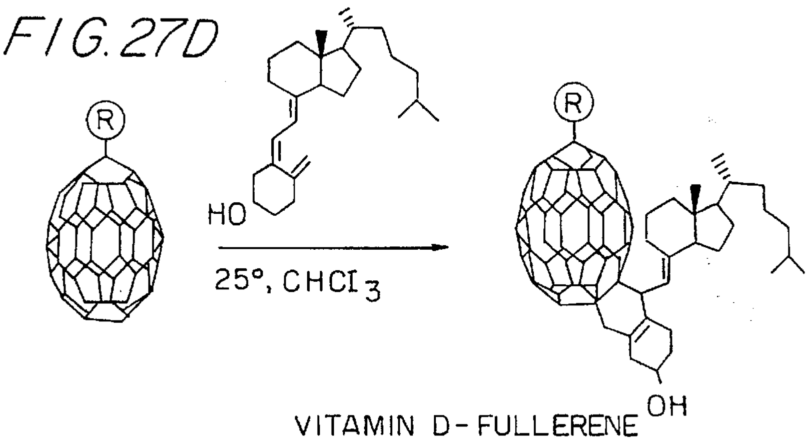
FIG. 27A–D is a graphical representation showing ESI-MS spectral time course for the reaction of $C_{60}$/$C_{70}$ adduct mixture (9:1 ratio of compound 9 and its $C_{70}$ analog, referred to below as $C_{61}X$ or $C_{71}X$ respectively) with vitamin D in $C_6H_6$. Aliquots were removed and diluted in $C_6H_6/CH_3OH$ (1:1) containing KOAc. Peak assignments: a. $C_{61}X$ (m/z=1159), b. $C_{71}X$ (m/z=1279), c. $C_{61}X$-mono-vitamin D adduct (m/z=1543). d. $C_{71}X$ - mono-vitamin D adduct (m/z=1663). e. $C_{61}X$ - his-vitamin D adduct (m/z=1927).
Figure 27A:
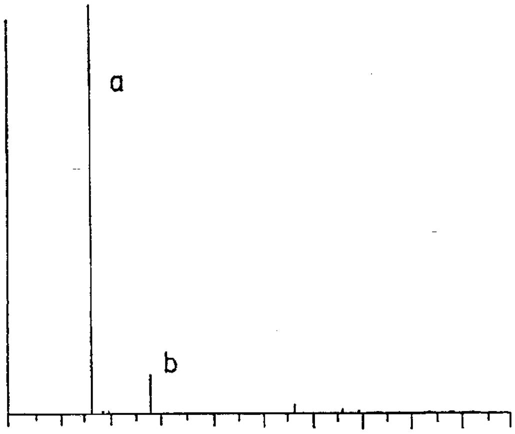
Figure 27B:
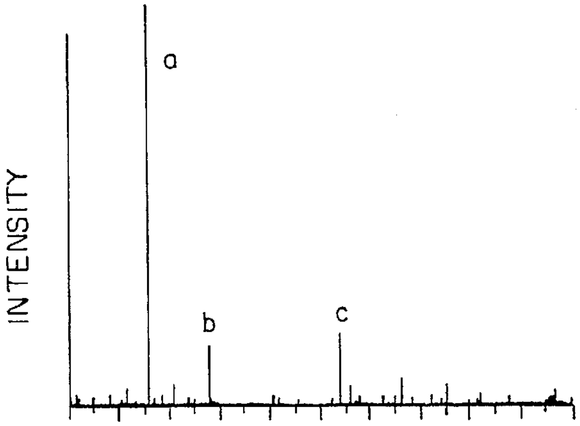
Figure 27C:
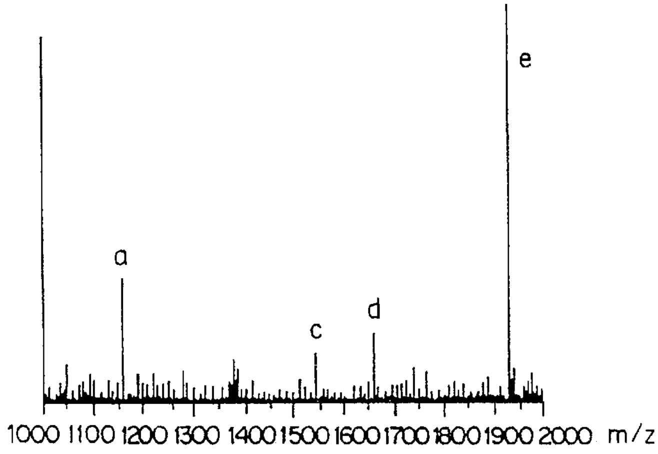
Figures 28A, 28B:
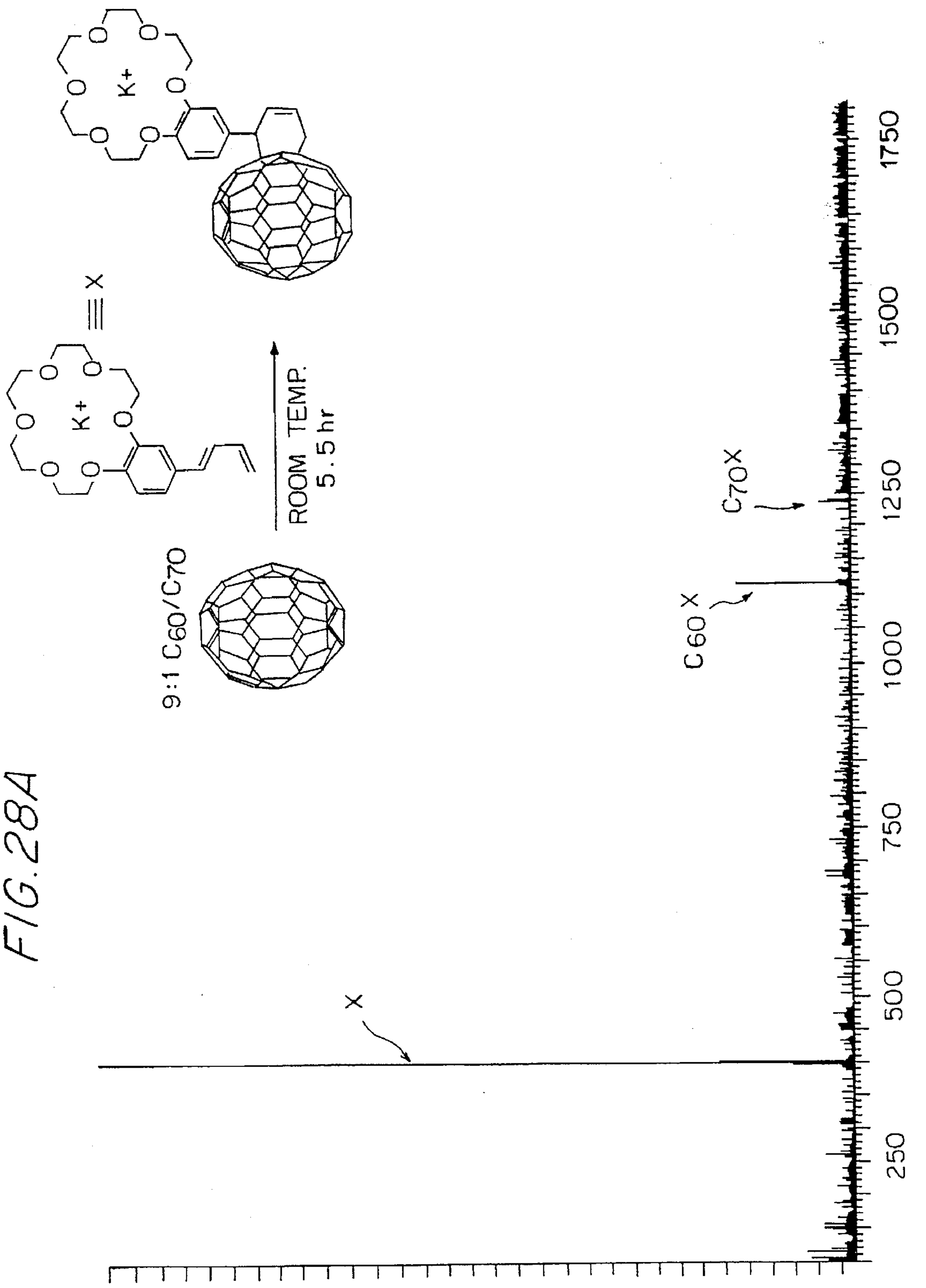
FIG. 28A–B is a reaction scheme (28A) and graphical representation showing ESI-MS analysis of a reaction to form a tagged compound using fullerenes and a crown ether.
Figure 29A:
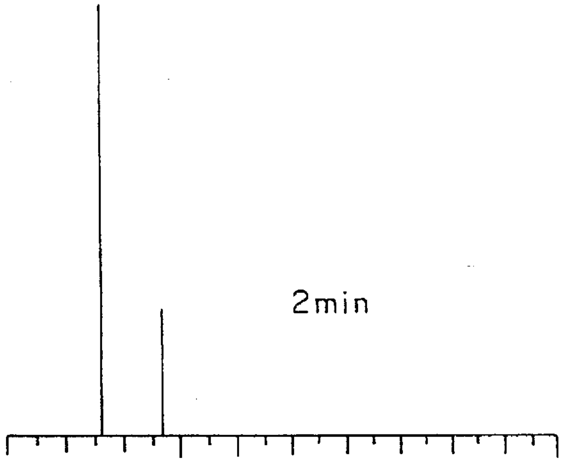
FIG. 29A–D is a graphical representation showing photocycloaddition of enones to fullerenes over time (29A–C) and the corresponding reaction scheme (29D).
Figure 29B:
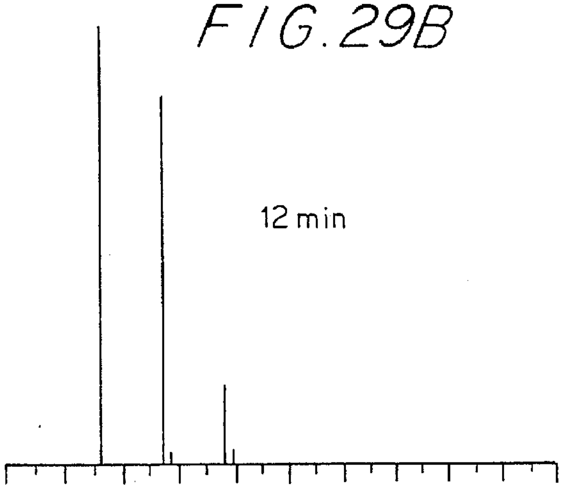
Figure 29C:
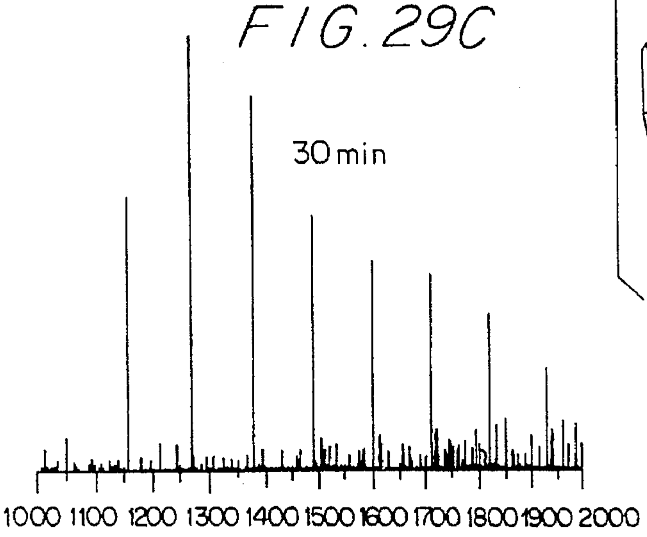
Figure 29D:
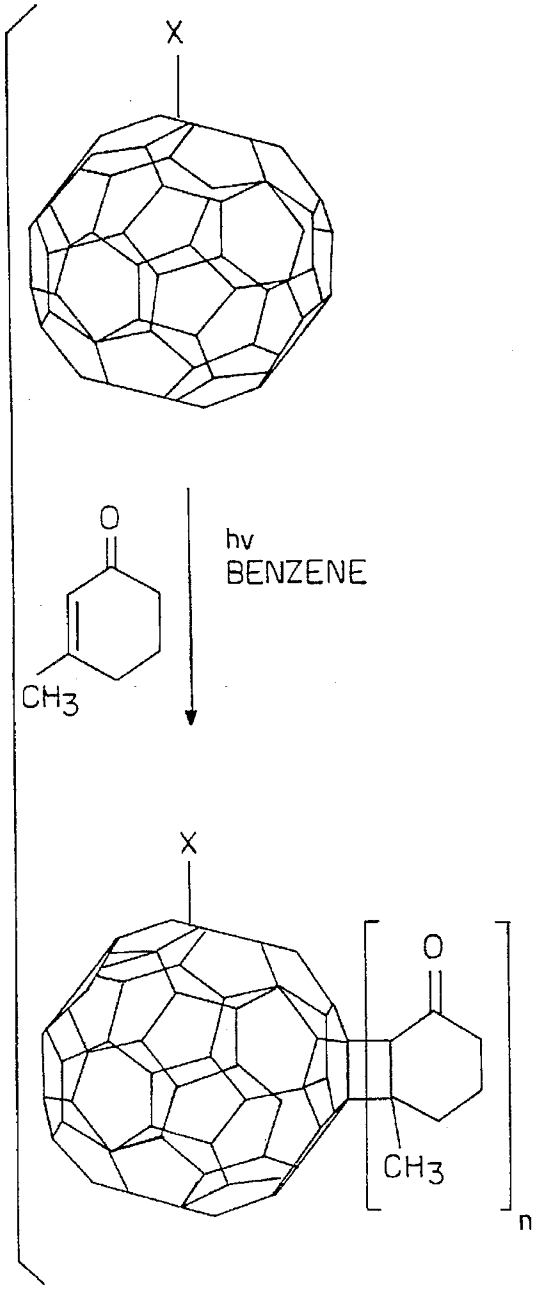

An example of such a reaction is presented in FIG. 26, wherein a $C_{60}$ and $C_7$ added mixture and a 9:1 ratio of compound 9 and its $C_{70}$ analog with vitamin D in hexane. Reaction occurred at room temperature with stirring for 20 hours, followed by refluxing for 4 hours in benzene. Results show substantial conversion of fullerene to $C_{61}$ X-bis-vitamin D adduct (M/z=1927). Accordingly, Diels-Alder addition of fullerenes can be accomplished according to known method steps to provide fulleroid compound according to formula (III). See, e.g., *COMPREHENSIVE ORGANIC SYNTHESIS*, supra.

A fulleroid compound according to formula (I) may also be provided according to the present invention, wherein the compound is according to formula (IV):

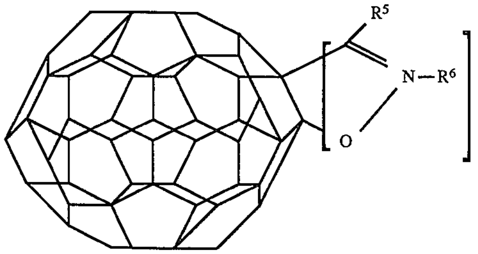

(IV)

wherein $R^5$ and $R^6$ are the same or different, as hydrogen, substituted or unsubstituted C1–20 alkyl or acyl which can be substituted with alkyl, acyl or phenyl groups; and wherein n is 1–7 and X is hydrogen or a tagged reagent according to the present invention.

Figure 31A:
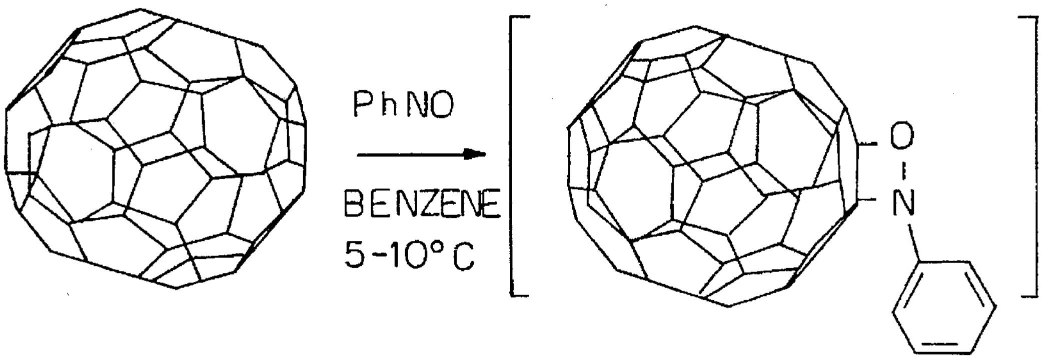
FIG. 31A–B is a graphical representation showing the addition of Nitrosobenzene to $C_{60}$ (31B) and the corresponding reaction scheme (31A).
Figure 31B:
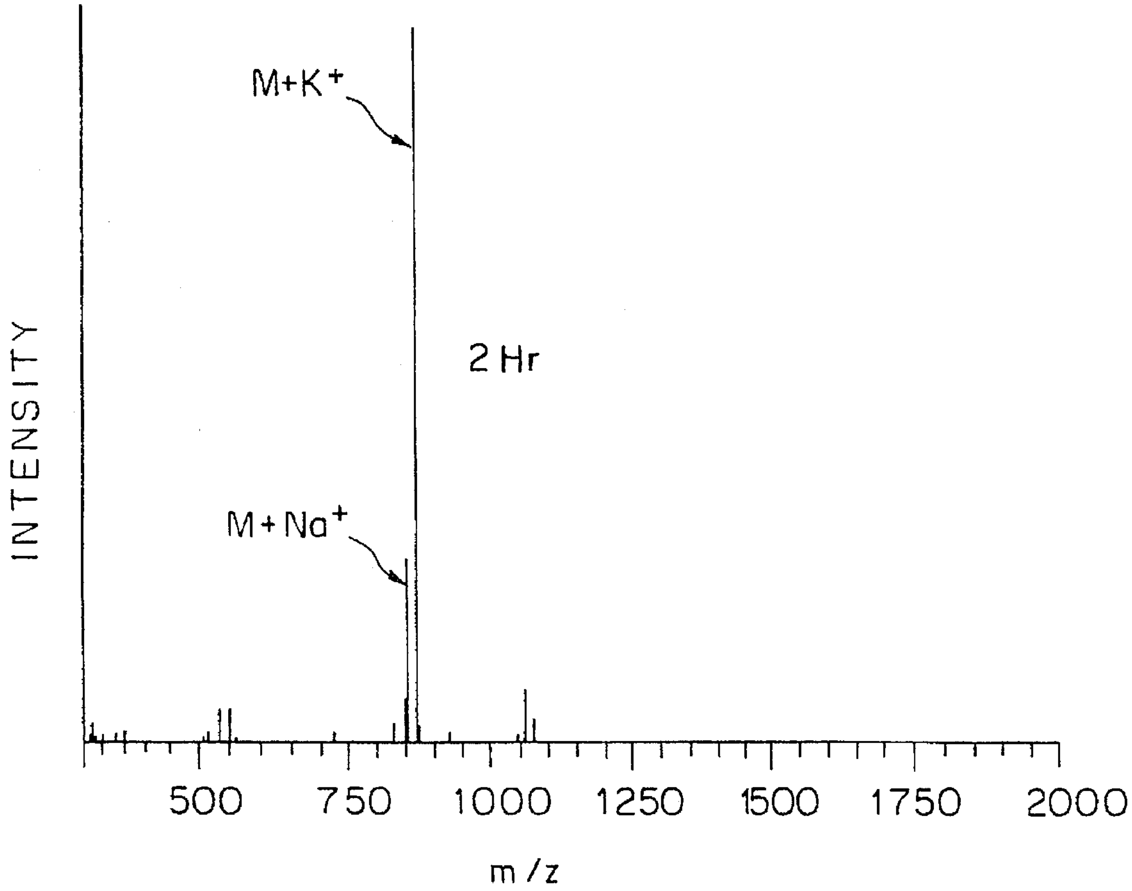
Figure 33A:
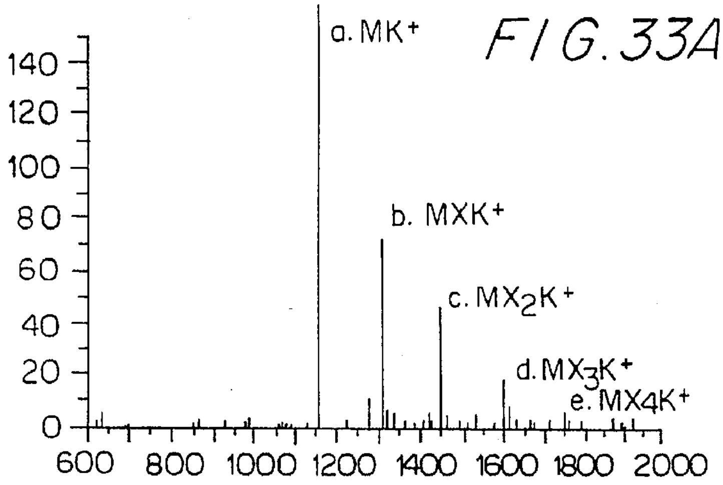
FIG. 33A–D is a graphical representation (33A–C) showing the 1,3-dipolar addition of azides to $C_{60}$: loss of $N_2$ to form azafulleroids, as shown in the reaction scheme (33D). 33A. 22 hr, 65°. a. $[MK]^+$ (1159), b. $[MXK]^+$ (1306), c. $[MX_2K]^+$ (1453), d. $[MX_3K]^+$ (1600), e. $[MX_4K]^+$ (1747). 33B. 30 hr, 65°. f. $[(MX_3\text{-}N_2)K]^+$ (1278), g. $[(MX_2\text{-}N_2)K]^+$ (1425), h. $[(MX_3\text{-}N_2)K]^+$ (1572). 33C. 20 hr, 100°. i. $[(MX_2\text{-}2N_2)K]^+$ (1397), j. $[(MX_3\text{-}3N_2)K]^+$ (1514), k. $[(MX_3\text{-}2N_2)K]^+$ (1542).
Figure 33B:
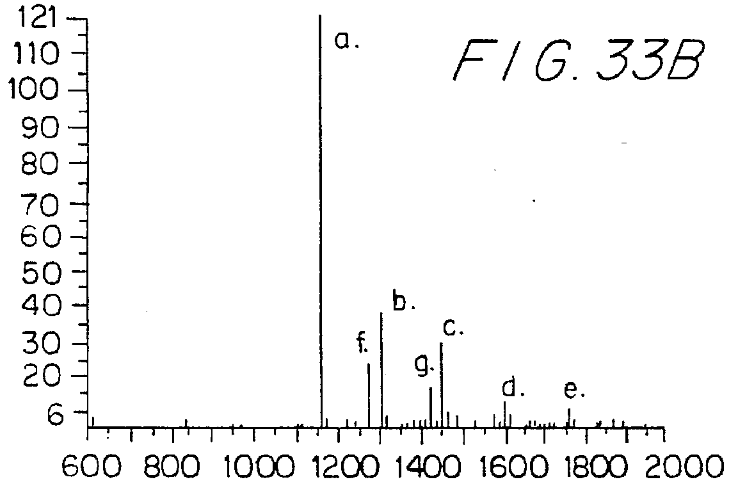
Figure 33C:
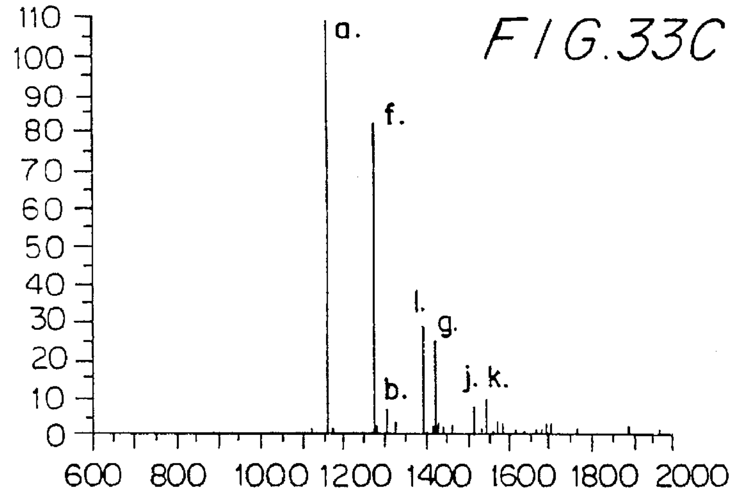
Figure 33D:
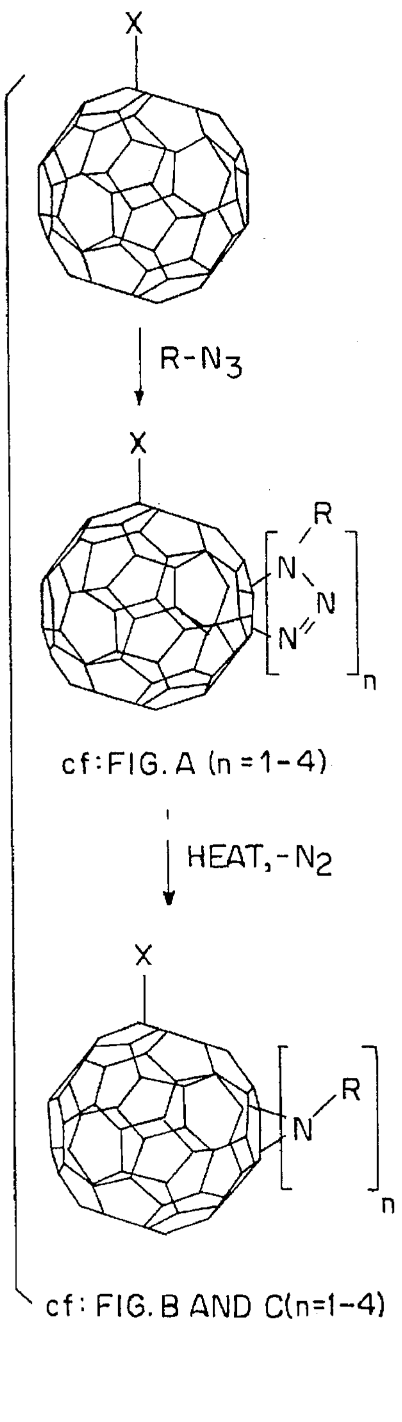

Nitrone addition to fullerenes to provide nitrone fulleroids may be provided according to known method steps, as presented in FIG. 31. In particular, a fullerene is added to a nitrone in benzene over a 4 to 36 hour period to provide nitrone compounds according to formula (IV).

Figure 30A:
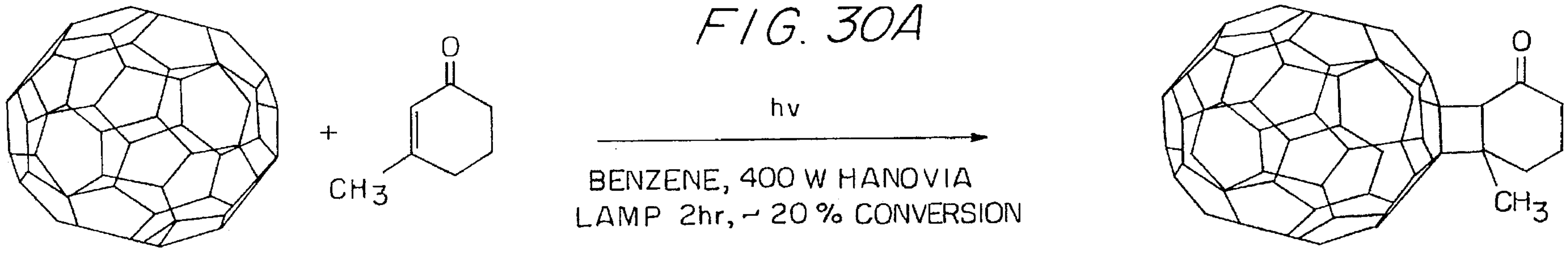
FIG. 30A–C is a reaction scheme (30A) for photocycloaddition of enones and corresponding ESI-MS graphs (30B–C) showing the reaction and products of the reaction as a tagged fulleroid enone.
Figure 30B:
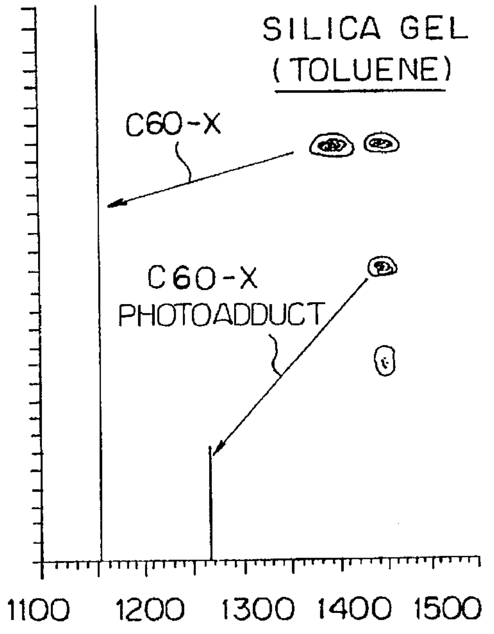
Figure 30C:
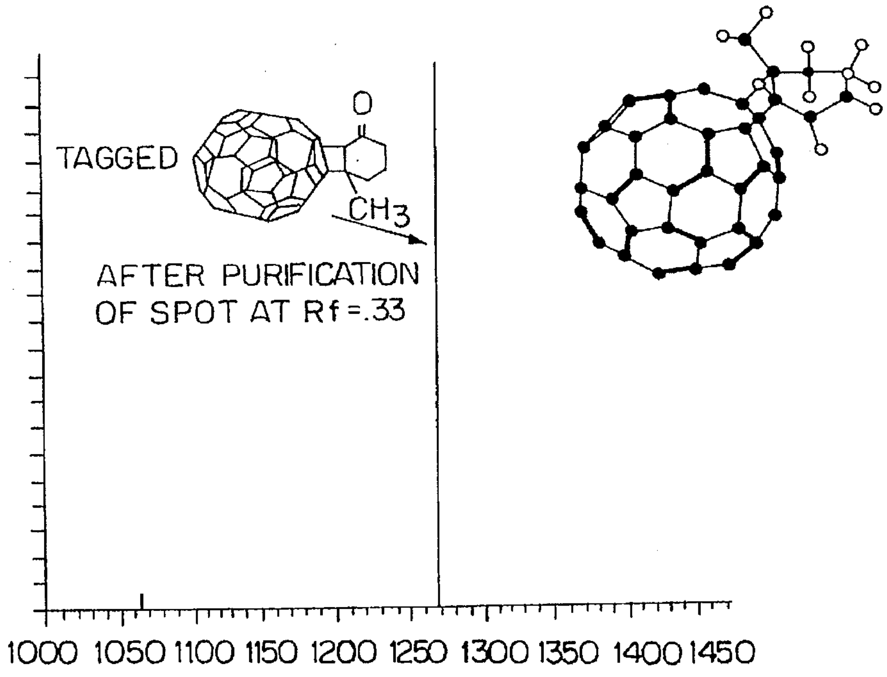

As a non-limiting example, addition of nitrobenzene to $C_{60}$ is presented in FIG. 31, wherein nitro benzene is added to a solution containing $C_{60}$ in PaMO at 5 to 10° C. for 2 hours to provide a fulleroid nitrone as presented in FIG. 30 are found to associate with sodium ion or potassium ion at M/z of 851 or 867, respectively. Seed e.g., *COMPREHENSIVE ORGANIC SYNTHESIS*, supra.

A fulleroid compound may also be provided according to formula (I), wherein said compound is according to formula (V):

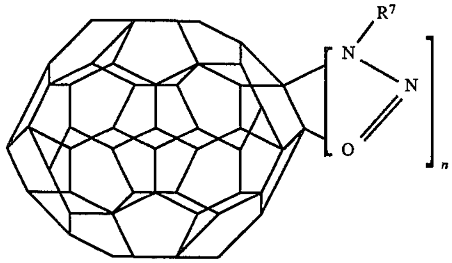

(V)

wherein $R^7$ is hydrogen substituted or unsubstituted C1–20 alkyl or acyl which can be substituted with alkyl, acyl or phenyl groups, and wherein n is 1–7 and X is hydrogen or a tagged reagent according to the present invention.

Fulleroid compounds according to formula V, can be provided according to known method steps, for example as presented in FIG. 33. As presented in FIG. 33, a fullerene is reacted with R—$N_3$ by reaction from 20 to 30 hours at 65°–100°. As shown in FIGS. 32A, 32B and 32C, variation of the reaction conditions results in alternative mixtures of products. A compound according to formula V can be readily converted into an azafulleroid according to formula (VI) below, by heating and loss of nitrogen to form an azafulleroid, e.g., as presented in FIG. 32B and 32C, as azafulleroid according to formula VI. See, *COMPREHENSIVE ORGANIC SYNTHESIS*, supra.

A fulleroid compound may also be provided according to formula (I), wherein said compound is according to formula (VI):

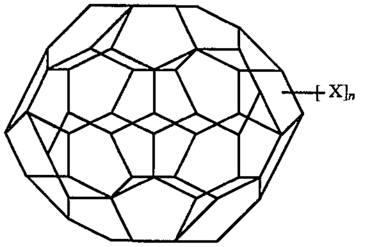

(VI)

wherein $R^8$ is hydrogen, substituted or unsubstituted $C_1$–$C_{20}$ alkyl or acyl which can be substituted with alkyl acyl or phenyl groups, and wherein n is 1–7 and X is hydrogen or a tagged reagent according to the present invention.

TAGGED COMPOUNDS

Additionally, fulleroids according to any of formulae (I), (II), (III) (IV); (V) and (VI) can be provided as tagged compounds according to formula VII

Y—X (VII)

wherein Y is a compound according to a formula selected from the group consisting of (I), (II), (III), (IV), (V) and (VI), and X is a tagging reagent suitable for providing a tagged compound analyzable by ESI-MS, according to the present invention As presented herein; such a tagging agent may be selected from any compound that will interact with a compound to be analyzed using ESI-MS and will provide a resulting tagged compound having a charge detectable using ESI-MS which would be clear to one skilled in the art, based on the teaching and guidance presented herein Such tagging reagents may include, but are not limited to, amines, metal chelating agents compounds that form salts capable of binding the compound to be tagged. Non-limiting examples of such compounds may be those selected from the group consisting of compounds 4, 5, 6, 9, 11, 12 or a crown ether, wherein n=1–6, and as further presented herein.

Figure 23A:
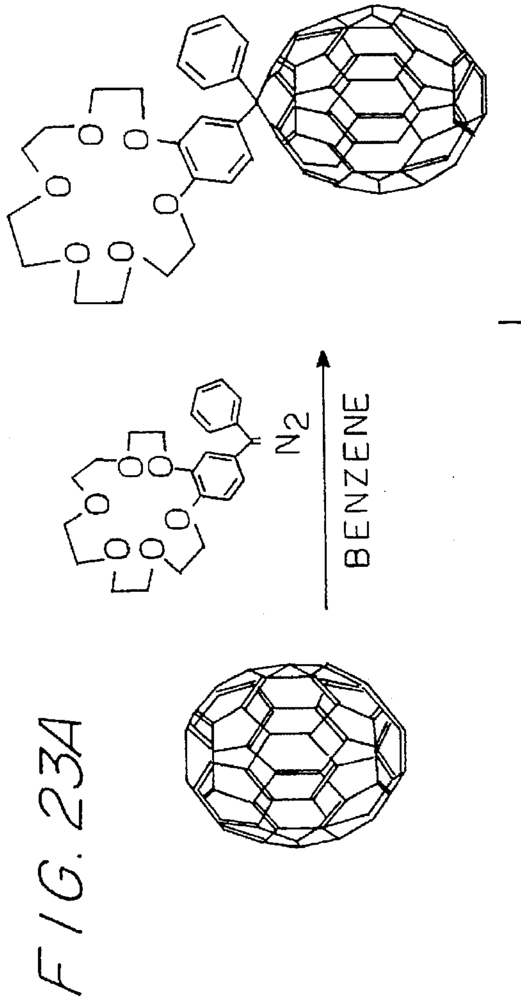
FIG. 23A–B is a reaction scheme (23A) and corresponding graphical representation (23B) showing the ESI-MS spectrum of $C_{16}$ fulleroid 10 (m/z=1159) in 1:1 $C_6C_6$/$CH_3OH$ containing KOAc. The reaction of $C_{60}$ was carried out with tagging reagent 9 in benzene.
Figure 23B:
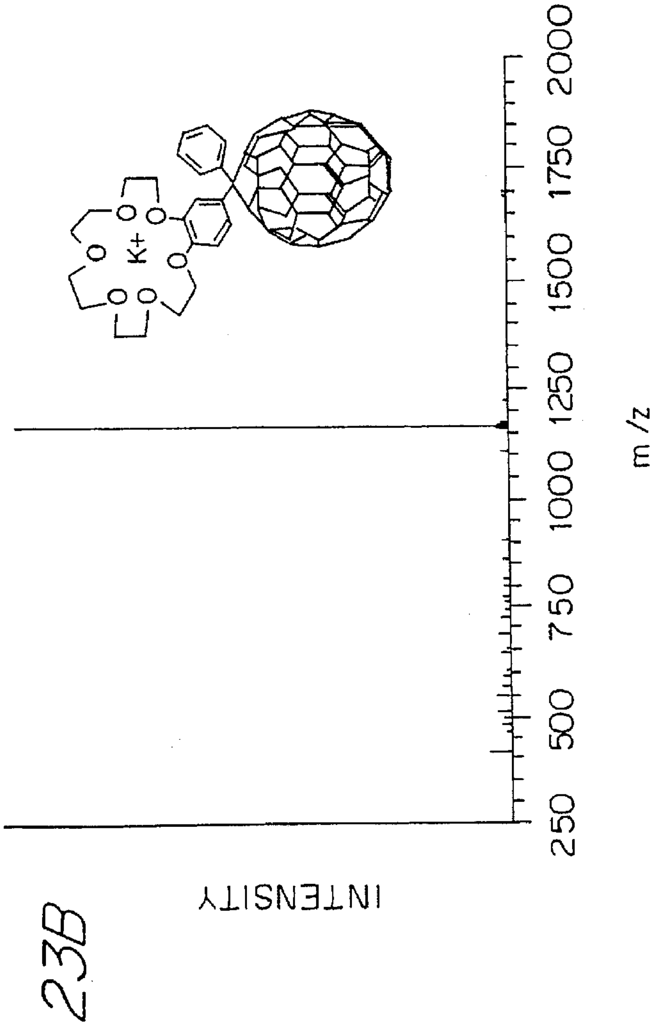
Figure 24A:
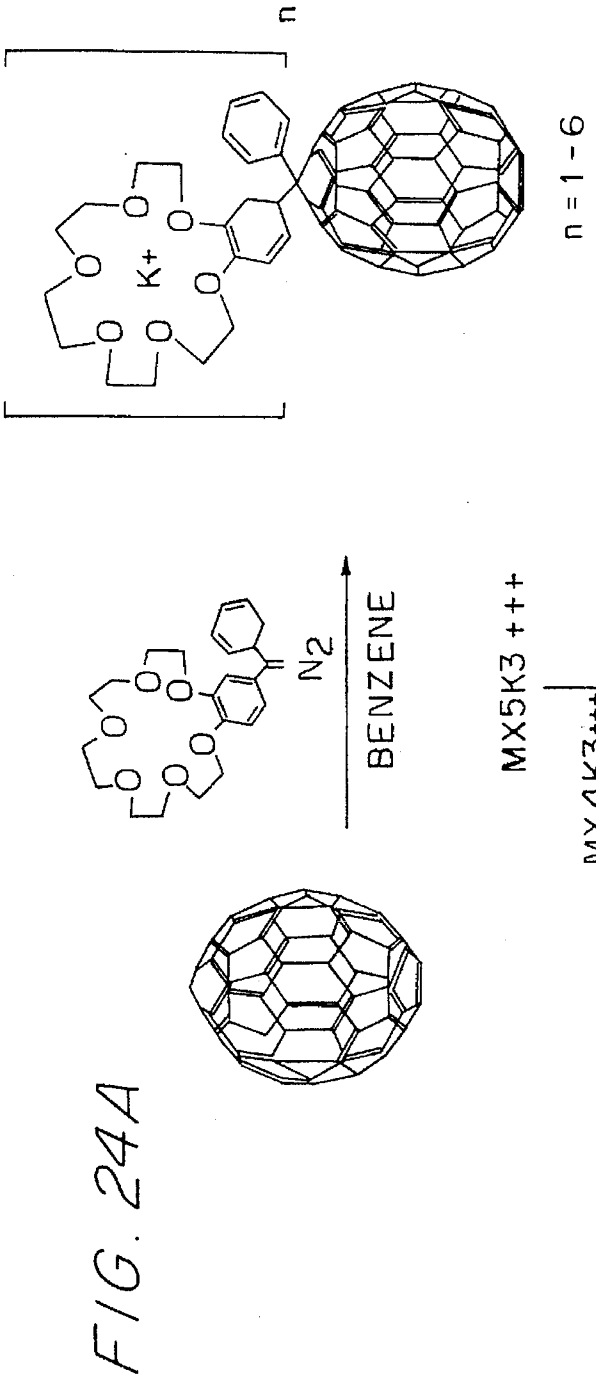
FIG. 24A–B is a graphical representation (24A) showing the ESI-MS spectrum benzene/methanol 1:1 with 1% KOAc. M=$C_{60}$ fulleroid, X=crown, and the corresponding reaction scheme (24A).
Figure 24B:
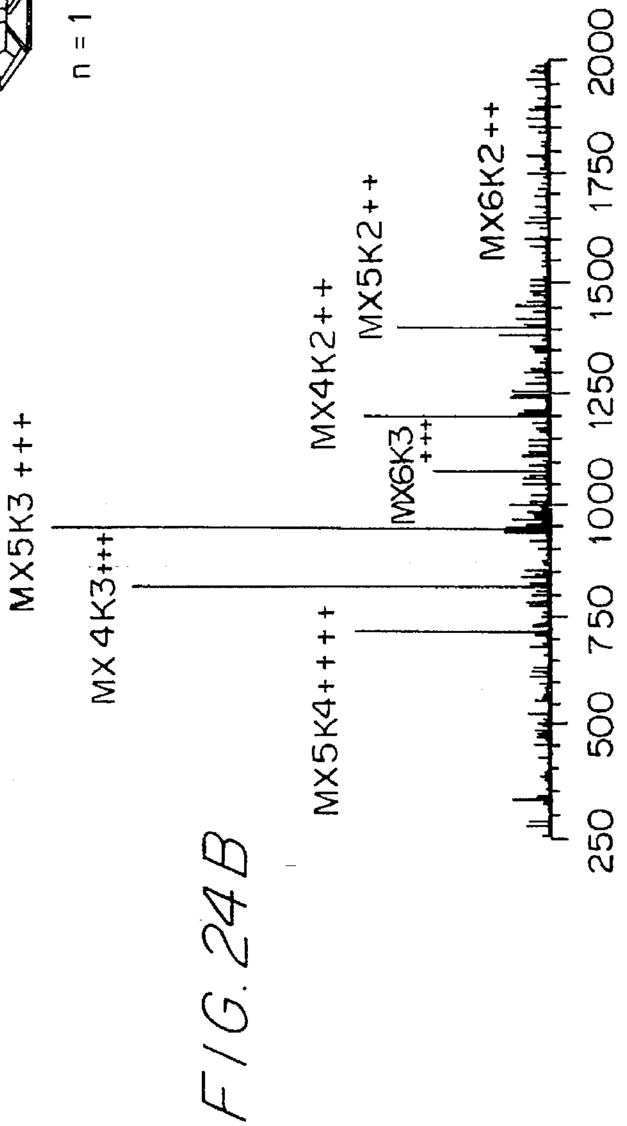
Figure 25A:
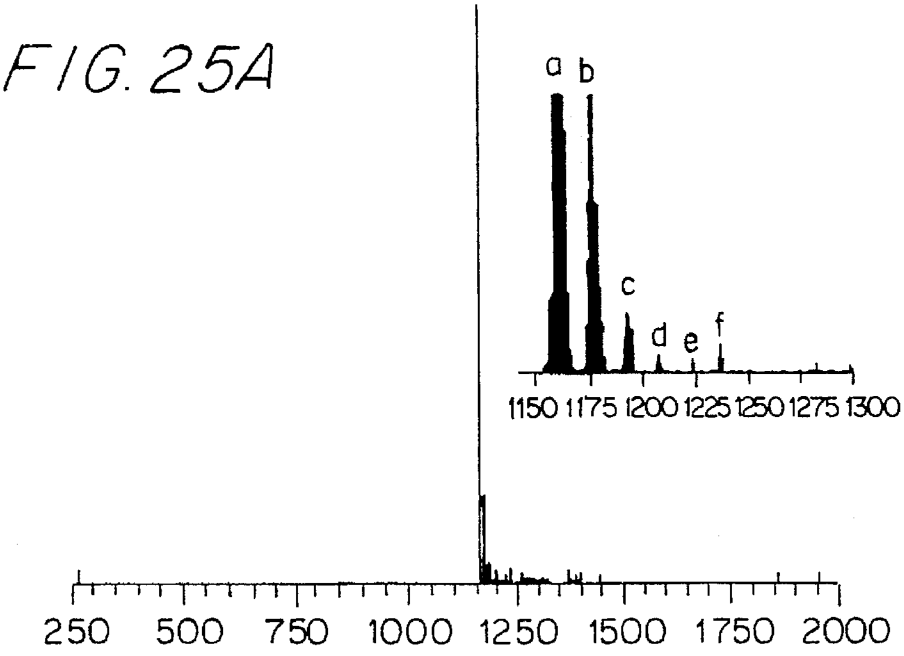
FIG. 25A–D is a graphical representation showing the ESI-MS spectra for $C_{61}X$ fulleroid 10 reaction products in $C_6C_6$/$CH_3OH$ (1:1) containing KOAc. M stands for compound 10. M/z values are in parentheses. 25A. Oxidation (basic alumina/air overnight). a. $[MK]^+$ (1159), b. $[MOK]^+$ (1175), c. $[MO_2K]^+$ (1191), d. $[MO_3K]^+$ (1207), e. $[MO_4K]^+$ (1223), f.$[MO_5K]^+$ (1239). 25B. Amination (neat i-Butyl amine, 4 hr.). a. $MO_nX_4K^+$, b. $MO_nX_5K^+$, c. $MO_nX_6K^+$, d. $MO_nX_7K^+$, e. $MO_nX_8K^+$, f. $MO_nX_9K^+$. X=isobutyl amine, n=0–5. 25C. Bromination (neat $Br_2$, 25°, 2 hr.). a. $[MBr_8K]^+$ (centered at 1805, b. $[MBr_{10}(CH_3OH)K]^+$ (centered at 1985). 25D. Hydroboration (excess $BH_3$-$OEt_2$ in $C_6H_5CH_3$, 25°, 2 hr). a. $[MK]^+$ (1159), b. unknown (1180), c. unknown (1195), d. $[MO_2(BH_3)_3K]^+$ (1233), e. $[MO_3(BH_3)_3K]^+$ (1249), f. $[MO_4(BH_3)_3K]^+$ (1265).
Figure 25B:
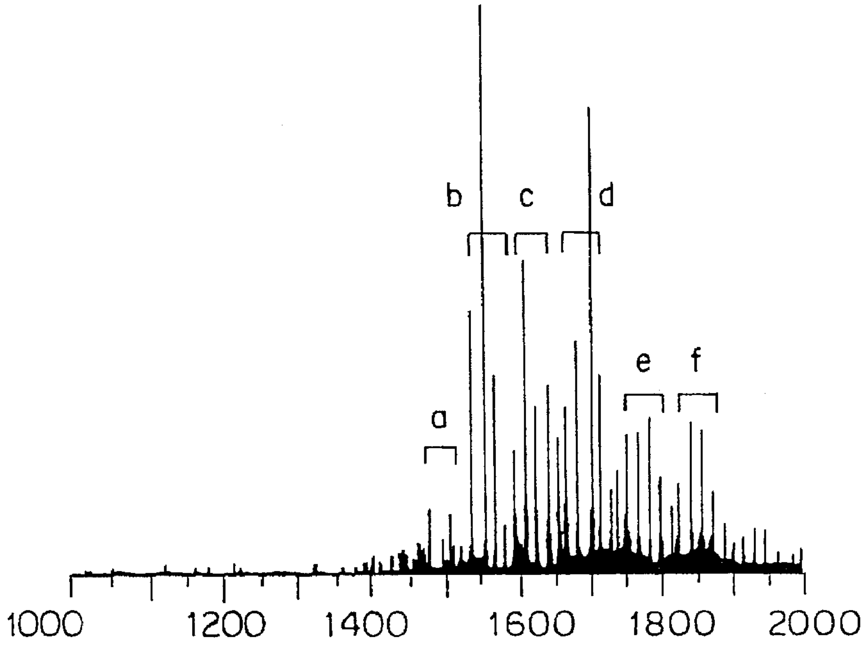
Figure 25C:
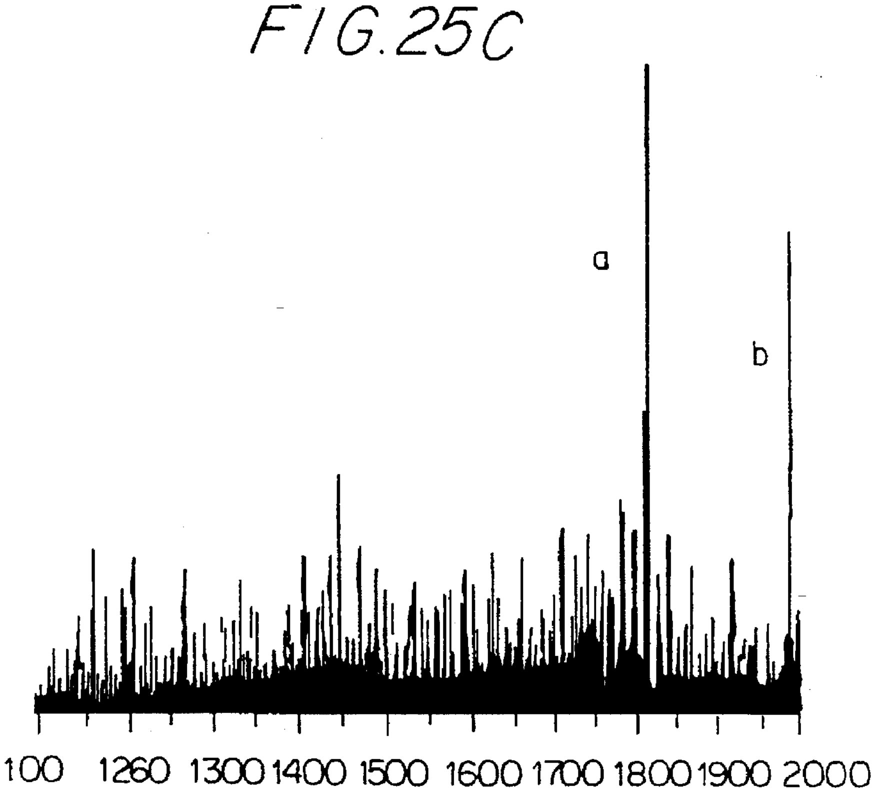
Figure 25D:
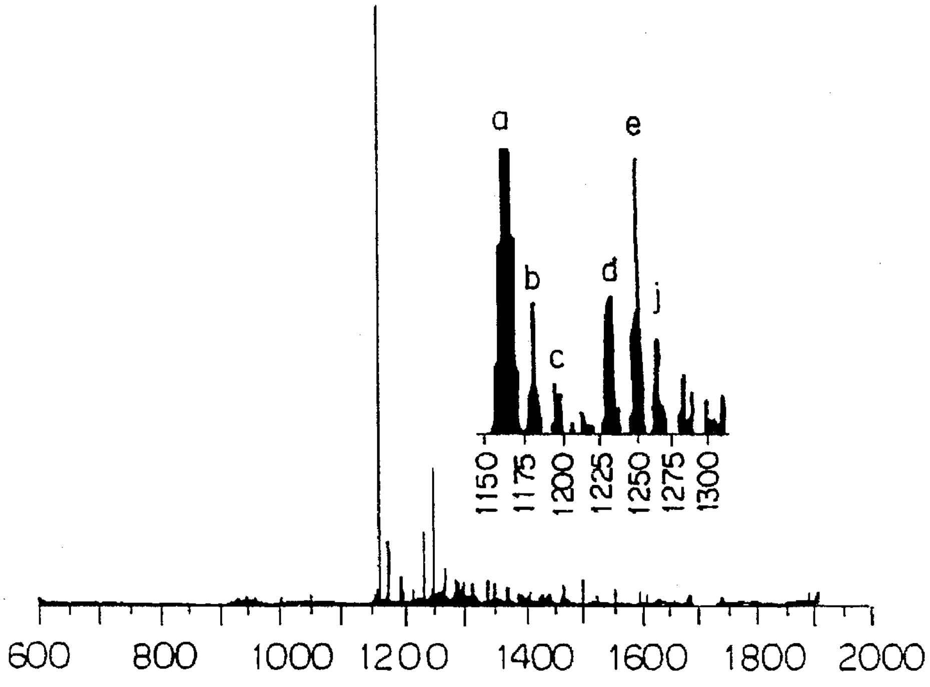

Such tagging agents may be formed as a compound according to formula (VII) by reaction with a fullerene with the tagging reagent in benzene for example as presented as a synthesis of a crown ether fulleroid in FIG. 23. Alternatively, multiply charged poly-crown fulleroids can be provided according to formula (VII), as presented in FIG. 24 wherein a crown ether is reacted with a fullerene in the presence of benzene to provide the exemplary tagged compound as presented in FIG. 23 where n=1–6. Fermation of such poly crown fulleroids is presented at the bottom of FIG. 24 in an ESI-MS spectrum using benzene/methanol in a 1:1 ratio with 1% KOAc wherein M equals the $C_{60}$-fulleroid and x equals the crown ether tagging the agent. See, e.g., *COMPREHENSIVE ORGANIC SYNTHESIS*, supra.

Having now generally described the invention: the same will be more readily understood through reference to the following example which is provided by way of illustration, and is not intended to be limiting of the present invention.

EXAMPLE I

Detection and Characterization of Molecules in Solution Using ESI-MS Including Neutral compounds Experimental All ESI-MS spectra were obtained on a Vestec Model 200 ESI-MS quadrupole instrument with a 2000 amu range (4). ESI spectra of pure compounds were taken in the solvent indicated about 15–30 min after the sample preparation by electrospraying the sample solution at 3–5 mL/min with the instrument settings listed. Spectra of reaction mixtures were taken by dilution of an aliquot with the solvent listed in the figure legend. Usual instrument settings: needle voltage: 2.0–2.6 kV; electrospray chamber temperature: 50°–65° C.; nozzle voltage: 200 V; block temperature: 220°–250° C.; lens temperature: 110°–120° C.; repeller voltage: 20 V Results and Discussion Hexamethylphosphoric triamide 1 (HMPA a common reagent in organic synthesis (6)) was detected by ESI-MS as its $Na^+$ adduct (Eq. 1). HMPA, when used in synthesis for cation coordination, provided an ESI-MS spectrum, showing both $M+Na^+$ and $2\ M+Na^+$ (FIG. 1).

Figure 3:
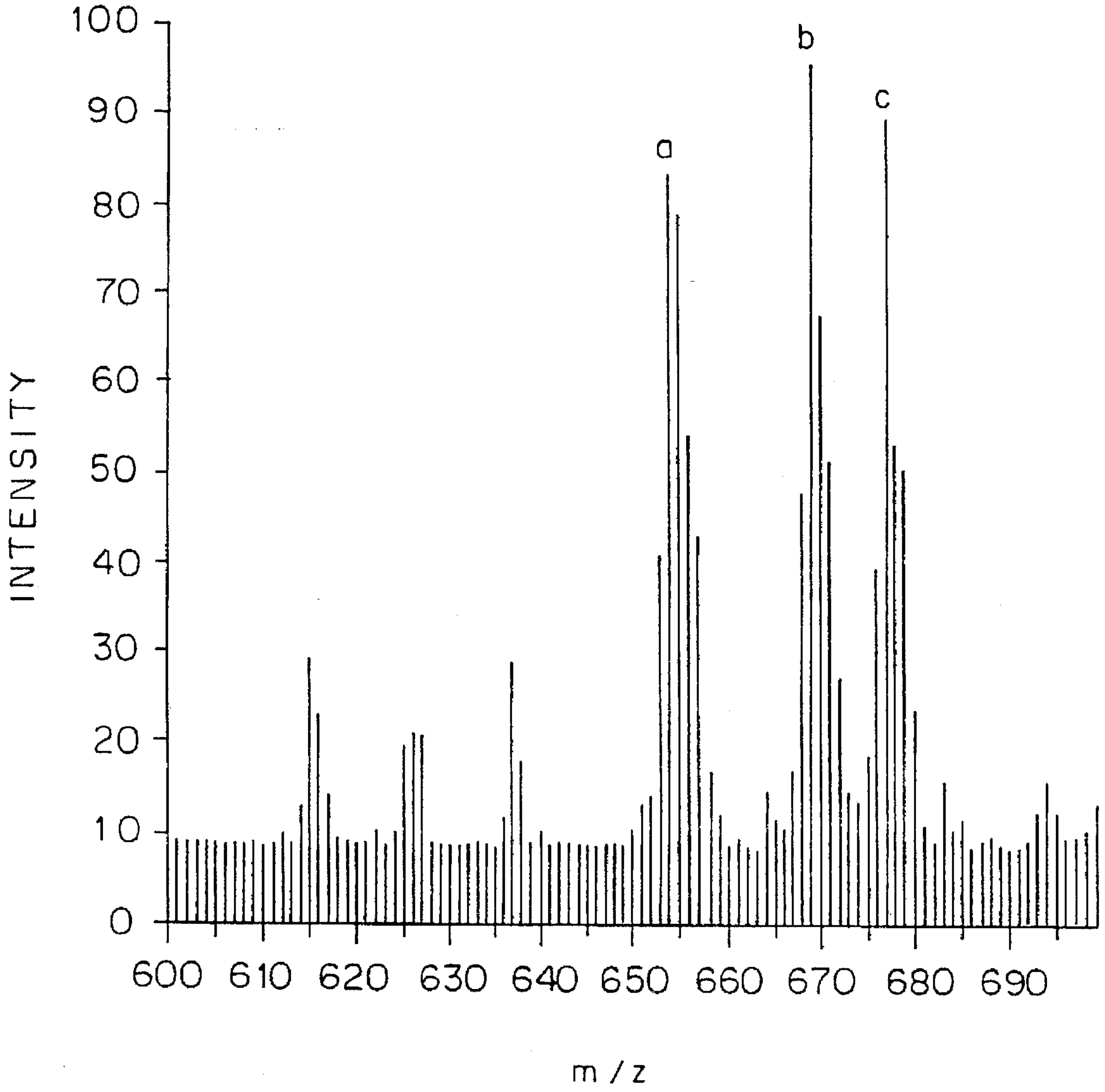
FIG. 3 is a graphical representation showing ESI-MS spectrum of air oxidized products of complex 3 in $CH_3OH$. a. unknown (m/z=654), b. $[Cu\text{-}O\text{-}Cu]^{++}$ (m/z=669), c. $[Cu\text{-}O\text{-}O\text{-}Cu]^{++}$ (m/z=677).

One of the most useful methods for detection of neutral compounds according to the present invention involves metal cation binding to specific ligands. ESI-MS according to the present invention can be used as a tool for determination of copper/peptide complexes (2a). An interesting spectrum was obtained from an air oxidized sample of complex (3) below. The spectrum was consistent with the formation of oxo-bridged dimers [Cu-O-O-Cu]2+ and [Cu-O-Cu]$2^+$ (Eq. 3, FIG. 3).

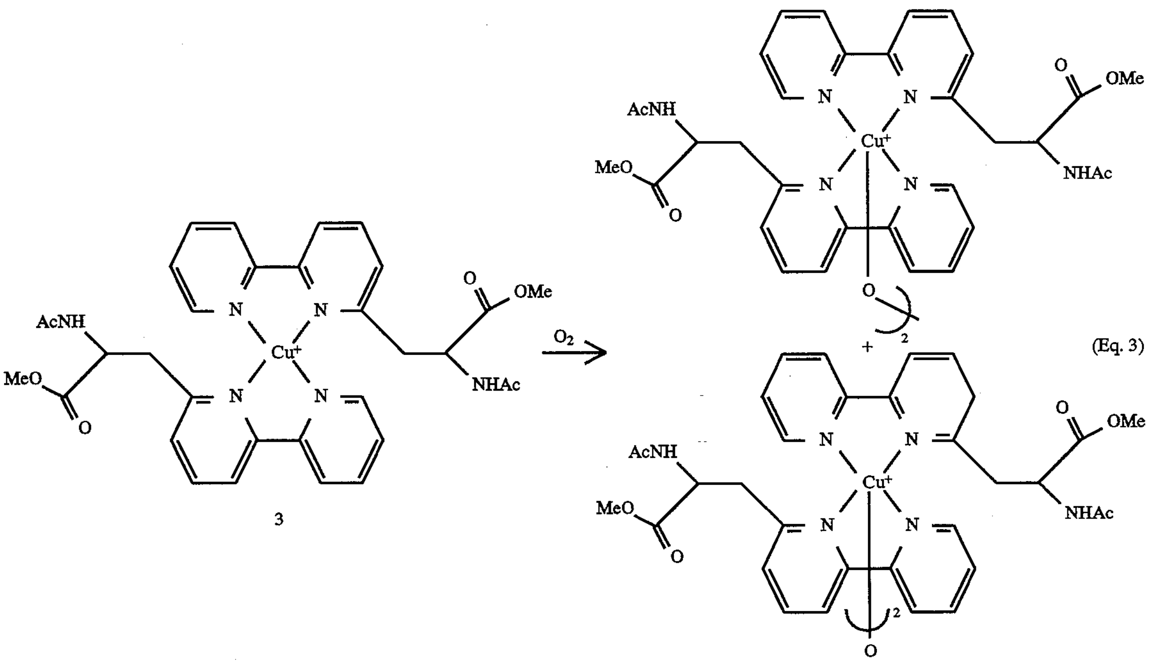

3

(Eq. 3)

These types of complexes are known as models for metalloenzymes such as hemocyanin (8), although they have not previously been observed by MS. Other studies on peptide-metal ion interactions have been reported (9), but the results from FIG. 3 demonstrate that ESI-MS may also be used for studying oxygen transport proteins.

New molecules were synthesized with both hard and soft metal binding sites and carried out several careful studies on their $Cu^+$ and $K^+$ complexes. For example compound 4 may form complexes with either alkali metal ions ("hard" site) or transition metal ions ("soft" site) (FIG. 4A,B) (2h).

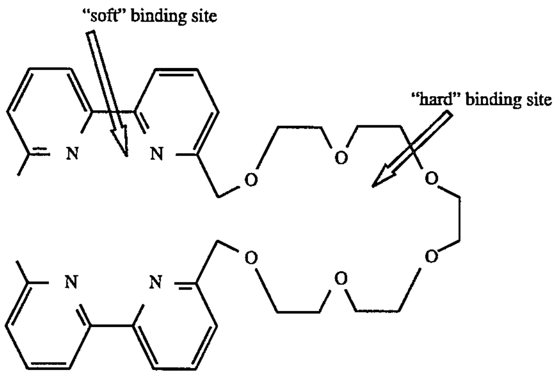

4

The ion specificity of complexation of metals to polyether ligands was also examined according to the present invention by ESI-MS. FIG. 5 shows the complexation of a mixture of metal salts with 18-crown-6, a molecule known to have high specificity for K+. Measurement of the intensity of the signals shows that direct determination of Kd in solution by ESI-MS is not straightforward but that, if gas phase chemistry is involved, it is not a major factor (10)

We have found that not only does 18-crown-6 provide an excellent binding site for $Na^+$ or $K^+$, but neutral derivatives containing this group are readily prepared and purified, are stable and may be used as reagents or ESI-MS tags for the study of organic reactions.

ESI Tagging Reagents:

Criteria for a good tagging reagent.

First, the derivatization should be easy fast and highly selective. Second, the tagged adduct must have high sensitivity for detection by ESI-MS. Finally the tagged molecules must be stable under ESI-MS conditions.

Although systematic design of tagging reagents for every type of neutral compound is still in its infancy, we have prepared several types of reagents which may be used for diverse functionalities. The crown ether (metal binding site) and tertiary amine (basic site) are two structural features suitable for ESI-MS tags. One tagging compound 5 is a dienophile for the derivatization and ESI-MS detection of vitamin D by introduction of a metal binding site.

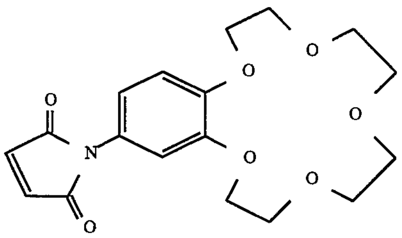

5

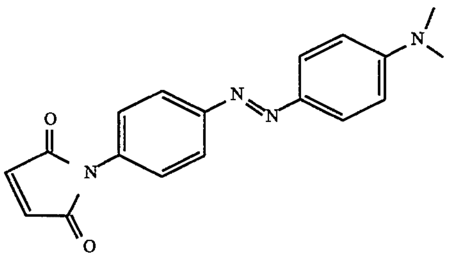

6

For example, compound 5 reacts with vitamin $D_3$ to produce adduct 7 (Eq. 4, FIG. 6A,B) (2d,13). In a similar manner, the commercially available Vitamin D compound 6 also undergoes a Diels-Alder reaction with vitamin D (FIG. 6B). Our studies showed that the derivatives from both compound 5 and 6 had similar sensitivities, i.e. $^{+}1$ pmol. Besides a Diels-Alder reaction with dienes, the maleimide compound 5 can also be used as an alkylating agent for tagging peptides having the —SH group 14.

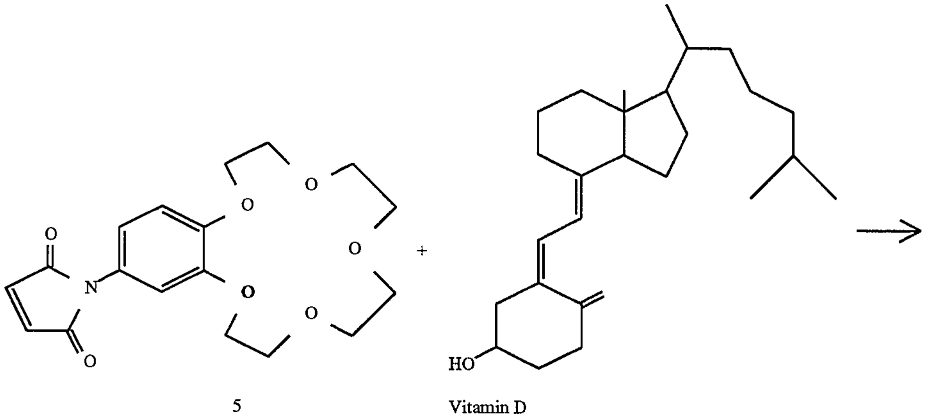

5

Vitamin D

-continued

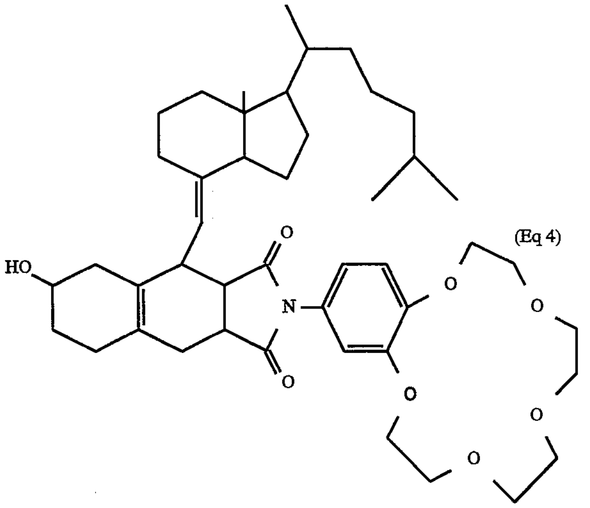

(Eq 4)

7

Because of the need for new structure identification tools in the area of fullerene chemistry, we recently developed ESI-MS derivatization reagents for fullerenes such as $C_{60}$ and $C_{70}$. We are able to quantitatively tag superior these molecules using diazomethane compound 9 (Eq. 5).

The resulting derivative 10 gives very strong signals in ESI-MS (FIG. 7). Determination of $C_{60}/C_{70}$ ratios directly from soot is possible using this technique (2h)

In addition, while carboxylic acids are detectable by negative ion ESI-MS, an alternative method involves their derivatization using compound 9. For example an used to form the esters which have the ability to be charged. FIG. 10 shows that cholesterol may be detected in this manner.

Specific peptide and amino acid detection systems using ESI-MS of the present invention are also provided by adaptation of PITC (phenyl isothiocyantate) chemistry, including amino acid sequencing. For example, reaction of crown-PITC tagging compound 12 with gives a derivative that may be detected as its Na+ adduct by ESI-MS of the present invention.

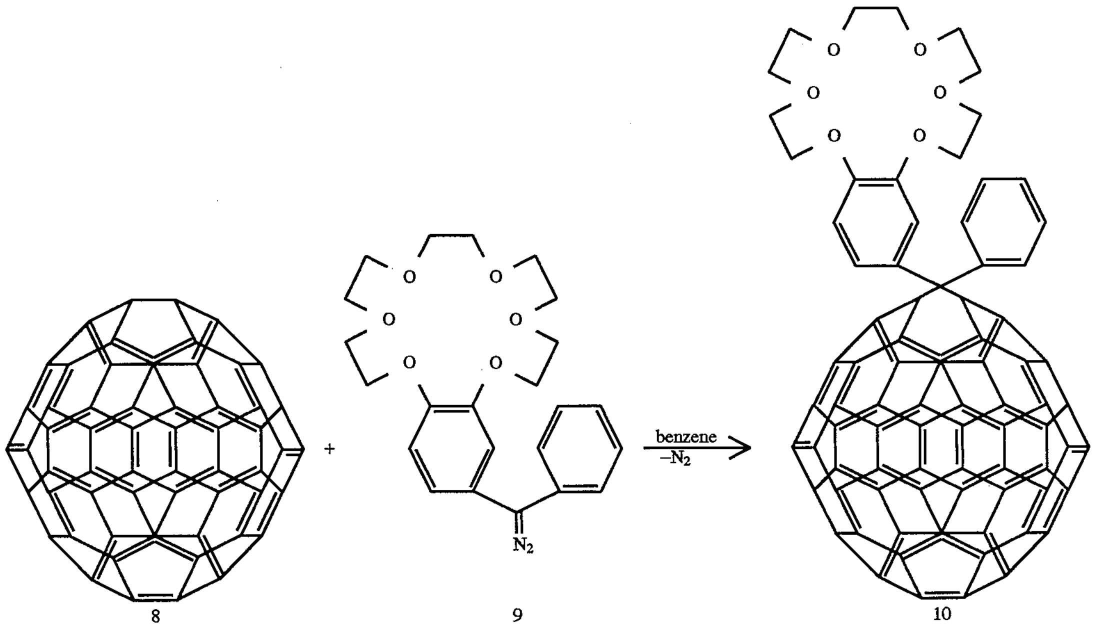

(Eq. 5)

8 9 10

N-protected amino acid (FIG. 8) or oleic acid (FIG. 9) can be detected in this manner in the positive mode. Positive ion ESI-MS is now discovered to be easier, more sensitive and reliable than negative ion ESI-MS of acids. For molecules having hydroxyl groups; acid chloride compound 11 may be Surveying Organic Chemical Reactions By ESI-MS:

As a non- limiting example, ESI-MS of the present invention may be used to survey reactions of the buckminsterfullerene molecule $C_{60}$ (8). The tagged $C_{60}$ molecule designated "$C_{61}$ fulleroid" 10 (cf. Eq. 5) was prepared in quantity and used to examine its reactions in solution using ESI-MS of the present invention. It has been reported that $C_{61}$ fulleroids have practically identical chemical properties to $C_{60}$ (16g). Therefore compound 10 may be used to screen for chemical reactions of $C_{60}$ itself. For example, the Diels-Alder reaction of $C_{61}$ fulleroid with vitamin $D_3$ may be monitored by ESI-MS (Eq. 6, FIG. 11A,B,C). The relative reactivity of the vitamin D diene was studied to establish that the reaction is not reversible, and to directly observe the reaction of one 15 (n=1) and then two 15 (n=2) vitamin D molecules with 10.

With $C_{61}$ fulleroid 10, many reactions have been detected, including previously unreported reactions for $C_{60}$. Its reaction with $O_2$ (19) amines, (16b), bromine (20) and borane (21) is readily studied (FIG. 12A–D). The reaction may be followed in solution and the product distribution directly observed. For example, we have carried out the reaction of $C_{61}$ fulleroid 10 with 1,3-dipoles such as a-methylbenzyl azide (Eq. 7).

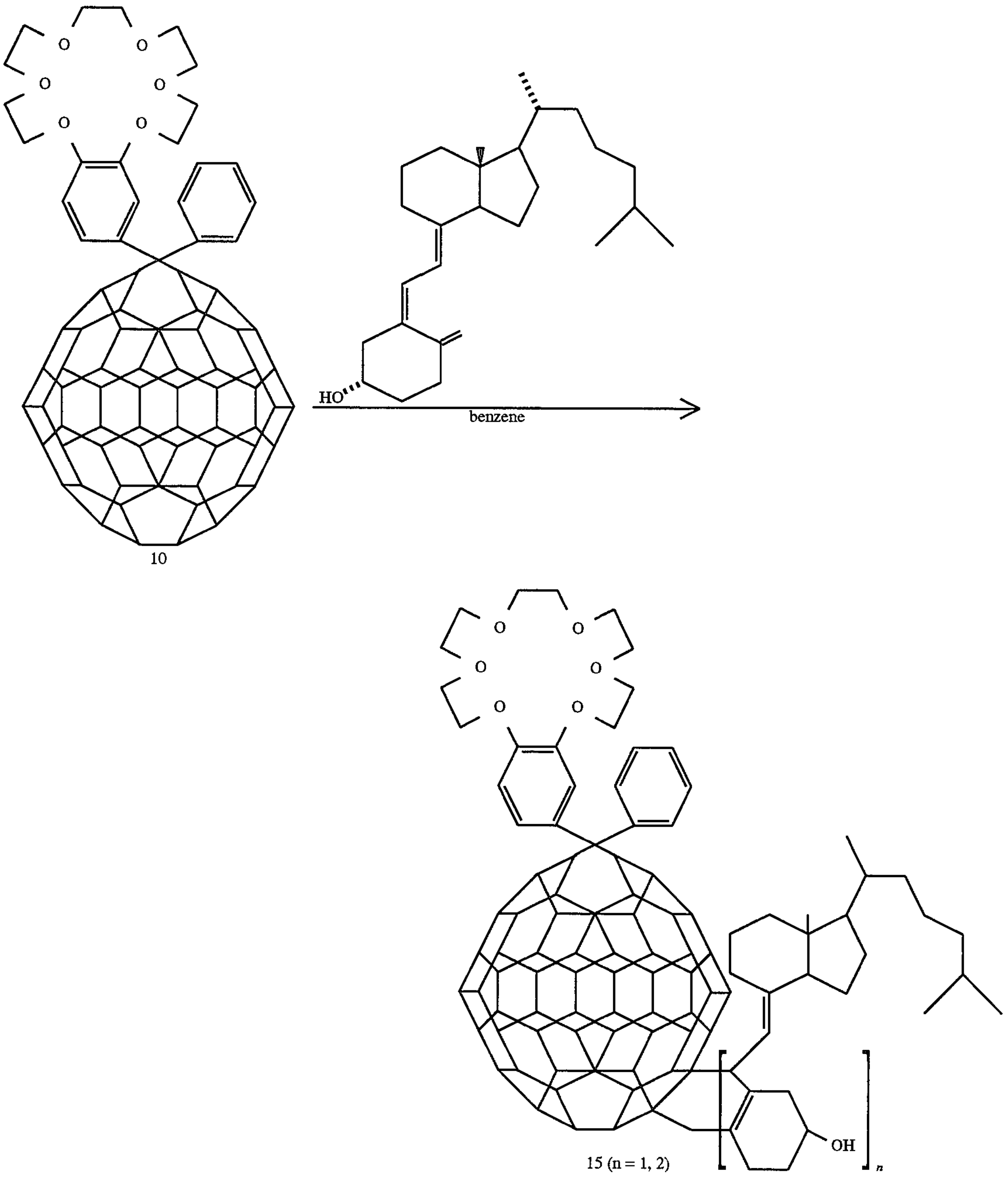

10

15 (n = 1, 2)

(Eq. 6)

10

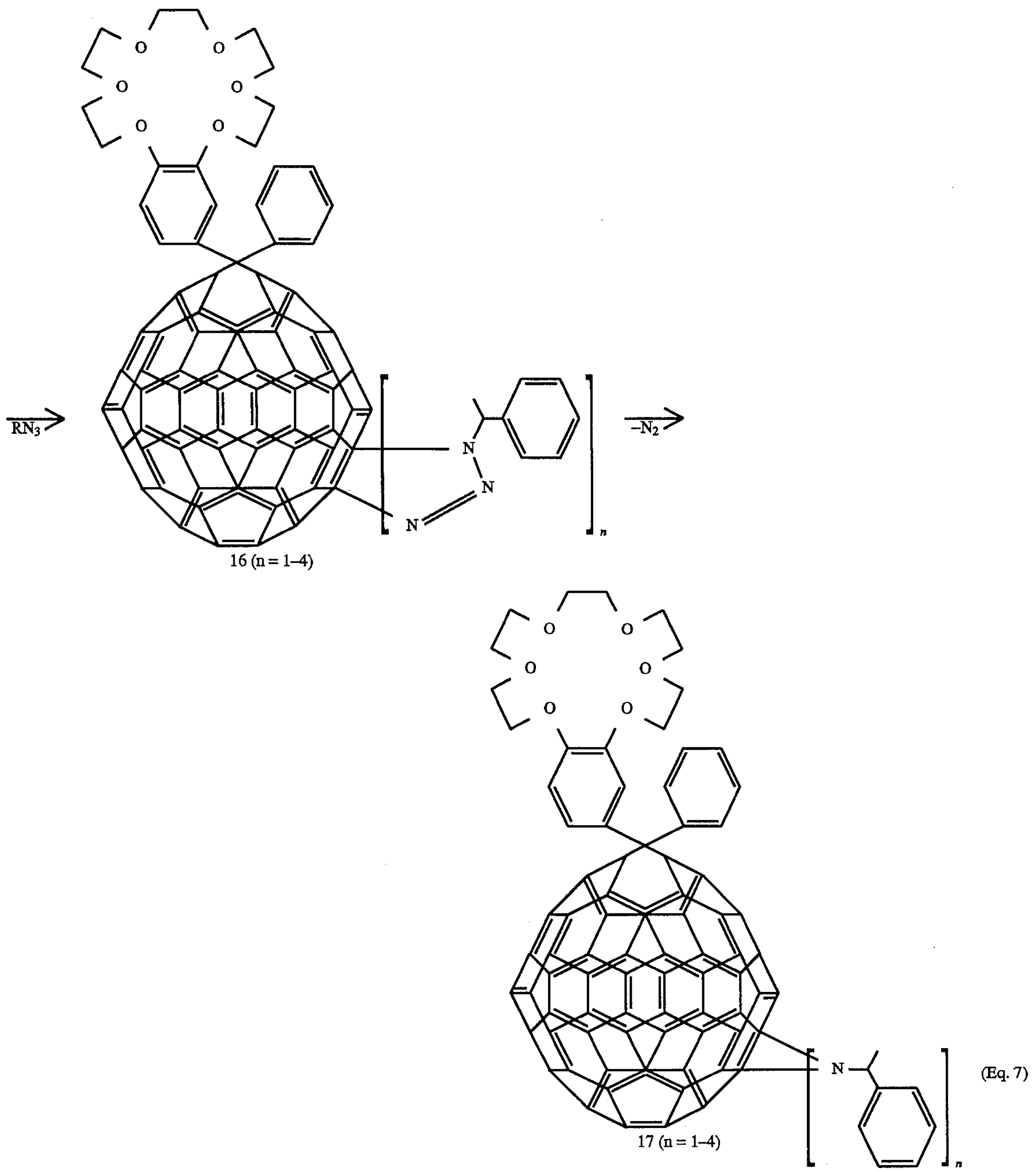

16 (n = 1–4)

17 (n = 1–4)

(Eq. 7)

Several pathways for the reaction may be observed as a function of time and temperature. Initially α-methylbenzyl azide adds one, two three and four times (FIG. 13A) without expulsion of nitrogen to yield 16 (n=1–4). At longer time (FIG. 13B), loss of nitrogen may be observed 17 (n=1). on heating at higher temperatures, the multiple adducts lose one or more moles of $N_2$ to produce the expected distribution of aziridine adducts.

Conclusion

Accordingly, ESI-MS methods according to the present invention not only provide superior biopolymers, but also characterization of small neutral organic molecules. We have shown that the rational design of tagging reagents can eliminate the ESI-MS limitation with regard to type of analyte. Using suitable strategies, applications of ESI-MS to organic chemistry, organic reaction mechanisms and drug metabolism are expected to be greatly improved.

EXAMPLE II

TAGGING REAGENTS AND DETECTION OF CHEMICAL COMPOUNDS USING ESI-MS

An interest in the design and synthesis of molecular receptors for metals (22) and their characterization by electrospray ionization MS has led to the synthesis of compound 15. Under appropriate conditions compound 15

Compound 15

Figure 15:
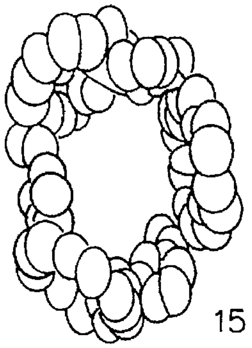
FIG. 15 is a graphical representation showing the CPK model of compound 1.
Figure 16:
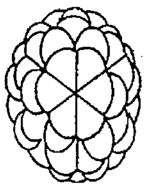
FIG. 16 is a graphical representation showing the CPK model of $C_{60}$.

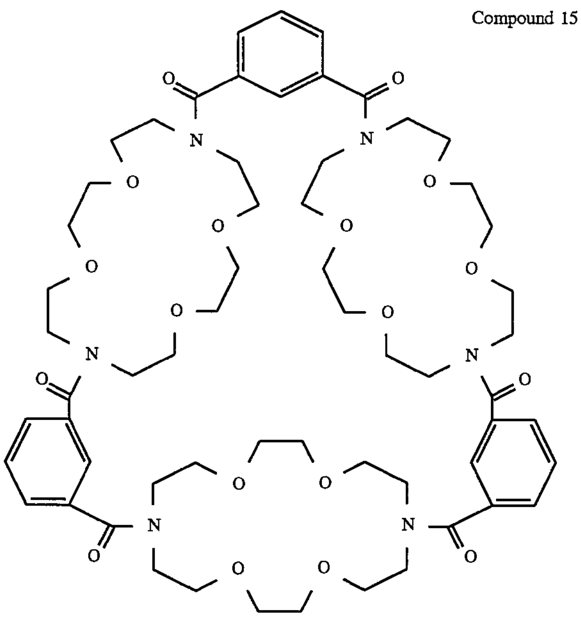

exhibits the interesting property of coordination of up to four alkali metal cations A while simultaneously binding up to three of its associated anions X–, i.e. the complex $MA_3X_3$ (FIG. 15).

Another property of compound 15 is that it has, according to CPK models, a relatively hydrophobic cavity of dimensions suitable for binding $C_{60}$.

Figure 17:
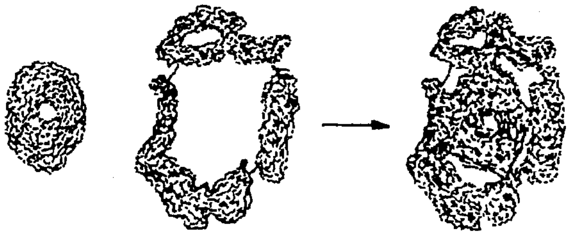
FIG. 17 is a graphical representation showing the hypothetical binding of compound 1 and $C_{60}$ showing VDW surfaces.

It is predicted that compound 15 and its relatives will serve as molecular receptors for the recognition of $C_{60}$ and its anions (FIG. 17).

Figure 18:
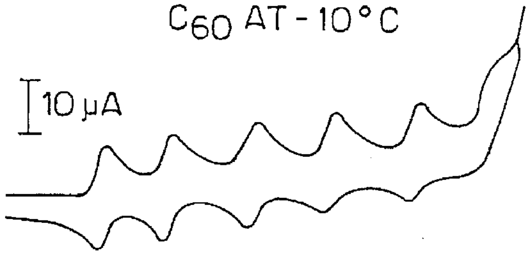
FIG. 18 is a graphical representation showing the reduction of $C_{60}$ in $CH_3CN$/toluene at −10° (from ref 4).

Compound 15 would bind the hydrocarbon anion $(C_{60})^{n-}$ while at the same time stabilizing its associated cations $A^+$. Because of its three crown ether binding sites compound 15 should be selective for $(C_{60})^{3-}(A+)_3$. Electrochemistry (23) reveals at several oxidation states of $C_{60}$ by cyclic voltametry (FIG. 18).

Several reductions are possible at surprisingly equal intervals (Table I).

TABLE I

| | | | $E_{1/2}$(V) |
|---|---|---|---|
| $C_{60}$ | → | $C_{60}^-$ | −0.98 |
| $C_{60}^-$ | → | $C_{60}^{2-}$ | −1.37 |
| $C_{60}^{2-}$ | → | $C_{60}^{3-}$ | −1.87 |
| $C_{60}^{3-}$ | → | $C_{60}^{4-}$ | −2.35 |
| $C_{60}^{4-}$ | → | $C_{60}^{5-}$ | −2.85 |
| $C_{60}^{5-}$ | → | $C_{60}^{6-}$ | −3.26 |

$CH_3CN$/toluene/TBAPF6, −10° vs, FC/FC+

Figure 19:
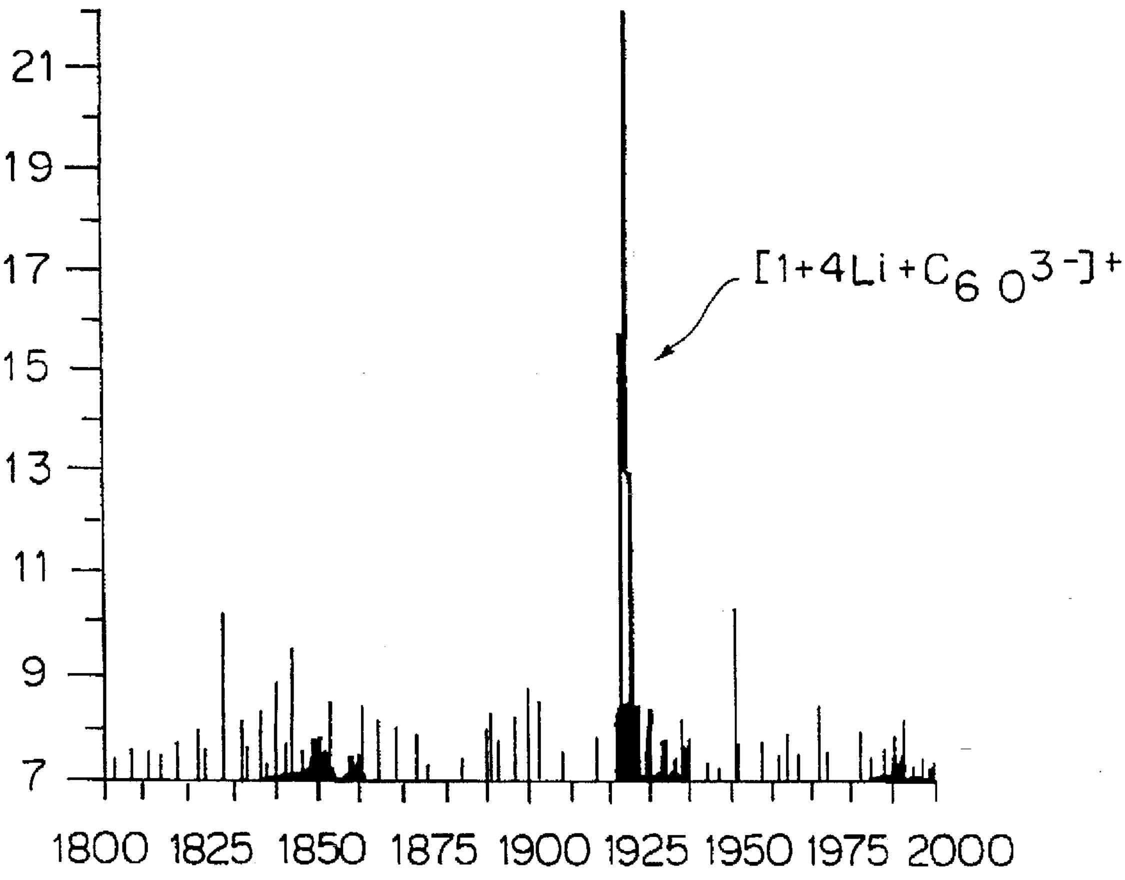
FIG. 19 is a graphical representation showing the ESI-MS spectrum of a solution of Li[0] reduced $C_{60}$ in THF/acetonitrile containing compound 1.

The solution properties of $C_{60}$ anion/compound 15 complexes by NMR and ESI-MS can thus be studied. The binding of $C_{60}$ to receptor 1 would be predicted to change its redox chemistry and favor formation of the $C_{60}^{3-}$ oxidation state. In a preliminary experiment, the reduction of $C_{60}$ with Li in THF (sonicated) (24) was carried out and an aliquot quenched and analyzed by ESI-MS. The electrospray spectrum (FIG. 19) shows an ion characteristic of the expected $C_{60}$ anion complex at (calculated) m/z=1926 amu.

EXAMPLE III

ESI-MS ANALYSIS OF FULLERENES/ FULLEROIDS USING AN ARYL-AMINE TAGGING REAGENT

We have been studying applications of the new technique of electrospray ionization MS (ESI-MS) to organic chemistry (25) and have reported a new reagent for ESI-MS detection of vitamin D (26). We have discovered that crown ether tagging reagents become charged as their $Na^+$ or $K^+$ adducts during ESI-MS and provide a neutral and stable reagent for convenient and highly sensitive ESI-MS analysis.

COMPOUND 16

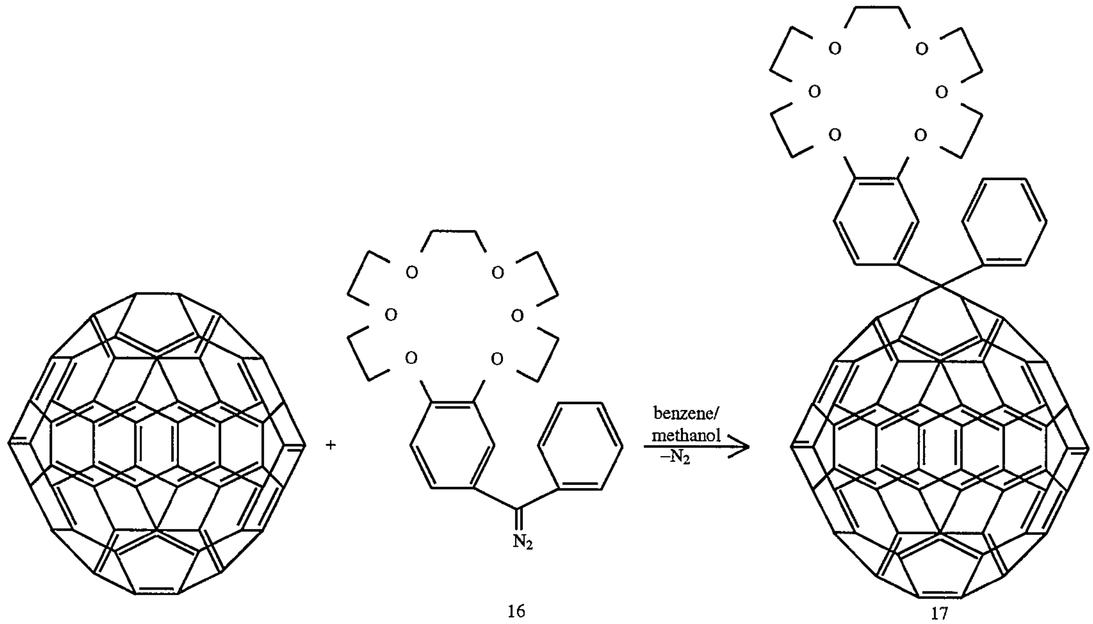

16

17

Eq. 8

Figure 20A:
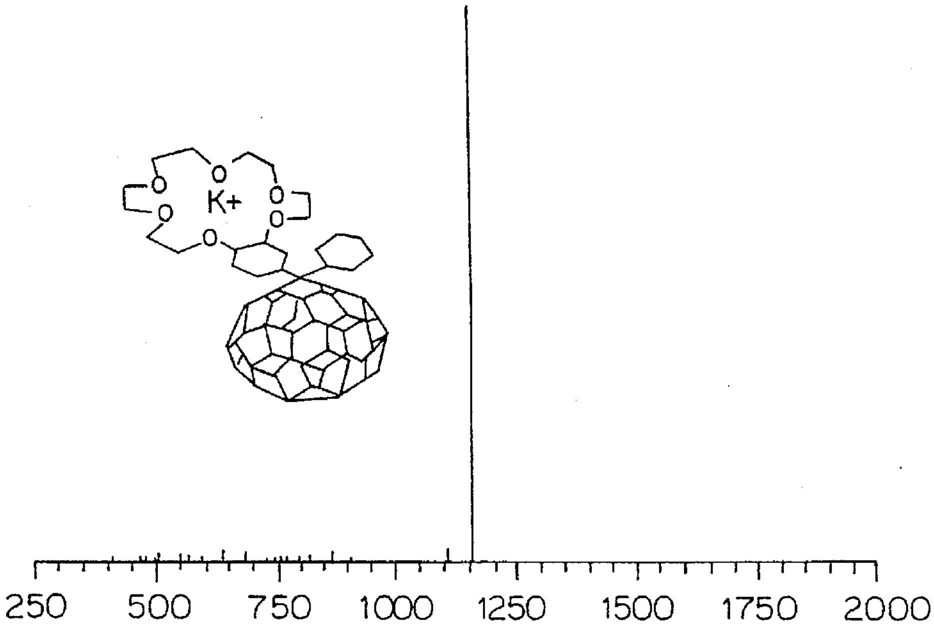
FIG. 20A–D is a graphical representation showing the analysis of tagged fullerene compounds using a method of the present invention.
Figure 20B:
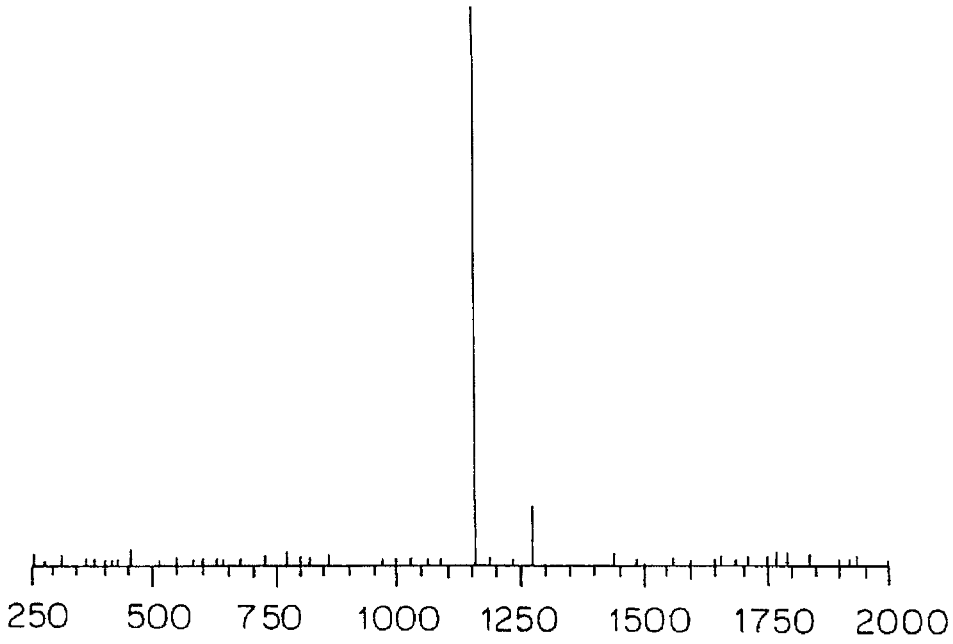

Prompted by the recent report on cyclopropanation (5) of $C_{60}$, we prepared diazo-crown reagent 16. Compound 16 was prepared by formulation of benzo-18-crown-6, followed by phenyl lithium addition and Jones oxidation. Hydrazone formation and oxidation with activated $MnO_2$ gave 16 as a purple product. Reagent 16 was allowed to react with pure $C_{60}$ in benzene to provide adduct 17 (>45% yield). After addition of a methanol solution of KOAc (~$10^{-3}$M), injection of 5 μL/min of the 4:1 benzene/methanol solution of 2 into the ESI-MS (the ESI-MS measurements were performed on a Vestec Model 200 single-quadrupole electrospray ionization mass spectrometer), (Allen et al. *J. Am. Mass Spectrom.* 3:18 (1990)) gave the spectrum shown in FIG. 20A. In a similar way, a commercial $C_{60}/C_{70}$ mixture (MER Corporation 7960 S. Kolb Rd, Tucson, Ariz., 85706 USA) (9:1) provided the spectrum shown in FIG. 20B.

Figure 20C:
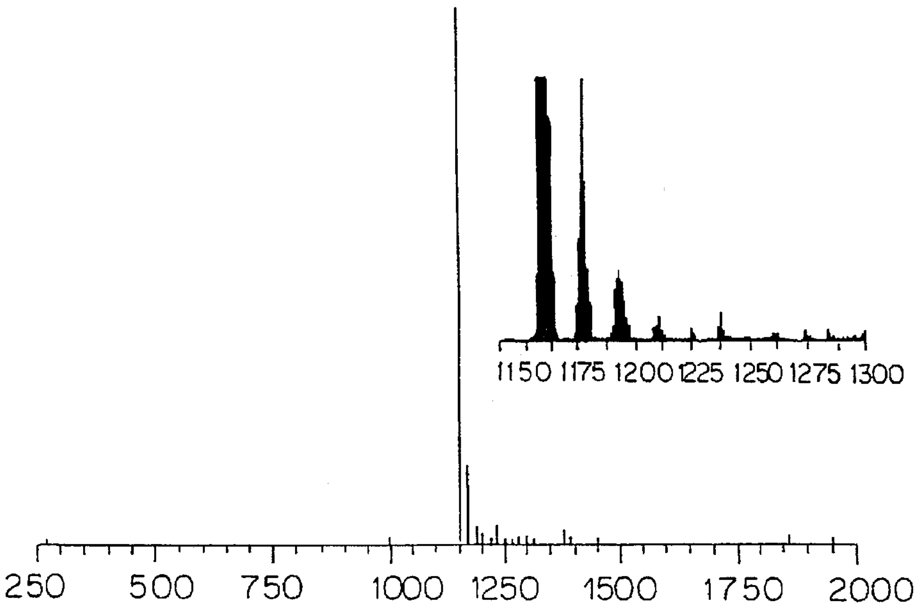
Figure 20D:
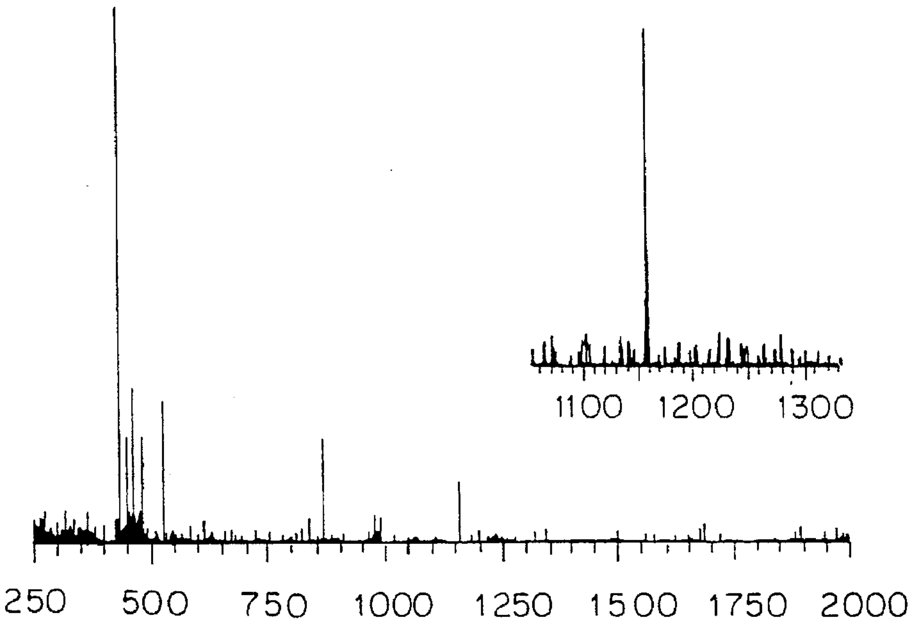

Thus a sensitive method is provided by the present invention for detection of $C_{60}$ in solution. For example, on standing overnight in air in the presence of basic alumina, compound 16 becomes oxidized, as shown in FIG. 20C. Based on peak intensity, less than 1% of individual oxidation forms may be detected in solution. Observation of $C_{60}$ and $C_{70}$ in crude mixtures is also possible as shown by the direct derivatization of soot (FIG. 20D).

In conclusion it is shown that $C_{60}$ and its relatives are easily tagged and detected at low concentrations in solution using reagent 16.

EXAMPLE IV

ESI-MS ANALYSIS OF FULLERENES USING AN ALKYL-AMINE TAGGING REAGENT

The reaction of $C_{60}$ with iso-butyl amine as a non-limiting example of an alkyl-amine tagging reagent was studied using ESI-MS methods of the present invention. ESI-MS has several advantages over other MS techniques. First only molecular ions are observed. Second, direct observation of cations in solution is possible and lastly, additional structural information (i.e. fragmentation) may be obtained by the technique of collisionally induced dissociation (29).

Amine additions to $C_{60}$ occur via a stepwise SET addition to one of the six interconnected pyracyclene units (Braun, *Angew. Chem. Int'l. Ed. Eng.* 4 31:588 (1992); Wudl *Acc. Chem. Res.* 25:157 (1992)). Clear definition of this chemistry of $C_{60}$ is complicated by multiple reaction products and amino-$C_{60}$'s were characterized primarily by microanalysis and titration of precipitated mixtures (30,27). FAB mass spectra were reported to show "clusters" of ions for compounds containing 3–12 amine groups.

ESI-MS is now discovered to be useful for the observation of $C_{60}$ reactions in solution, e.g., according to Eq. 9.

$$C_{60}+RNH_2\text{---->}C_{60}O_n(RNH_2)_m$$

$C_{60}$ (99%, Strem) was stirred in neat iso-butyl amine at room temperature. ESI-MS spectra of aliquots were taken at periods of 1–24 hours and analyzed in a 1:1 mixture of a toluene-methanol.

The ESI-MS measurements were performed on a Vestec Model 200 single-quadrupole electrospray ionization mass spectrometer (29). Aliquots of reaction mixture were taken at 1, 4 and 24 hr, volatiles were removed; the residue was dissolved in toluene, 5% TFA/MeOH was added and the sample was immediately used for ESI-MS measurement All spectra were obtained by infusing the sample solution at 5 μL/min with the usual (3c) instrument settings.

Figure 22:
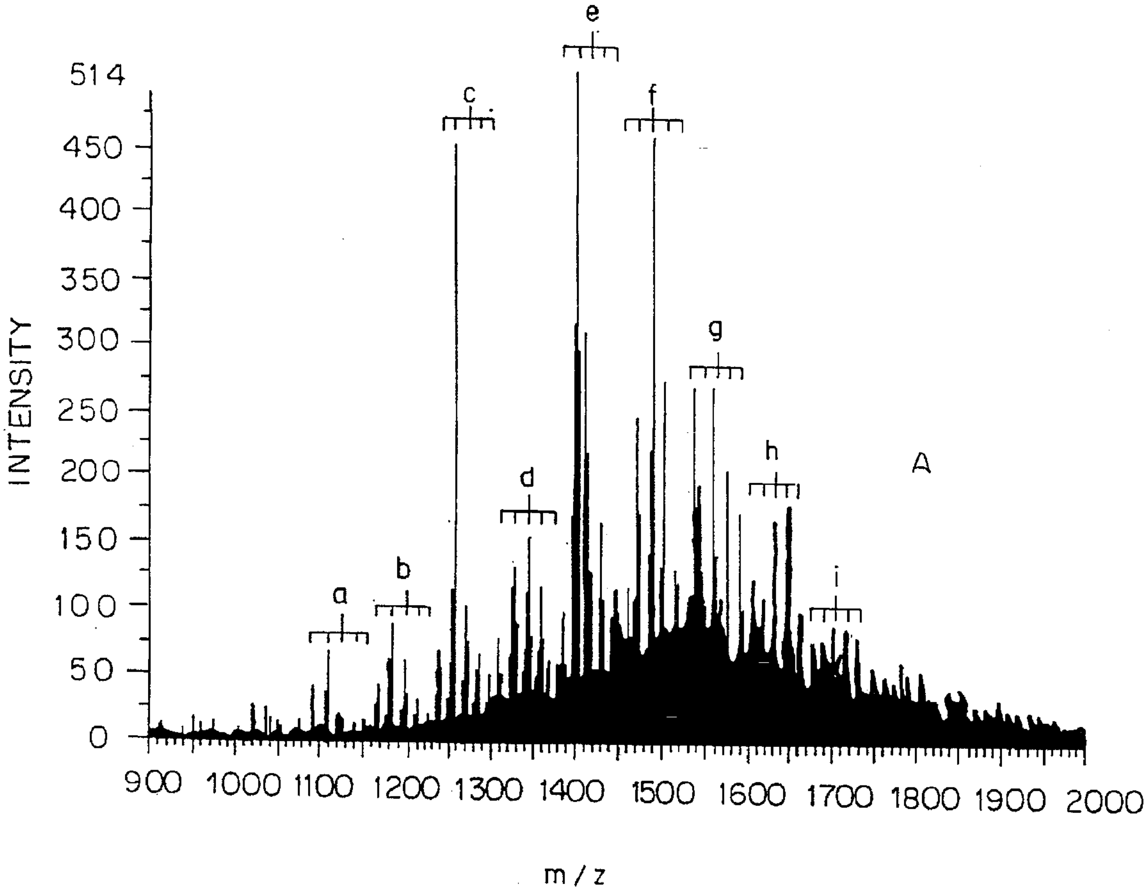
FIG. 22A–C is a graphical representation showing the expansions of ESI/MS spectra, singly charged region: In the graphs, peaks are as follows: a: $C_{60}On(NH_2Bu$-$i)_4$, b: $C_{60}O_n(NH_2Bu$-i), c: $C_{60}O_n(NH_2Bu$-$i)_6$, d: $C_{60}O_n(NH_2Bu$-$i)_7$, e: $C_{60}O_n(NH_2Bu$-$i)_8$, f: $C_{60}O_n(NH_2Bu$-$i)_9$, g: $C_{60}O_n(NH_2Bu$-$i)_{10}$, h: $C_{60}O_n(NH_2Bu$-$i)_{11}$, i: $C_{60}O_n(NH_2Bu$-$i)_{12}$, n=5–9.

Although hydrocarbon solvents are unsuitable for electrospray, this mixed solvent could unexpectedly be used while maintaining good electrospray characteristics. Spectra taken during the course of the reaction (FIG. 21A–C) show, an initially formed product (at 1h) with a molecular ion at 1255 corresponding to $C_{60}O_6(RNH_2)_6$. As the reaction proceeds, higher molecular weight products increase. After 24 hours the reaction mixture was purified on a column of $Al_2O_3$, eluting with toluene/$CHCl_3$. An expansion of the singly charged ESI-MS region is shown in FIG. 22. Expansion of the doubly charged region (m/e=500–900) indicates that the doubly charge cations are derived from the same cluster of products as singly charged ions (30). Calculated and observed peak assignments are consistent with the formula $C_{60}O_n(RNH_2)_m$ where n=5–9 and m=4–12). Interestingly, the major ion at 1255 (labeled with * in FIG. 21A–C) corresponds to the addition of 6 oxygens and 6 amines Evidently the six reactive pyracyclene units participate in a reaction both with the amine and with oxygen. A control experiment was carried out under a blanket of $N_2$ to establish that the oxidation did not occur in the ESI source (32).

Several reports of poly-oxygenated derivatives of $C_{60}$ have appeared (33) with substitutions of up to 5 oxygens. In addition, the monoepoxide $C_{60}O$ has been characterized (34). We have observed the reaction of $C_{60}$ with amines in air is accompanied by rapid reaction with oxygen.

Interesting fragmentation information may also be obtained from ESI-MS using collision-induced dissociation (CID) (29). When the ESI-MS spectrum is run at increased repeller voltage (known to favor CID) several changes in the spectra are obtained. Loss of 1–7 amines are observed while the oxygens are retained. Based on this evidence it is tempting to propose that the products of amination involve a combination of oxidation and amination chemistries Clearly a mixture of related structures are observed since the maximum number of oxygens and amines is typically not incorporated.

In conclusion, we have shown that the $C_{60}$ amination reaction is a complex process and that ESI-MS is an ideal tool for studying such reactions.

EXAMPLE V

ESI-MS ANALYSIS OF FULLERENE/FULLEROID ANIONS USING ALKOXIDE ADDITION TO FULLERENES

Fullerene/fulleroid reactions are now discovered to be dominated by anions and anion radicals. Fullerene anion and anionic products derived therefrom are readily examined directly in solution by ESI-MS according to the present invention in negative ion mode.

We have found that the addition of $NaOCH_3/CH_3OH$ to a solution of $C_{60}$ in toluene leads to a color change from purple to brown.

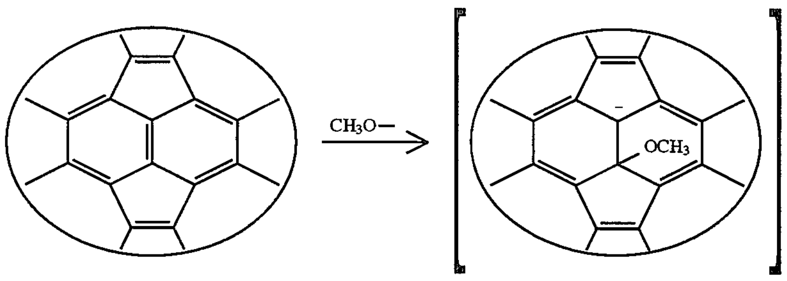

Eq 10

Figure 34A:
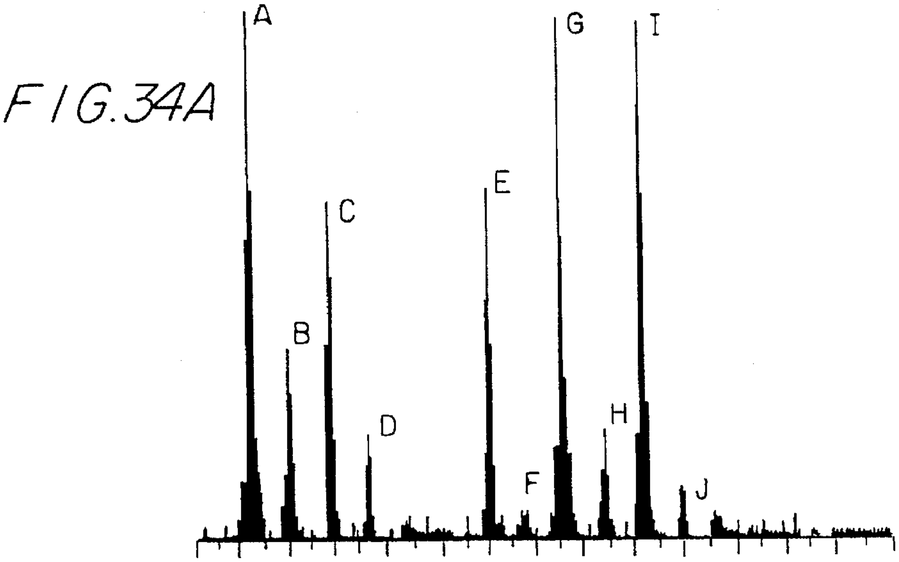
FIG. 34A–C.
Figure 34B:
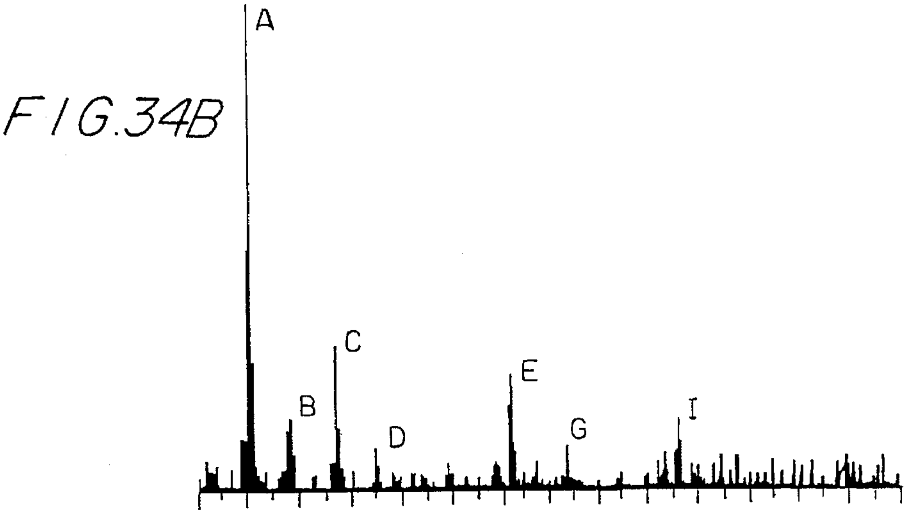
Figure 34C:
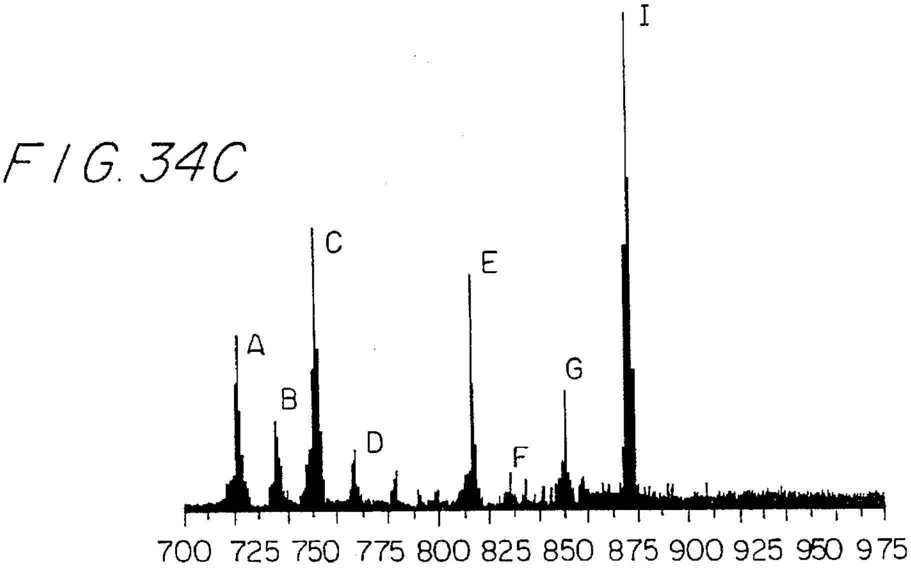

When the solution was injected into the ESI-MS the spectrum shown in FIG. 34A was obtained showing several anionic products. All spectra were obtained on a Vestec Model 200 ESI quadrupole mass spectrometer with a 2000 amu mass range (Allen *J. Amer. Soc. Mass. Spec.* 3:19, (1992)). Samples were prepared by mixing 04. mL $NaOCH_3/CH_3OH$ (0.74M) with $C_{60}$ in toluene (~1 mg/0.4 mL). General operating conditions: needle voltage: −2.0–2.6 kv; electrospray chamber temperature: 55°–62° C.; nozzle voltage: −200 V; block temperature: 220°–230° C.; lens temperature: 110°–120° C.; repeller voltage: −20 V. We have assigned the major products as A:$C_{60}^-$, C:$C_{60}(OCH_3)^-$, E:$C_{60}(OCH_3)_3^-$ and I:$C_{60}(OCH_3)_5^-$. In addition, minor oxidized components may be observed as well as a product of oxidation and coupling to toluene (Krusic et al *Science* 256:7183 (1991)); G:$C_{60}O_2(CH_2C_6H_5)^-$. To confirm the identity of peaks C, E and I, we examined the reaction in $CD_3OD/C_6H_5CH_3$ (FIG. 34B). The expected shift of the peaks for C, E and I by 3, 9 and 15 mass units respectively was observed. When the reaction was carried out in $CH_3OH/C_6D_5CD_3$ (FIG. 34C), the peak G showed a shift of 7 mass units. In 1:1 deuteromethanol/deuterotoluene, the same spectrum as FIG. 34B was obtained except that peak G showed a shift of only 7 amu, ruling out the formula $C_{60}(OCH_3)(CH_2C_5H_5)^-$. The expected results were also obtained if the reaction was run in benzene ethanol, or ethylbenzene. In some reactions small dimer ions were also detected. A tagged $C_{60}$ molecule also showed addition of 1,3 and 5 methoxy groups in both negative ion and positive ion mode.

Similar experiments were carried out on $C_{70}$ and the same type of products were observed The major anion in this case is $C_{70}(OCH_3)_3^-$.

It is expected that anionic intermediates reported herein are stable. Precedent for the formation of oxidation products of $C_{60}$ is available other MS studies (McEwen et al *J. Amer. Chem. Soc.* 114:4412 (1992); Wood et al *J. Amer. Chem. Soc.* 113:5907 (1991)). The detection of a benzylic adduct is also not unusual considering polybenzylated products of $C_{60}$ have been reported (Krusic et al, supra).

Without being limited to a particular theory, the formation of only odd numbered methoxide adducts may be due to a radical coupling with the initial methoxide adduct and air oxidation to form the products. Odd numbered adducts thus are negatively charged whereas the even numbered products are neutral.

All references cited herein, including journal articles or abstracts, published or corresponding U.S. or foreign patent applications, issued U.S. or foreign patents, or any other references, are entirely incorporated by reference herein, including all data, tables, figures, and text presented in the cited references. Additionally, the contents of the references cited within the references cited herein are also entirely incorporated by reference.

Reference to known method steps conventional methods steps, known methods or conventional methods is not in any way an admission that any aspect, description or embodiment of the present invention is disclosed, taught or suggested in the relevant art.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the generic concept of the present invention. Therefore, such adaptations and modifications are intended to be comprehended within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein.

References 1. (a) Fenn, J. B.; Manns M. Meng, C. K.; Wong, S. F.; Whitehouse, C. M. Science 1989, 246, 64. (b) Fenn, J. B.; Mann, M.; Meng, C. K.; Wong, S. F.; Whitehouse, C. M Mass Spectrometry Rev. 1990, 9, 37. (c) Smith, R. D.; Loo, J. A.; Edmonds, C. G.; Barinage, C. J.; Udseth, H. R. Anal. Chem. 1990; 62, 882. (d) Beavis, R. C., Chait, B. T. Proc. Natl. Acad. Sci. USA 1990, 87, 6873. (e) McEwen, C. N., Larsen, B. S J. Am. Soc . Mass Spectrom. 1991, 2, 205. (f) Dass, C., Kusmierz, J. J., Desiderio, D. M., Jaruis, S. A., Green, B. N. J. Am. Soc. Mass Spectrom. 1991, 2, 149. (g) Guevremont, R., Siu, K. W. M., Le Blanc, J. C. Y., Bennan, S. S. J. Am. Soc. Mass Spectrom. 1992, 3, 216. (h) Chair, B. T., Kent, S. B. H. Science; 1992, 257, 1885. (i) Loo, J. A. Loo, R. R. O., Light, K. J., Edmonds, C. G., Smith, R. D. Anal. Chem 1992, 64, 81.

2. (a) Wilson, S. R.; Wu, Y. J. Org. Chem 1992, 57, 6941. (b) Wilson; S. R.; Perez, J.; Wu, Y. Natural Products Lett. 1992, 1, 10

3. (c). Wilson, S. R.; Wu, Y. Proc. of the 40th ASMS Conference on Mass Spectrometry and Allied Topics Washington, D.C., 1992; 594. (d) Wilson S. R.; Tulchinsky, M. L.; Wu, Y. Proc. of the 40th ASMS Conference on Mass Spectrometry and Allied Topics, Washinguon, D.C., 1992; 1641. (e). Wilson, S. R.; Wu, Y., Organometallics, in press. (f) Perez, J. PhD thesis, New York University, 1992. (g) Wilson, S. R.; Perez, J.; Pasternak, A. J. Amer. Chem. Soc., in press. (h) Wilson, S. R.; Wu, Y., submitted. Van Berkel, G. J.; McLuckey, S. A.; Glish; G. L. Anal. Chem. 1992, 64 1586.

4. Allen, M. H.; Vestal, M. L. J. Amer Soc. Mass Spect 1992, 3, 18.

5. (a) Dole, M.; Mach L. L.; Hines, R. L. Mobley, R. C.; Ferguson, L. P.; Alice, M. B. J. Chem. Phys 1968, 49, 2240. (b) Mach, L. L.; Kralik P; Rheude, A.; Dole; M. J. Chem. Phys, 1970, 52, 4977.

6. Fieser, L. F.; Fieser, M. "Reagents for Organic Synthesis", Vol. 1, p430, John Wiley and Sons; New York, N.Y. (1967).

7. Katta, V.; Chowdhury, S. K.; Chai. B. T. J. Am. Chem. Soc. 1990, 112 5348.

8. Simmons, M. G. Wilson L. J.; J. Chem. Soc. Chem. Commun. 1978, 634.

9. Hutchels, T. W.; Allen M. H. Rapid Commun. Mass Spectrom., 1992 6 469.

10. Cheng, Z. L. Siu K. W. M., Guevremont, R. Berman; S. S. J. Am. Soc. Mass Spectrom. 1992, 3, 281

11. Lam; Z. Reinhold B. B. Reinhold, V. N. Proc. of the 39th ASMS Conference on Mass Spectrometry and Allied Topics, Nashville, Tenn. 1991, 282.

12. Aebersold, R., Bures E. J., Namchuk, M., Goghari, M. H., Shushan, B., Covey, T. C. Protein Science 1992, 494

13. Wilson, S. R., Lu, Q., Tulchinski, M.; Wu, Y., submitted

14. Wilson, S. R.; Tulchinski, M. unpublished results

15. D. Koshland, "Molecule of the Year-1991," Science, 1991 254, 1705.

16. (a) Braun, T. Angew. Chem. Int'l Ed Eng, 1992, 31, 588. (b) Wudl, F.; Hirsch, A.; Khemani, K. C.; Suzuki, T.; Allemand, P.-M.; Koch, A; Eckert H.; Srdanov, G.; Webb, H. M. in "Fullerenes" (ACS Symp. Ser. 1992). (c) Hirsch, A.; Khemani, K. C.; Suzuki, T.; Allermand, P-M.; Kolch, A.; Srdanov, G.; Wudl, F in "Large Carbon Clusters" (ACS Symp Ser 1991). Howard, J. B.; McKinon, J. T.; Makarovsky, Y.; Lafleur; A. L.; ; Johnson, E. Nature 1991, 352, 139–141. (d) Coustel, N.; Bernier, P.; Aznar, R. Zahad A.; Lamber L-M.; Lyard P.; J. Chem. Soc. Chem. Commun., 1992, 1402. (e). Scrievens W. A.; Bedworth, P. V.; Tour, J. M.; J. Amer. Chem. Soc., 1992, 114, 7917. (f) Khemani, K. C.; Prato; M; Wudl, F.; J. Org. Chem., 1992, 57, 3254. (a) Schwarz, Angew. Chem. Int'l Ed Eng, 1992, 31, 293. (g) H. Wudl, F. Acc. Chem. Rest, 1992, 25, 157. (h) Hoke, S. H., II., Molstad J., Dilettato, D.; Jay M. J., Carlson, D., Kahr, B., Cooks, R. G J. Org. Chem. 1992, 57, 5069

17. McElvany, S. W.; Ross M. M. J. Amer. Soc. Mass. Spectrom, 1992, 3, 268.

18. Wilson, S. R.; Tulchinski, M. submitted.

19. (a) Creegan, K. M.; McCauley Jr., J. L.; Robbins, W. K.; Millar, J. M.; Sherwood R. D.; Tindal, P. J.;. Cox D. M.; Smith, III, A. B.; McCauley Jr., J. P.; Jones D. R.; Gallagher, R. T. J. Amer. Chem. Soc., 1992, 114, 1103. (b) Kalsbeck; W. A.; Thorp, H. H. J. Electroanal Chem, 1991, 314, 363.

20. Olah, G. A.; Bucsi J.; Lambert, C.; Aniszfeld., R.; Truverdi, N. J.; Sensharman D. K.; Prakash, G. K. S. J. Amer. Chem. Soc., 1991, 112, 9385.

21. Cabill, P. A; Henderson C. C.; MRS Meeting Abstracts, Boston, Mass., December 1992.

22. Wilson S. R. et al, submitted

23. Xie, Q. et al., J. Amer. Chem. Soc. 1992, 114, 3978.

24. Bausch, J. W. et al., J. Amer. Chem. Soc. 1991, 113, 3205.

25. Wilson, S. R.; Perez J.; Wu, Y.; Natural product Letters, 1992, 1, 103–108.

26. (a) Wilson, S. R.; Tuichinsky M. Wu, Y.; Proceedings, 40th ASMS, 1992, 1641–1642. (b) Wilson S. R.; Wu, Y.; submitted.

27. (a) Wudl, F.; Hirsch, A.; Khemani K. C. Suzuki, T.; Allemand, P. M.; Koch, A.; Eckert, H.; Srdanov; G., Webb, H. M. in "Fullerenes" (ACS Symp. Ser. 1992). (b) Hirsch A.; Khemani, K. C.; Suzuki T.; Allermand P. -M.; Kolch, A.; Srdanov, G.; Wudl, F. in "Large Carbon Clusters" (ACS Symp Ser. 1991).

28. (a) Fenn; J. .B. et al. Science, 1989, 246, 64. (b) Fenn, J. B. et al., Mass Spectrometry Rev., 1990, 9, 37. (c) Smith, R. D. et al., Anal. Chem. 1990, 62, 882. (d) Jardine; I.; Nature 1990, 345, 747.

29. Allen, M .H.; Vestal, M. L. J. Am. Soc. Mass Spectrom., 1990, 3, 18.

30. Hirsch, A.; Li, Q.; Wudl, F.; Angew Chem Int'l Ed. Eng, 1991, 30, 1309.

31. Besides i-Bu$NH_2$, the reaction with i-Pr$NH_2$ and morpholine show similar types of products containing both oxygen and amine.

32. We have also prepared a tagged $C_{60}$ molecule. ESI-MS studies showed that no oxidation occurs under normal ESI conditions: Wilson, S. Wu, Y. submitted.

33. (a) Wood, J. M.; Kahr B.; Hoke II S. H.; Dejorme, L.; Cooks, R. G.; Ben-Amotz D. J. Amer. Chem. Soc. 1991, 113, 5907. (b) Kalsbeck W. A.; Thorp, H. H. J. Electroanal Chem 1991, 314, 363. (c) Clusters of oxidation products were observed by LDFTMS in a t-butyl lithium addition reaction: McEwan C. N.; Krusic, P. J.; Lazar, J.; McKay, R. G.; Lam, Z.; Larsen, B. S. 1992 proceedings of the 40th ASMS 1476. (d) Hoke, S. H., II.; Molstad, J.; Dilettato, D.; Jay, M. J.; Carlson, D.; Kahr, B.; Cooks; R. G. J. Org. Chem. 1992, 57, 5069.

34. (a) Creegan K. M.; McCauley, Jr., J. L.; Robbins W. K.; Millar, J. M.; Sherwood R. D.; Tindal, P. J.; Cox; D. M.; Smith, III, A. B.: McCauley Jr. J. P.; Jones, D. R.; Gallagher, R. T. J. Amer. Chem. Soc., 1992, 114, 1103. (b) Elemes, Y.; Silverman, S. K.; Shea; C.; Kao, M. Foote, C.; Alvarez M. M.; Whetten, R. L.; Angew. Chem. Int'l Ed Eng, 1992, 31, 351.

What is claimed is:

1. A method of electrospray ion mass spectroscopy, ESI-MS, analysis of a neutral compound, comprising:

reacting the neutral compound with a neutral tagging reagent capable of associating with a cation in solution to form a tagged compound;

associating said tagged compound with a cation to form a product existing in solution as a charged compound capable of electrospray ionization; and performing ESI-MS on said charged compound, wherein the tagging reagent is selected from the group consisting of crown ethers, metal chelating agents and ligands for a metal.

2. A method according to claim 1, wherein said tagging reagent is relatively non-reactive with the neutral compound such that reactions between the neutral compound and compounds other than the tagging reagent are substantially the same as compared to such reactions of the neutral compound without the tagging reagent.

3. A method according to claim 1, wherein said neutral compound is a fulleroid.

4. A method according to claim 1, wherein said performing step comprises:

reacting said tagged compound with another reactant and determining at least one parameter selected from the group consisting of reaction rate, amount and formula weight of a reaction starting compound, intermediate or product of said reaction by means of performing ESI-MS on said charged compound.

5. A method according to claim 1 wherein said tagging reagent is selected from the group consisting of:

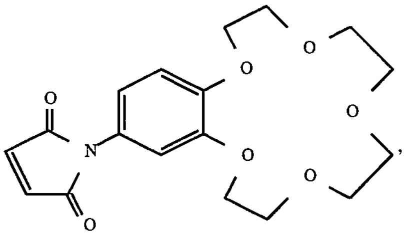

,

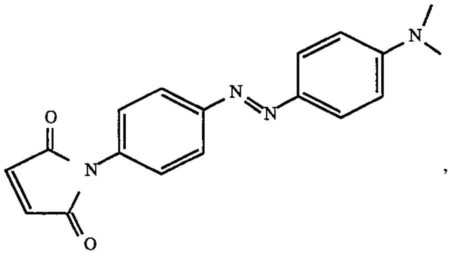

,

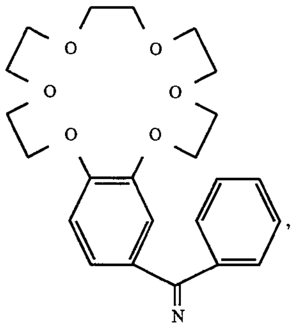

,

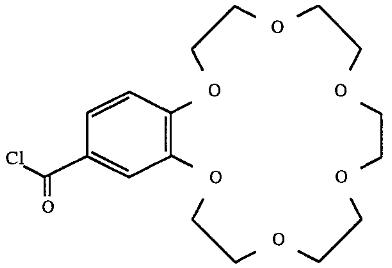

and

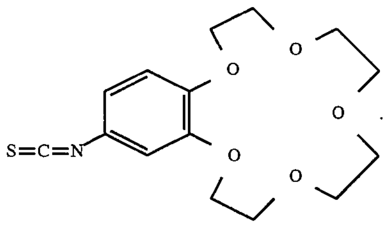

.

6. A method according to claim 5, wherein said neutral compound is a fulleroid.

7. A method according to claim 5, wherein said performing step comprises:

reacting said tagged compound with another reactant and determining at least one parameter selected from the group consisting of reaction rate, amount and formula weight of a reaction starting compound, intermediate or product of said reaction by means of performing ESI-MS on said charged compound.

8. A method according to claim 1, wherein said neutral compound is metal containing and said tagging reagent is:

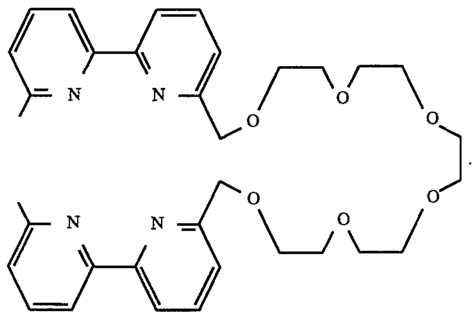

.

9. A method of electrospray ions mass spectroscopy, ESI-MS, analysis of a fulleroid compound, comprising:

reducing the fulleroid compound with a metal to form a neutral fulleroid salt;

reacting the fulleroid salt with a neutral tagging reagent capable of associating with a cation in solution to form a tagged compound;

associating said tagged compound with an additional cation to form a product existing in solution as a charged compound capable of electrospray ionization; and performing ESI-MS on said charged compound, wherein the tagging reagent is:

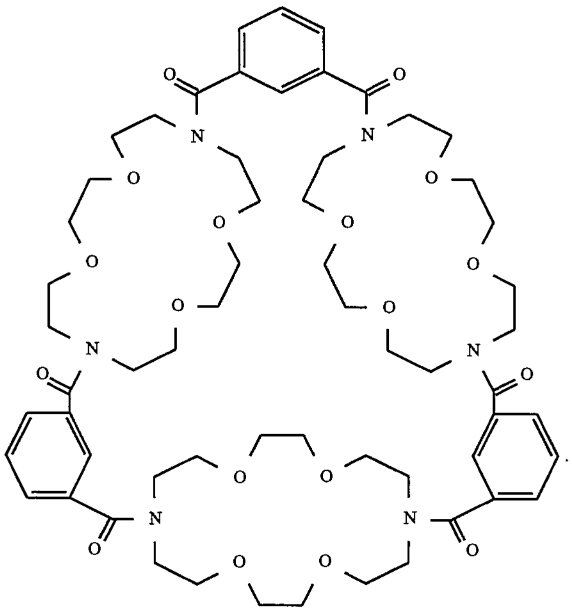

.

* * * * *